US012611649B2

(12) United States Patent
Mennell et al.

(10) Patent No.: US 12,611,649 B2
(45) Date of Patent: *Apr. 28, 2026

(54) BIOGENIC ACTIVATED CARBON AND METHODS OF MAKING AND USING SAME

(71) Applicant: Carbon Technology Holdings, LLC, Oakdale, MN (US)

(72) Inventors: James A. Mennell, Brighton, UT (US); Daniel J. Despen, Oakdale, MN (US)

(73) Assignee: Carbon Technology Holdings, LLC, Oakdale, MN (US)

( * ) Notice: Subject to any disclaimer, the term of this patent is extended or adjusted under 35 U.S.C. 154(b) by 44 days.

This patent is subject to a terminal disclaimer.

(21) Appl. No.: 18/543,750

(22) Filed: Dec. 18, 2023

(65) Prior Publication Data

US 2024/0139707 A1 May 2, 2024

Related U.S. Application Data

(63) Continuation of application No. 16/922,556, filed on Jul. 7, 2020, now Pat. No. 12,151,226, which is a continuation of application No. 16/574,544, filed on Sep. 18, 2019, now Pat. No. 11,285,454, which is a continuation of application No. 14/399,793, filed as application No. PCT/US2013/039981 on May 7, 2013, now abandoned.

(60) Provisional application No. 61/737,514, filed on Dec. 14, 2012, provisional application No. 61/721,827, filed on Nov. 2, 2012, provisional application No. 61/643,741, filed on May 7, 2012.

(51) Int. Cl.

| | |
|---|---|
| *C01B 32/336* | (2017.01) |
| *B01J 20/02* | (2006.01) |
| *B01J 20/04* | (2006.01) |
| *B01J 20/06* | (2006.01) |
| *B01J 20/10* | (2006.01) |
| *B01J 20/12* | (2006.01) |
| *B01J 20/20* | (2006.01) |
| *B01J 20/22* | (2006.01) |
| *B01J 20/28* | (2006.01) |
| *B01J 20/30* | (2006.01) |
| *B82Y 30/00* | (2011.01) |
| *B82Y 40/00* | (2011.01) |
| *C01B 32/184* | (2017.01) |
| *C01B 32/30* | (2017.01) |
| *C01B 32/39* | (2017.01) |
| *C10B 39/02* | (2006.01) |
| *C10B 53/02* | (2006.01) |
| *C10B 57/00* | (2006.01) |
| *C10B 57/10* | (2006.01) |

(52) U.S. Cl.
CPC ............... *B01J 20/22* (2013.01); *B01J 20/02* (2013.01); *B01J 20/0225* (2013.01); *B01J 20/0288* (2013.01); *B01J 20/041* (2013.01);
*B01J 20/043* (2013.01); *B01J 20/046* (2013.01); *B01J 20/06* (2013.01); *B01J 20/10* (2013.01); *B01J 20/12* (2013.01); *B01J 20/20* (2013.01); *B01J 20/28009* (2013.01); *B01J 20/28066* (2013.01); *B01J 20/3078* (2013.01); *B82Y 30/00* (2013.01); *B82Y 40/00* (2013.01); *C01B 32/184* (2017.08); *C01B 32/30* (2017.08); *C01B 32/336* (2017.08); *C01B 32/39* (2017.08); *C10B 39/02* (2013.01); *C10B 53/02* (2013.01); *C10B 57/005* (2013.01); *C10B 57/10* (2013.01); *B01J 2220/485* (2013.01); *Y02C 20/40* (2020.08); *Y02E 60/36* (2013.01); *Y02P 20/145* (2015.11)

(58) Field of Classification Search
CPC ............................. C01B 32/336; B01J 20/20
See application file for complete search history.

(56) References Cited

U.S. PATENT DOCUMENTS

| | | | |
|---|---|---|---|
| 1,609,097 | A | 11/1926 | Stafford |
| 1,662,357 | A | 3/1928 | Barton et al. |
| 2,289,917 | A | 7/1942 | Lambiotte |

(Continued)

FOREIGN PATENT DOCUMENTS

| | | |
|---|---|---|
| CA | 2740225 | 5/2010 |
| CN | 101693848 A | 4/2010 |

(Continued)

OTHER PUBLICATIONS

Anonymous et al., "BET specific Surface Area," (publication date: Jan. 1, 2021).
Barrett et al., "The Determination of Pore Volume and Area Distributions in Porous Substances. I Computations from Nitrogen Isotherms," Journal of American Chemical Society, 73:373-380 (publication date: Jan. 1, 1951).
Demiral et al., Surface properties of activated carbon prepared from wastes, Surface and Interface Analysis, 40(3-4):612-615 (publication date: Jan. 23, 2008).

(Continued)

*Primary Examiner* — Stuart L Hendrickson
(74) *Attorney, Agent, or Firm* — O'Connor & Company; Ryan P. O'Connor

(57) ABSTRACT

Biogenic activated carbon compositions disclosed herein comprise at least 55 wt % carbon, some of which may be present as graphene, and have high surface areas, such as Iodine Numbers of greater than 2000. Some embodiments provide biogenic activated carbon that is responsive to a magnetic field. A continuous process for producing biogenic activated carbon comprises countercurrently contacting, by mechanical means, a feedstock with a vapor stream comprising an activation agent including water and/or carbon dioxide; removing vapor from the reaction zone; recycling at least some of the separated vapor stream, or a thermally treated form thereof, to an inlet of the reaction zone(s) and/or to the feedstock; and recovering solids from the reaction zone(s) as biogenic activated carbon. Methods of using the biogenic activated carbon are disclosed.

16 Claims, 26 Drawing Sheets

(56)                 References Cited

U.S. PATENT DOCUMENTS

| | | | |
|---|---|---|---|
| 2,448,223 | A | 8/1948 | Lantz |
| 2,475,767 | A | 7/1949 | Williams et al. |
| 2,577,730 | A | 12/1951 | Benedict et al. |
| 3,088,983 | A | 5/1963 | Rosenthal |
| 3,235,374 | A | 2/1966 | Mahony |
| 3,290,894 | A | 12/1966 | Tsao |
| 3,298,928 | A | 1/1967 | Esterer |
| 3,650,711 | A | 3/1972 | Unick et al. |
| 3,852,048 | A | 12/1974 | Pyle |
| 3,853,498 | A | 12/1974 | Bailie |
| 3,928,023 | A | 12/1975 | Claflin |
| 4,002,565 | A | 1/1977 | Farrell et al. |
| 4,011,129 | A | 3/1977 | Tomlinson |
| 4,015,951 | A | 4/1977 | Gunnetman |
| 4,026,678 | A | 5/1977 | Livingston |
| 4,082,694 | A | 4/1978 | Wennerberg |
| 4,102,653 | A | 7/1978 | Simmons et al. |
| 4,149,994 | A | 4/1979 | Murty |
| 4,152,119 | A | 5/1979 | Schulz |
| 4,158,643 | A | 6/1979 | Sinha |
| 4,201,831 | A | 5/1980 | Slusarczuk et al. |
| 4,210,423 | A | 7/1980 | Yan |
| 4,236,897 | A | 12/1980 | Johnston |
| 4,246,024 | A | 1/1981 | Price-Falcon et al. |
| 4,248,839 | A | 2/1981 | Toomey |
| 4,255,129 | A | 3/1981 | Reed et al. |
| 4,308,033 | A | 12/1981 | Gunnennan |
| 4,310,334 | A | 1/1982 | Waldron |
| 4,317,703 | A | 3/1982 | Bowen et al. |
| 4,322,222 | A | 3/1982 | Sass |
| 4,324,561 | A | 4/1982 | Dean et al. |
| 4,385,905 | A | 5/1983 | Tucker |
| 4,395,265 | A | 7/1983 | Reilly et al. |
| 4,398,917 | A | 8/1983 | Reilly |
| 4,405,331 | A | 9/1983 | Blaustein et al. |
| 4,494,962 | A | 1/1985 | Christie et al. |
| 4,500,327 | A | 2/1985 | Nishino |
| 4,529,407 | A | 7/1985 | Johnston et al. |
| 4,532,227 | A | 7/1985 | Suggitt |
| 4,553,978 | A | 11/1985 | Yvan |
| 4,561,860 | A | 12/1985 | Gulley et al. |
| 4,632,731 | A | 12/1986 | Bodle et al. |
| 4,652,433 | A | 3/1987 | Ashworth et al. |
| 4,679,268 | A | 7/1987 | Gurries et al. |
| 4,810,255 | A | 3/1989 | Fay, III et al. |
| 4,810,446 | A | 3/1989 | Sylvest |
| 4,828,573 | A | 5/1989 | Jelks |
| 4,834,777 | A | 5/1989 | Endebrock |
| 4,855,276 | A | 8/1989 | Osborne et al. |
| 4,886,519 | A | 12/1989 | Hayes et al. |
| 4,891,459 | A | 1/1990 | Knight et al. |
| 4,935,099 | A | 6/1990 | Weiss et al. |
| 5,132,259 | A | 7/1992 | Curnutt |
| 5,141,526 | A | 8/1992 | Chu |
| 5,153,242 | A | 10/1992 | Timm et al. |
| 5,167,797 | A | 12/1992 | Ou |
| 5,187,141 | A | 2/1993 | Jha et al. |
| 5,231,063 | A | 7/1993 | Fukumoto et al. |
| 5,248,413 | A | 9/1993 | Stencel et al. |
| 5,336,835 | A | 8/1994 | McNamara |
| 5,338,441 | A | 8/1994 | LeViness |
| 5,342,418 | A | 8/1994 | Jesse |
| 5,346,876 | A | 9/1994 | Ichimura et al. |
| 5,352,252 | A | 10/1994 | Tolmie |
| 5,403,548 | A | 4/1995 | Aibe et al. |
| 5,431,702 | A | 7/1995 | Schulz |
| 5,458,803 | A | 10/1995 | Oehr |
| 5,513,755 | A | 5/1996 | Heavilon et al. |
| 5,584,970 | A | 12/1996 | Schmalfeld et al. |
| 5,643,342 | A | 7/1997 | Andrews |
| 5,725,738 | A | 3/1998 | Brioni et al. |
| 5,910,440 | A | 6/1999 | Grossman et al. |
| 5,916,826 | A | 6/1999 | White |
| 5,976,373 | A | 11/1999 | Trocciola et al. |
| 5,980,595 | A | 11/1999 | Andrews |
| 6,039,774 | A | 3/2000 | McMullen et al. |
| 6,057,262 | A | 5/2000 | Derbyshire et al. |
| 6,114,280 | A | 9/2000 | Stephens |
| 6,342,129 | B1 | 1/2002 | Vaughn et al. |
| 6,395,926 | B1 | 5/2002 | Holtzapple et al. |
| 6,402,813 | B2 | 6/2002 | Monereau et al. |
| 6,447,437 | B1 | 9/2002 | Lee et al. |
| 6,506,223 | B2 | 1/2003 | White |
| 6,524,354 | B2 | 2/2003 | Sinha et al. |
| 6,698,724 | B1 | 3/2004 | Traeger et al. |
| 6,712,606 | B2 | 3/2004 | Hagstrom et al. |
| 6,719,816 | B2 | 4/2004 | Barford |
| 6,797,034 | B2 | 9/2004 | Sugitatsu et al. |
| 6,818,027 | B2 | 11/2004 | Murcia |
| 6,843,831 | B2 | 1/2005 | Kleut et al. |
| 6,901,868 | B2 | 6/2005 | Hornung et al. |
| 7,241,321 | B2 | 7/2007 | Murcia |
| 7,282,072 | B2 | 10/2007 | Taulbee |
| 7,314,002 | B2 | 1/2008 | Dupuis |
| 7,326,263 | B2 | 2/2008 | Andersen |
| 7,332,002 | B2 | 2/2008 | Johnson et al. |
| 7,354,566 | B2 | 4/2008 | Okada et al. |
| 7,357,903 | B2 | 4/2008 | Zhou et al. |
| 7,378,372 | B2 | 5/2008 | Sylvester |
| 7,404,262 | B2 | 7/2008 | Jurkovich et al. |
| 7,435,286 | B2 | 10/2008 | Olson et al. |
| 7,438,785 | B2 | 10/2008 | Meier et al. |
| 7,455,704 | B2 | 11/2008 | Garwood |
| 7,468,170 | B2 | 12/2008 | Comrie |
| 7,623,340 | B1 | 11/2009 | Song et al. |
| 7,691,182 | B1 | 4/2010 | Muradov |
| 7,708,806 | B2 | 5/2010 | Wright et al. |
| 7,749,359 | B2 | 7/2010 | Flottvik |
| 7,785,379 | B2 | 8/2010 | Drisdelle et al. |
| 7,799,544 | B2 | 9/2010 | Schorken et al. |
| 7,811,339 | B2 | 10/2010 | Werner |
| 7,879,136 | B2 | 2/2011 | Mazyck |
| 7,905,990 | B2 | 3/2011 | Freel |
| 7,931,783 | B2 | 4/2011 | Dam-Johansen |
| 7,932,065 | B2 | 4/2011 | Medoff |
| 7,942,942 | B2 | 5/2011 | Paoluccio |
| 7,943,014 | B2 | 5/2011 | Berruti et al. |
| 7,960,325 | B2 | 6/2011 | Kluko |
| 7,981,835 | B2 | 7/2011 | Srinivasachar et al. |
| 8,048,528 | B2 | 11/2011 | Matviya |
| 8,080,088 | B1 | 12/2011 | Srinivasachar |
| 8,105,400 | B2 | 1/2012 | Bergman |
| 8,150,776 | B2 | 4/2012 | Comrie |
| 8,237,006 | B2 | 8/2012 | Stone et al. |
| 8,308,911 | B2 | 11/2012 | Cheiky |
| 8,309,052 | B2 | 11/2012 | Jones |
| 8,328,887 | B2 | 12/2012 | Yang et al. |
| 8,361,186 | B1 | 1/2013 | Shearer et al. |
| 8,383,071 | B2 | 2/2013 | Dillon et al. |
| 8,404,384 | B2 | 3/2013 | Feaver et al. |
| 8,404,909 | B2 | 3/2013 | Jadhav |
| 8,425,633 | B2 | 4/2013 | Banasiak |
| 8,436,120 | B2 | 5/2013 | Piskorz et al. |
| 8,449,724 | B2 | 5/2013 | Stromberg et al. |
| 8,476,480 | B1 | 7/2013 | Brown et al. |
| 8,519,205 | B2 | 8/2013 | Frey |
| 8,541,637 | B2 | 9/2013 | Babicki et al. |
| 8,563,467 | B2 | 10/2013 | Hashisho et al. |
| 8,637,055 | B2 | 1/2014 | Maor |
| 8,669,404 | B2 | 3/2014 | Shulenberger et al. |
| 8,685,136 | B2 | 4/2014 | Metius et al. |
| 8,801,936 | B2 | 8/2014 | Grass et al. |
| 8,920,525 | B2 | 12/2014 | Despen et al. |
| 8,920,609 | B2 | 12/2014 | Steele et al. |
| 8,926,932 | B2 | 1/2015 | Pfeifer et al. |
| 8,993,478 | B2 | 3/2015 | Fujii et al. |
| 8,999,885 | B2 | 4/2015 | Majmudar et al. |
| 9,108,186 | B2 | 8/2015 | Satterfield |
| 9,121,606 | B2 | 9/2015 | Srinivasachar |
| 9,281,135 | B2 | 3/2016 | Soneda et al. |
| 9,388,046 | B2 | 7/2016 | Mennell et al. |
| 9,388,355 | B2 | 7/2016 | Mennell et al. |
| 9,475,031 | B2 | 10/2016 | Mennell et al. |
| 9,527,780 | B2 | 12/2016 | Wilson et al. |

(56)　　　　References Cited

U.S. PATENT DOCUMENTS

| | | | |
|---|---|---|---|
| 9,724,667 | B2 | 8/2017 | Mennell et al. |
| 9,725,371 | B2 | 8/2017 | Shearer et al. |
| 9,752,090 | B2 | 9/2017 | Despen et al. |
| 9,845,440 | B2 | 12/2017 | Mennell et al. |
| 10,167,437 | B2 | 1/2019 | Mennell et al. |
| 10,174,267 | B2 | 1/2019 | Mennell et al. |
| 10,332,226 | B2 | 6/2019 | Block et al. |
| 10,611,977 | B2 | 4/2020 | Mennell et al. |
| 10,961,459 | B2 | 3/2021 | Seidner |
| 10,982,161 | B2 | 4/2021 | Mennell et al. |
| 10,995,274 | B2 | 5/2021 | Marsh |
| 11,091,716 | B2 | 8/2021 | Despen et al. |
| 11,285,454 | B2 | 3/2022 | Mennell et al. |
| 11,286,440 | B2 | 3/2022 | Mennell et al. |
| 12,151,226 | B2 * | 11/2024 | Mennell .................. B01J 20/20 |
| 12,239,953 | B2 * | 3/2025 | Mennell ................ B01J 20/103 |
| 2002/0048144 | A1 | 4/2002 | Sugo et al. |
| 2003/0154858 | A1 | 8/2003 | Kleut et al. |
| 2003/0221363 | A1 | 12/2003 | Reed |
| 2004/0045215 | A1 | 3/2004 | Guilfoyle |
| 2004/0178052 | A1 | 9/2004 | Antal |
| 2005/0095183 | A1 | 5/2005 | Rehmat et al. |
| 2005/0258093 | A1 | 11/2005 | Cueman et al. |
| 2005/0274068 | A1 | 12/2005 | Morton et al. |
| 2005/0279696 | A1 | 12/2005 | Bahm et al. |
| 2006/0048646 | A1 | 3/2006 | Olson et al. |
| 2006/0120934 | A1 | 6/2006 | Lanier et al. |
| 2006/0278040 | A1 | 12/2006 | Harada et al. |
| 2006/0280669 | A1 | 12/2006 | Jones |
| 2007/0006526 | A1 | 1/2007 | Cullen |
| 2007/0034126 | A1 | 2/2007 | Chen et al. |
| 2007/0125228 | A1 | 6/2007 | Alizadeh-Khiavi et al. |
| 2007/0220805 | A1 | 9/2007 | Leveson et al. |
| 2007/0261295 | A1 | 11/2007 | Tolmie |
| 2008/0281673 | A1 | 11/2008 | Davis et al. |
| 2009/0031616 | A1 | 2/2009 | Agblevor |
| 2009/0056205 | A1 | 3/2009 | Gauthier et al. |
| 2009/0151251 | A1 | 6/2009 | Manzer et al. |
| 2009/0188160 | A1 | 7/2009 | Liu |
| 2009/0205546 | A1 | 8/2009 | Kluko |
| 2009/0272946 | A1 | 11/2009 | Lu |
| 2009/0314185 | A1 | 12/2009 | Whellock |
| 2010/0115841 | A1 | 5/2010 | Cork |
| 2010/0139155 | A1 | 6/2010 | Mennell et al. |
| 2010/0228062 | A1 | 9/2010 | Babicki et al. |
| 2010/0273899 | A1 | 10/2010 | Winter |
| 2010/0289270 | A1 | 11/2010 | Behrens et al. |
| 2010/0300866 | A1 | 12/2010 | van Aardt et al. |
| 2011/0002086 | A1 | 1/2011 | Feaver et al. |
| 2011/0011721 | A1 | 1/2011 | Champagne |
| 2011/0071022 | A1 | 3/2011 | Bandosz et al. |
| 2011/0099887 | A1 | 5/2011 | Stinson et al. |
| 2011/0099890 | A1 | 5/2011 | Bohlig et al. |
| 2011/0219679 | A1 | 9/2011 | Budarin et al. |
| 2011/0287999 | A1 | 11/2011 | Dubois |
| 2011/0296745 | A1 | 12/2011 | Hilten et al. |
| 2012/0021123 | A1 | 1/2012 | Leveson et al. |
| 2012/0023809 | A1 | 2/2012 | Koch et al. |
| 2012/0125064 | A1 | 5/2012 | Joseph et al. |
| 2012/0172216 | A1 | 7/2012 | Böhringer et al. |
| 2012/0174475 | A1 | 7/2012 | Mennell et al. |
| 2012/0174476 | A1 | 7/2012 | Mennell et al. |
| 2012/0282465 | A1 | 11/2012 | Kadam et al. |
| 2012/0285080 | A1 | 11/2012 | Despen et al. |
| 2012/0286211 | A1 | 11/2012 | Cheiky et al. |
| 2012/0289752 | A1 | 11/2012 | Gosselink et al. |
| 2013/0022771 | A1 | 1/2013 | Malet et al. |
| 2013/0145684 | A1 | 6/2013 | Mennell et al. |
| 2013/0152461 | A1 | 6/2013 | Mennell et al. |
| 2013/0295628 | A1 | 11/2013 | Retsina et al. |
| 2013/0326935 | A1 | 12/2013 | Kimball |
| 2014/0075832 | A1 | 3/2014 | Mennell et al. |
| 2014/0075834 | A1 | 3/2014 | Mennell |
| 2014/0332363 | A1 | 11/2014 | Durand et al. |
| 2014/0338576 | A1 | 11/2014 | Mennell et al. |
| 2015/0024328 | A1 | 1/2015 | Grill |
| 2015/0114908 | A1 | 4/2015 | Traxler et al. |
| 2015/0126362 | A1 | 5/2015 | Mennell et al. |
| 2015/0144831 | A1 | 5/2015 | Mennell et al. |
| 2015/0196896 | A1 | 7/2015 | Mennell et al. |
| 2016/0068759 | A1 | 3/2016 | Ellens et al. |
| 2016/0114308 | A1 | 4/2016 | Despen et al. |
| 2016/0145519 | A1 | 5/2016 | Walter |
| 2016/0244686 | A1 | 8/2016 | Dickinson |
| 2016/0280554 | A1 | 9/2016 | Despen et al. |
| 2016/0304787 | A1 | 10/2016 | Aelion et al. |
| 2017/0137294 | A1 | 5/2017 | Marker et al. |
| 2017/0145444 | A1 | 5/2017 | Hill et al. |
| 2017/0152440 | A1 | 6/2017 | Wilson et al. |
| 2017/0197192 | A1 | 7/2017 | Malyala et al. |
| 2017/0321139 | A1 | 11/2017 | Despen et al. |
| 2018/0119040 | A1 | 5/2018 | Waanders et al. |
| 2018/0127672 | A1 | 5/2018 | Mennell et al. |
| 2018/0208852 | A1 | 7/2018 | Marsh |
| 2018/0291276 | A1 | 10/2018 | Gangwal et al. |
| 2018/0327329 | A1 | 11/2018 | Bontchev et al. |
| 2019/0002323 | A1 | 1/2019 | Benedek et al. |
| 2019/0264121 | A1 | 8/2019 | China |
| 2020/0055736 | A1 | 2/2020 | Mennell et al. |
| 2020/0056098 | A1 | 2/2020 | Seidner |
| 2020/0140901 | A1 | 5/2020 | Foody et al. |
| 2020/0255660 | A1 | 8/2020 | McGolden |
| 2020/0318018 | A1 | 10/2020 | Germanaud et al. |
| 2020/0381732 | A1 | 12/2020 | Wagner et al. |
| 2021/0009427 | A1 | 1/2021 | Mennell et al. |
| 2021/0155481 | A1 | 5/2021 | Kim et al. |
| 2021/0214617 | A1 | 7/2021 | Seidner |
| 2021/0220801 | A1 | 7/2021 | Mennell et al. |
| 2022/0098700 | A1 | 3/2022 | Mennell et al. |
| 2022/0098701 | A1 | 3/2022 | Mennell et al. |
| 2022/0228080 | A1 | 7/2022 | Mennell et al. |
| 2022/0228082 | A1 | 7/2022 | Mennell et al. |
| 2022/0267869 | A1 | 8/2022 | Mennell et al. |
| 2022/0340818 | A1 | 10/2022 | Mennell et al. |
| 2022/0396529 | A1 | 12/2022 | Mennell et al. |
| 2023/0015387 | A1 | 1/2023 | Slack et al. |
| 2023/0020752 | A1 | 1/2023 | Slack et al. |
| 2023/0045385 | A1 | 2/2023 | Mennell et al. |

FOREIGN PATENT DOCUMENTS

| | | |
|---|---|---|
| CN | 101775301 | 7/2010 |
| CN | 101805626 A | 8/2010 |
| CN | 101525118 | 12/2010 |
| CN | 102208598 | 10/2011 |
| CN | 103866072 | 6/2014 |
| CN | 108865195 | 11/2018 |
| CN | 110438335 | 8/2020 |
| DE | 202009010612 | 10/2009 |
| EP | 0930091 | 7/1999 |
| EP | 2199365 | 6/2010 |
| GB | 1412407 | 11/1975 |
| GB | 2460064 | 11/2009 |
| JP | S47013408 | 4/1972 |
| JP | S54135666 | 10/1972 |
| JP | S55136116 | 10/1980 |
| JP | BS58-28203 | 6/1983 |
| JP | S60238144 | 11/1985 |
| JP | H0564789 | 3/1993 |
| JP | 06-88077 | 3/1994 |
| JP | AH9-29236 | 2/1997 |
| JP | 10-208985 | 8/1998 |
| JP | 2000-157832 | 6/2000 |
| JP | 2000-212568 | 8/2000 |
| JP | 2000-265186 | 9/2000 |
| JP | 2001-239122 | 9/2001 |
| JP | 2001-300497 | 10/2001 |
| JP | 2002-211911 | 7/2002 |
| JP | 2002-226865 | 8/2002 |
| JP | 2002-255796 | 9/2002 |
| JP | 2002-289683 | 10/2002 |
| JP | 2003-038941 | 2/2003 |
| JP | 2003-213273 | 7/2003 |
| JP | 2003-238136 | 8/2003 |

(56) References Cited

FOREIGN PATENT DOCUMENTS

| | | |
|---|---|---|
| JP | 2003-251398 | 9/2003 |
| JP | 2003-286021 | 10/2003 |
| JP | 2004-912 | 1/2004 |
| JP | 2004-534641 | 11/2004 |
| JP | 2005-230810 | 9/2005 |
| JP | 2005-263547 | 9/2005 |
| JP | 2005-298602 | 10/2005 |
| JP | 2005-334737 | 12/2005 |
| JP | 2006-188366 | 7/2006 |
| JP | 2006-263513 | 10/2006 |
| JP | 2006-315899 | 11/2006 |
| JP | 2008-037931 | 2/2008 |
| JP | 2008-136558 | 6/2008 |
| JP | 2008-222901 | 9/2008 |
| JP | 2008-284520 | 11/2008 |
| JP | 2009-125070 | 6/2009 |
| JP | 2010-194502 | 9/2010 |
| JP | 2010-202298 | 9/2010 |
| JP | 2010-222474 | 10/2010 |
| JP | 2011-516263 | 5/2011 |
| JP | 2011-161330 | 8/2011 |
| JP | 2011-230038 | 11/2011 |
| JP | 2011-240329 | 12/2011 |
| JP | 2006-96615 | 12/2012 |
| JP | 2013-082588 | 5/2013 |
| KR | 101479906 | 1/2015 |
| RU | 2662440 | 7/2018 |
| RU | 2729810 | 8/2020 |
| TW | 501939 | 9/2002 |
| WO | WO 1990/01529 | 2/1990 |
| WO | WO 2000/071936 | 11/2000 |
| WO | WO 2002/069351 | 9/2002 |
| WO | WO 2005/049530 | 6/2005 |
| WO | WO 2006/122405 | 11/2006 |
| WO | WO 2007/147244 | 12/2007 |
| WO | WO 2008/022461 | 2/2008 |
| WO | WO 2008/076944 | 6/2008 |
| WO | WO 2008/144416 | 11/2008 |
| WO | WO 2009/018469 | 2/2009 |
| WO | WO 2009/105441 | 8/2009 |
| WO | WO 2009/158709 | 12/2009 |
| WO | WO 2010/110470 | 9/2010 |
| WO | WO 2010/128055 | 11/2010 |
| WO | WO 2010/129996 | 11/2010 |
| WO | WO 2010/132970 | 11/2010 |
| WO | WO 2011/045473 | 4/2011 |
| WO | WO 2011/053668 | 5/2011 |
| WO | WO 2011/065484 | 6/2011 |
| WO | WO 2011/081086 | 7/2011 |
| WO | WO 2011/093294 | 8/2011 |
| WO | WO 2011/119961 | 9/2011 |
| WO | WO 2011/162727 | 12/2011 |
| WO | WO 2012/142486 | 10/2012 |
| WO | WO 2012/142488 | 10/2012 |
| WO | WO 2012/142489 | 10/2012 |
| WO | WO 2012/142491 | 10/2012 |
| WO | WO 2013/169803 | 11/2013 |
| WO | WO 2013/169806 | 11/2013 |
| WO | WO 2013/169811 | 11/2013 |
| WO | WO 2013/172705 | 11/2013 |
| WO | WO 2013/187940 | 12/2013 |
| WO | WO 2015/061701 | 4/2015 |
| WO | WO 2015/109206 | 7/2015 |
| WO | WO 2015/127460 | 8/2015 |
| WO | WO 2016/065357 | 4/2016 |
| WO | WO 2017/002096 | 1/2017 |
| WO | WO 2019/200424 | 10/2019 |
| WO | WO 2020/219635 | 10/2020 |

OTHER PUBLICATIONS

Designation: D6556-14 ASTB Standard Test Method for Carbon Black—Total and External Surface Area by Nitrogen Adsorption 1, pp. 1-5 (publication date: Jan. 1, 2014).

Du et al., "Determination of iodine number of activated carbon by the method of ultraviolet-visible spectroscopy," Materials Letters, 285:129137 (2021).

Gómez-Serrano et al., "Nitrogen adsorption isotherms on carbonaceous materials. Comparison of BET and Langmuir surface areas," Powder Technology, 116:103-108 (publication date: May 2001).

Gong et al., "Direct reduction of iron oxides based on stream reforming of bio-oil: a highly efficient approach for production of DRI from bio-oil and iron ores," Green Chemistry 11(12):2001-2012 (publication date: Jan. 1, 2009).

Guo et al., "Direct reduction of oxidized iron ore pellets using biomass syngas as the reducer," Fuel Process Technology 148:276-281 (epublication date: Mar. 22, 2016).

International Search Report and Written Opinion dated Feb. 16, 2024 for International Application No. PCT/US2023/035676, 14 pages.

International Search Report and Written Opinion dated Mar. 19, 2024 for International Application No. PCT/US2023/085470, 9 pages.

Nogueira et al., "Production of Self-Reducing Pellets From Organic Household Waste," Technical contribution at the 45th Seminar for Reduction of Iron Ore and Raw Materials, 16th Brazilian Symposium for Iron Ore, and 3rd Brazilian Symposium for Iron Ore Agglomeration, an integral part of ABM Week, held from Aug. 17, 2015 Rio de Janeiro, RJ, Brazil.

Wei et al., "Current status and potential of biomass utilization in ferrous metallurgical industry," Renewable and Sustainable Energy Reviews 68:511-524 (epublication date: Oct. 21, 2016).

Andi Supangat et al., "Method for producing activated carbon from combustion of e.g. bamboo, involves naturally removing and cooling furnace material which is separate module of furnace fuel, but closing exhaust holes, when burning process is not sufficient," ID 20121099A (publication date: Mar. 1, 2012).

Antal et al., "The Art, Science and Technology of Charcoal Production," Ind. Eng. Chem. Res., 42:1619-1640 (publication date: Mar. 14, 2003).

Ayanda et al., "Activated Carbon-Fly Ash-Nanometal Oxide Composite Materials: Preparation, Characterization, and Tributyltin Removal Efficiency," Journal of Chemistry. vol. 2013 (2013).

Baldock, "Chemical composition and bioavailability of thermally altered *Pinus resinosa* (Red pine) wood," Org. Geochem., vol. 33(9), pp. 1093-1109 (publication date: Sep. 2002).

Biermann et al., "Carbon Allocation in Multi-Product Steel Mills That Co-process Biogenic and Fossil Feedstocks and Adopt Carbon Capture Utilization and Storage Technologies," Frontiers in Chemical Engineering (publication date: Dec. 9, 2020).

Brodowski, "Morphological and Chemical Properties of Black Carbon in Physical Soil Fractions as Revealed by Scanning Electron Microscopy and Energy-Dispersive X-ray Spectroscopy," Geoderma, vol. 128, pp. 116-129 (publication date: Sep. 2005).

Bronson, Benjamin, "The Effects of Feedstock Pre-treatment on the Fluidized Bed Gasification of Biomass," Thesis submitted to the Faculty of Graduate and Postdoctoral Studies in partial fulfilment of the requirements for M.A.Sc. In Chemical Engineering, University of Ottawa (2014).

Cheng et al., "Oxidatin of black carbon by biotic and abiotic processes," Organic Geochemistry 37:1477-1488 (publication date: Nov. 2006).

Cleveland, Cutler J. and Morris, Christopher. Dictionary of Energy (Expanded Edition)—passive solar cooling (pp 373). Elsevier. (2009).

De Mattos Carneiro-Junior et al., "Valorization of Prosopis juliflora Woody Biomass in Northeast Brazilian through Dry Torrefaction," Energies, Energies Jun. 11, 2021, 14, 3465.

Demirbas et al., "Estimating the Calorific Values of Lignocellulosic Fuels," Energy Exploration & Exploitation 22(2):135-143 (publication date: Apr. 1, 2004).

Demirbas, "Effects of Temperature and Particle Size on Bio-Char Yield from Pyrolysis of Agricultural Residues," J. Anal. Appl. Pyrolysis, vol. 72, pp. 243-248 (publication date: Nov. 2004).

Di Felice et al., "Biomass Gasification with Catalytic Tar Reforming: A Model Study into Activity Enhancement of Calcium - and

(56) References Cited

OTHER PUBLICATIONS

Magnesium-Oxide-Based Catalytic Materials by Incorporation of Iron," Energy Fuels vol. 24, pp. 4034-4045 (publication date: Jun. 25, 2010).
Du, "Some Thoughts on the Chemical Compositions of Fly Ash: ICAR's 17th Annual Symposium. The University of Texas at Austin," (2009).
Edgehill et al. "Adsorption Characteristics of Carbonized Bark for Phenol and Pentachlorophenol," (publication date: Mar 26, 1999).
Freese et al. "Powdered Activated Carbon: Can This Be Effectively Assessed in the Laboratory," (publication date: May 28-Jun. 1, 2000).
Gonzalez et al., "Pyrolysis of various biomass residues and char utilization for the production of activated carbons," J. Anal. Appl. Pyrolysis, 85:134-141 (epublication date: Dec. 3, 2008).
Gudka et al., A review of the mitigation of deposition and emission problems during biomass combustion through washing pre-treatment, Journal of the Energy Institute (Published May 2016), vol. 89, Issue 2, May 2016, pp. 159-171.
Gupta et al., "Utilisation of bagasse fly ash (a sugar industry waste) for the removal of copper and zinc from wastewater," Separation and Purification Technology Journal. vol. 18, Issue 2, pp. 131-140 (publication date: Mar. 2000).
Hamer, "Interactive Priming of Black Carbon and Glucose Mineralisation," Org. Geochem., vol. 35, Issue 7, pp. 823-830 (publication date: Jul. 2004).
Hardman et al., "Studies of Spontaneous Combustion in Beds of Activated Carbon," Fuel, IPC Science and Technology Press, vol. 59, No. 3, pp. 151-156 (publication date: Mar. 1980).
Horst-Günter Brocksiepe et al., "Charcoal," Ullmann, 8:93-98 (epublication date: Jun. 15, 2000).
Hung, "The Production of Activated Carbon from Coconut Shells Using Pyrolysis and Fluidized Bed Reactors. A Thesis Submitted to the Honors College," The University of Arizona, May 2012, [retrieved on May 4, 2015] [retrieved from the internet] <URL: http://arizona/openrepository.com/arizona/bitstream/10150/243968/1/azuetdmr_2012_0079_sip1_m.pdf> Abstract, pp. 8, 9, 12, 31-33.
Hwang et al., "Characterization of char derived from various types of solid wastes from the standpoint of fuel recovery and pretreatment before landfilling," Waste Management 27(9):1155-1166 (epublication date: Aug. 22, 2006).
International Search Report and Written Opinion dated Apr. 1, 2022 for International Application No. PCT/US2022/013151.
International Search Report and Written Opinion dated Apr. 1, 2022 for International Application No. PCT/US2022/013156.
International Search Report and Written Opinion dated Feb. 8, 2022 for International Application No. PCT/US2021/60071.
International Search Report and Written Opinion dated Feb. 8, 2022 for International Application No. PCT/US21/60053.
International Search Report and Written Opinion dated Jul. 15, 2022 for International Application No. PCT/US2022/026591.
International Search Report and Written Opinion dated Jul. 19, 2022 for International Application No. PCT/US2022/026597.
International Search Report and Written Opinion dated Mar. 20, 2023 for International Application No. PCT/US2022/049237.
International Search Report and Written Opinion dated Mar. 29, 2023 for International Application No. PCT/US2022/049240.
International Search Report and Written Opinion dated Nov. 17, 2022 for International Application No. PCT/US2022/039119.
International Search Report and Written Opinion dated Oct. 11, 2022 for International Application No. PCT/US2022/036282.
International Search Report and Written Opinion dated Oct. 11, 2022 for International Application No. PCT/US2022/036292.
International Search Report and Written Opinion dated Oct. 19, 2022 for International Application No. PCT/US2022/039116.
International Search Report and Written Opinion dated Oct. 6, 2022 for International Application No. PCT/US2022/036294.
Iqbaldin et al., "Properties of coconut shell activated carbon," Journ. Tropical Forest Science, 25(4):497-503 (publication date: Oct. 2013).

Jha et al., "Sorption properties of the activated carbon-zeolite composite prepared from coal fly ash for Ni(2+), Cu(2+), Cd(2+) and Pb(2+)," Journal of Hazardous Materials. vol. 160, Issue 1 pp. 148-53 (publication date: Dec. 15, 2008, epublication date: Mar. 6, 2008).
Keiluweit et al., "Dynamic Molecular Structure of Plant Biomass-Derived Black Carbon (Biochar)," Environ. Sci. Technol. 44:1247-1253 (epublication date: Jan. 25, 2010).
Khan et al., "Removal of trace elements from Thar coal to minimize its hazardous effect on the environment," Journal of Himalayan Earth Sciences 49(1):50-57 (2016).
Kuzyakov, "Black Carbon Decomposition and Incorporation into Soil Microbial Biomass Estimated by 14C Labeling," Soil Bio & Biochem., vol. 4, pp. 210-219 (publication date: Feb. 2009).
Lakdawala et al., "The effect of low cost material Bagasse Fly ash to the removal of COD Contributing component of combined waste water of Sugar Industry," Scholars Research Library (publication date: Apr. 2012).
Lehmann, "Bio-energy in the black," Front. Ecol. Enviorn., vol. 5(7), pp. 381-387 (publication date: Sep. 1, 2007).
Mackay, "The Dependence of Char and Carbon Yield on Lignocel-lulosic Precursor Composition," Carbon, col. 20(2), pp. 87-94 (1982).
Martin et al., "Gasification and Production of Biochar from Waste-water Grown Algae," Water New Zealand Annual Conference, Sep. 22-24, 2010, XP055337229, Retrieved from the Internet: URL: https://www.waternz.org.nz/Attachment?Action=Download&Attachment_id=1127 [retrieved on Jan. 20, 2017].
Novack, "Impact of Biochar Amendment on Fertility of a South-eastern Coastal Plain Soil," Soil Sci., vol. 174(2), pp. 105-112 (publication date: Feb. 2009).
PCT/US2009/069133 International Search Report and Written Opinion dated Jul. 26, 2011.
PCT/US2009/069403 International Search Report and Written Opinion dated Jul. 26, 2011.
PCT/US2012/033624 International Search Report dated Sep. 17, 2012.
PCT/US2012/033627 International Search Report dated July 13, 2012.
PCT/US2012/033628 International Search Report dated Jul. 6, 2012.
PCT/US2012/033630 International Search Report dated Aug. 21, 2012.
PCT/US2012/033630 Written Opinion dated Aug. 21, 2012.
PCT/US2013/039981 International Search Report dated Oct. 22, 2013.
PCT/US2013/039986 International Search Report dated Oct. 26, 2013.
PCT/US2013/039991 International Search Report dated Dec. 16, 2013.
PCT/US2014/062202 International Search Report and Written Opinion dated Feb. 3, 2015.
PCT/US2015/011787 International Search Report dated Jun. 11, 2015.
PCT/US2015/017351 International Search Report dated May 15, 2015.
PCT/US2015/57370 International Search Report dated Jan. 8, 2016.
Phasee et al., "An investigation on mechanical property of MSW-derived fuel pellet produced from hydrothermal treatement," Journal of Material Cycles and Waste Management, 20:2028- 2040 (publication date: Jun. 15, 2018).
Phyllis Database Phyllis2—ECN Phyllis classification https://phylis.nl/Browse/Standard/ECN-Phyllis#pyrolisis (2015).
Purnomo et al., "Preparation and characterization of activated carbon from bagasse fly ash," Journal of Analytical and Applied Pyrolysis. vol. 91, Issue 1, pp. 257-262 (publication date: May 2011).
Ruksathamcharoen et al., "Effects of hydrothermal treatment and pelletizing temperature on the mechanical properties of empty fruit bunch pellets," Applied Energy, 113385 (epublication date: May 18, 2019).

(56)                    References Cited

OTHER PUBLICATIONS

Saravanakumar et al., "Experimental investigations of long stick wood gasification in a bottom lit updraft fixed bed gasifier," Fuel Processing Technology, 88(6):617-622 (publication date: Jun. 2007).

Shinogi et al., "Pyrolysis of plant, animal and human waste: physical and chemical characterization of the pyrolytic products," Bioresource Technology 90:241-247 (publication date: Dec. 2003).

Tanzer et al., "Can bioenergy with carbon capture and storage result in carbon negative steel?" 100:1-15, International Journal of Greenhouse Gas Control (publication date: Jul. 24, 2020) (Abstract only).

Tay et al., "Preparation and characterization of activated carbon from waste biomass," Journal of Hazardous Materials ND 165(1-3):481-485 (publication date: Jun. 15, 2009).

Ueda, Shigeru et al., "Improvement of Reactivity of Carbon Iron Ore Composite with Biomass Char for Blast Furnace," ISIJ International (2009) 49(10):1505-1512.

Warnecke, "Gasification of biomass: comparison of fixed bed and fluidized bed gasifier," Biomass & Bioenergy, 18:489-497 (2000).

Wretborn, "Pyrolysis of Wood Chips: Influence of Pyrolysis Conditions on Charcoal Yield and Charcoal Reactivity," Degree Project, Energy Engineering, masters level 2016.

Yan et al., "Thermal Pretreatment of Lignocellulosic Biomass," Environmental Progress and Sustainable Energy, vol. 28, No. 3, pp. 435-440 (epublication date: Aug. 5, 2009).

Yang et al., "Harmonized comparison of virgin steel production using biomass with carboncapture and storage for negative emissions," 112:1-33, International Journal of Greenhouse Gas Control (publication date: Nov. 23, 2021).

Ikuo Abe, "Sumino Kyuchaku no Himitsu" (Secret of Adsorption of Charoal), Rinsan Shi Dayori, p. 5-9 (Dec. 1995) with English summary.

Kumar et al., "Effects of Carbonisation conditions on the Yield and Chemical Composition of *Acacia* and *Eucalyptus* Wood Chars," Biomass and Bioenergy 3(6):411-417 (1992).

* cited by examiner (A)

(B)

BIOGENIC ACTIVATED CARBON AND METHODS OF MAKING AND USING SAME

CROSS-REFERENCE TO RELATED APPLICATION(S)

The present application is a continuation of U.S. patent application Ser. No. 16/922,556, filed Jul. 7, 2020, which is continuation of U.S. patent application Ser. No. 16/574,544, filed on Sep. 18, 2019 (now U.S. Pat. No. 11,285,454), which is a continuation of U.S. patent application Ser. No. 14/399,793, filed on Nov. 7, 2014, which is a 371 U.S. National Stage application of PCT/US13/39981, filed on May 7, 2013, which claims priority to U.S. Provisional Patent Application Nos. 61/737,514, 61/721,827 and 61/643, 741, filed on Dec. 14, 2012, Nov. 2, 2012 and May 7, 2012, respectively, the entireties of each of the foregoing which are incorporated herein by reference.

FIELD OF THE INVENTION

The present disclosure generally relates to processes, systems, and apparatus for the production of biogenic activated carbon, to biogenic activated carbon and to uses of biogenic activated carbon including emissions control.

BACKGROUND

Activated carbon was first produced commercially at the beginning of the 20th century and was used initially to decolorize sugar, then later to remove taste and odor from water. Granular activated carbon was first developed for gas masks and has been used subsequently for a variety of additional purposes such as solvent recovery and air purification. Processes to produce activated carbon generally require large energy inputs and suffer from low yields. Most processes require two distinct steps: pyrolysis of the carbonaceous raw material followed by activation of the pyrolyzed solids. Pyrolysis typically involves directly heating the carbonaceous substrate in a low-oxygen environment. Activation generally involves application of steam or carbon dioxide to increase surface area of the pyrolyzed solids.

SUMMARY

In one embodiment, the present disclosure provides a biogenic activated carbon composition comprising, on a dry basis, about 55 wt % or more total carbon, about 15 wt % or less hydrogen, and less than or equal to about 1 wt % nitrogen; wherein said activated carbon composition is characterized by an Iodine Number higher than about 500, and optionally wherein said composition is responsive to an externally applied magnetic field.

In another embodiment, the present disclosure provides a biogenic activated carbon composition comprising, on a dry basis, about 55 wt % or more total carbon, about 15 wt % or less hydrogen, and less than or equal to about 1 wt % nitrogen; wherein said activated carbon composition is characterized by an Iodine Number higher than about 500, and optionally wherein at least a portion of said carbon is present in the form of graphene.

In another embodiment, the present disclosure provides a biogenic activated carbon composition comprising, on a dry basis, about 55 wt % or more total carbon, about 15 wt % or less hydrogen, less than or equal to about 1 wt % nitrogen, and from about 0.0001 wt % to about 5 wt % iron; wherein at least a portion of said carbon is present in the form of graphene, wherein said activated carbon composition is characterized by an Iodine Number higher than about 500, and wherein said composition is responsive to an externally applied magnetic field.

In another embodiment, the present disclosure provides a biogenic activated carbon composition comprising, on a dry basis, about 55 wt % or more total carbon, about 15 wt % or less hydrogen, less than or equal to about 1 wt % nitrogen, and from about 0.1 wt % to about 5 wt % iron; wherein said activated carbon composition is characterized by an Iodine Number higher than about 500, and wherein said composition is responsive to an externally applied magnetic field.

In another embodiment, the present disclosure provides a biogenic activated carbon composition comprising, on a dry basis, about 55 wt % or more total carbon, about 15 wt % or less hydrogen, and less than or equal to about 1 wt % nitrogen; wherein said activated carbon composition is characterized by an Iodine Number higher than about 500, and wherein at least a portion of said carbon is present in the form of graphene.

In another embodiment, the present disclosure provides a biogenic graphene-containing product characterized by an Iodine Number higher than about 500.

In another embodiment, the present disclosure provides a composition comprising graphene, wherein the graphene is derived from a biogenic activated carbon composition comprising, on a dry basis, about 55 wt % or more total carbon, about 15 wt % or less hydrogen, and less than or equal to about 1 wt % nitrogen; wherein at least a portion of said carbon is present in the form of graphene.

In another embodiment, the present disclosure provides a continuous process for producing biogenic activated carbon, said process comprising: (a) providing a carbon-containing feedstock comprising biomass; (b) optionally drying said feedstock to remove at least a portion of moisture from said feedstock; (c) in one or more indirectly heated reaction zones, mechanically countercurrently contacting said feedstock with a vapor stream comprising a substantially inert gas and an activation agent comprising at least one of water or carbon dioxide, to generate solids, condensable vapors, and non-condensable gases, wherein said condensable vapors and said non-condensable gases enter said vapor stream; (d) removing at least a portion of said vapor stream from said reaction zone, to generate a separated vapor stream; (e) recycling at least a portion of said separated vapor stream, or a thermally treated form thereof, to said feedstock prior to step (c) and/or to a gas inlet of said reaction zone(s); and (f) recovering at least a portion of said solids from said reaction zone(s) as biogenic activated carbon.

In another embodiment, the present disclosure provides a continuous process for producing biogenic activated carbon, said process comprising: (a) providing a starting carbon-containing feedstock comprising biomass; (b) optionally drying said carbon-containing feedstock to remove at least a portion of moisture therefrom; (c) in one or more indirectly heated reaction zones, mechanically conveying said feedstock and countercurrently contacting said feedstock with a vapor stream comprising a substantially inert gas and an activation agent including at least one of water or carbon dioxide, to generate solids, condensable vapors, and non-condensable gases, wherein said condensable vapors and said non-condensable gases enter said vapor stream; (d) removing at least a portion of said vapor stream from said reaction zone, to generate a separated vapor stream; (e) introducing a carbon-containing liquid or vapor stream from an external source to said feedstock prior to step (c) and/or to a gas inlet of said reaction zone(s); and (f) recovering at least a portion of said solids from said reaction zone(s) as biogenic activated carbon.

In another embodiment, the present disclosure provides a continuous process for producing graphene-containing biogenic activated carbon, said process comprising: (a) providing a starting carbon-containing feedstock comprising biomass; (b) optionally drying said carbon-containing feedstock to remove at least a portion of moisture from said carbon-containing feedstock; (c) in one or more indirectly heated reaction zones, mechanically conveying said feedstock and countercurrently contacting said feedstock with a vapor stream comprising a substantially inert gas and an activation agent including at least one of water or carbon dioxide, to generate solids, condensable vapors, and non-condensable gases, wherein said condensable vapors and said non-condensable gases enter said vapor stream; (d) removing at least a portion of said vapor stream from said reaction zone, to generate a separated vapor stream; (e) recycling at least a portion of said separated vapor stream, or a thermally treated form thereof, to said feedstock prior to step (c) and/or to a gas inlet of said reaction zone(s); and (f) recovering at least a portion of said solids from said reaction zone(s), wherein said solids include graphene-containing biogenic activated carbon.

In another embodiment, the present disclosure provides a continuous process for producing graphene-containing biogenic activated carbon, said process comprising: (a) providing a starting carbon-containing feedstock comprising biomass; (b) optionally drying said carbon-containing feedstock to remove at least a portion of moisture from said feedstock; (c) in one or more indirectly heated reaction zones, mechanically conveying said feedstock and countercurrently contacting said feedstock with a vapor stream comprising a substantially inert gas and an activation agent comprising at least one of water or carbon dioxide, to generate solids, condensable vapors, and non-condensable gases, wherein said condensable vapors and said non-condensable gases enter said vapor stream; (d) removing at least a portion of said vapor stream from said reaction zone, to generate a separated vapor stream; (e) recycling at least a portion of said separated vapor stream, or a thermally treated form thereof, to said feedstock prior to step (c) and/or to a gas inlet of said reaction zone(s), to increase the surface area of carbon in said solids; and (f) recovering at least a portion of said solids from said reaction zone(s) as biogenic activated carbon, wherein said biogenic activated carbon comprises, on a dry basis, about 55 wt % or more total carbon, about 15 wt % or less hydrogen, and less than or equal to about 1 wt % nitrogen, wherein at least a portion of said biogenic activated carbon is present in the form of graphene, wherein said biogenic activated carbon composition is characterized by an Iodine Number higher than about 500, and wherein said biogenic activated carbon is responsive to an externally applied magnetic field.

In another embodiment, the present disclosure provides a method of reducing or removing at least one contaminant from a gas-phase emission stream, said method comprising: (a) providing a gas-phase emissions stream comprising at least one contaminant; (b) contacting the gas-phase emissions stream with an additive and activated carbon particles comprising a biogenic activated carbon composition to generate contaminant-adsorbed particles; and (c) separating at least a portion of said contaminant-adsorbed particles from said gas-phase emissions stream to produce a contaminant-reduced gas-phase emissions stream.

In another embodiment, the present disclosure provides a method of using a biogenic activated carbon composition to reduce mercury emissions, said method comprising: (a) providing a gas-phase emissions stream comprising mercury; (b) contacting the gas-phase emissions stream with activated-carbon particles comprising a biogenic activated carbon composition comprising iron or an iron-containing compound to generate mercury-adsorbed carbon particles; and (c) separating at least a portion of said mercury-adsorbed carbon particles from said gas-phase emissions stream using electrostatic precipitation, to produce a mercury-reduced gas-phase emissions stream.

In another embodiment, the present disclosure provides a process for producing energy comprising: (a) providing a carbon-containing feedstock comprising a biogenic activated carbon composition; and (b) oxidizing said carbon-containing feedstock to generate energy and a gas-phase emissions stream comprising at least one contaminant, wherein the biogenic activated carbon composition adsorbs at least a portion of the at least one contaminant.

In another embodiment, the present disclosure provides a method of using a biogenic activated carbon composition to purify a liquid, said method comprising: (a) providing a liquid comprising at least one contaminant; and (b) contacting said liquid with an additive and activated-carbon particles comprising a biogenic activated carbon composition to generate contaminant-adsorbed carbon particles and a contaminant-reduced liquid.

In another embodiment, the present disclosure provides a method of removing at least a portion of a sulfur contaminant from a liquid, said method comprising: (a) providing a liquid comprising a sulfur contaminant; and (b) contacting said liquid with an additive and activated-carbon particles comprising a biogenic activated carbon composition, wherein after step (b) at least a portion of the activated carbon particles comprises the sulfur contaminant.

In another embodiment, the present disclosure provides a process to reduce a concentration of sulfates in water, said process comprising: (a) providing a volume or stream of water comprising sulfates; and (b) contacting said water with an additive and activated-carbon particles comprising a biogenic activated carbon composition.

In another embodiment, the present disclosure provides a method of removing a sulfur contaminant from a gas-phase emissions stream, said method comprising: (a) providing a gas-phase emissions stream comprising at least one sulfur contaminant; (b) contacting the gas-phase emissions stream with an additive and activated-carbon particles comprising a biogenic activated carbon composition; and (c) separating at least a portion of said activated-carbon particles from said gas-phase emissions stream after step (b).

In another embodiment, the present disclosure provides a method of reducing or removing one or more contaminants from a gas or liquid, said method comprising: (a) providing a gas or liquid stream containing one or more contaminants; and (b) contacting said gas or liquid stream with a biogenic activated carbon composition comprising, on a dry basis, about 55 wt % or more total carbon, about 15 wt % or less hydrogen, and less than or equal to about 1 wt % nitrogen, and an Iodine Number of at least about 500, wherein said composition is responsive to an externally applied magnetic field.

In another embodiment, the present disclosure provides a method of reducing or removing one or more contaminants from a gas or liquid, said method comprising: (a) providing a gas or liquid stream containing one or more contaminants; and (b) contacting said gas or liquid stream with a biogenic activated carbon composition comprising, on a dry basis, about 55 wt % or more total carbon, about 15 wt % or less hydrogen, and less than or equal to about 1 wt % nitrogen, and an Iodine Number of at least about 500, wherein at least a portion of said carbon is present in the form of graphene.

In another embodiment, the present disclosure provides a method of reducing or removing a contaminant from a liquid or gas, said method comprising: (a) obtaining a biogenic activated carbon composition comprising, on a dry basis, about 55 wt % or more total carbon, about 15 wt % or less hydrogen, and less than or equal to about 1 wt % nitrogen, wherein at least a portion of said carbon is present in the form of graphene; (b) optionally separating said graphene from said biogenic activated carbon composition; and (c) contacting the liquid or gas with said graphene, in separated form or as part of said biogenic activated carbon composition.

In another embodiment, the present disclosure provides a method of using graphene, said method comprising: (a) obtaining a biogenic activated carbon composition comprising, on a dry basis, about 55 wt % or more total carbon, about 15 wt % or less hydrogen, and less than or equal to about 1 wt % nitrogen; wherein at least a portion of said carbon is present in the form of graphene; (b) optionally separating said graphene from said biogenic activated carbon composition; and (c) using said graphene, in separated form or as part of said biogenic activated carbon composition, in an adhesive, a sealant, a coating, a paint, an ink a composite material, a catalyst, a catalyst support, a battery electrode, a fuel cell electrode, a graphene-based circuit or memory system, an energy storage material or device, a supercapacitor, a sink for static electricity dissipation, a material or device for electronic or ionic transport, a high-bandwidth communication system, an infrared sensor, a chemical sensor, a biological sensor, an electronic display, a voltaic cell, or a graphene aerogel.

7

Figure 31:
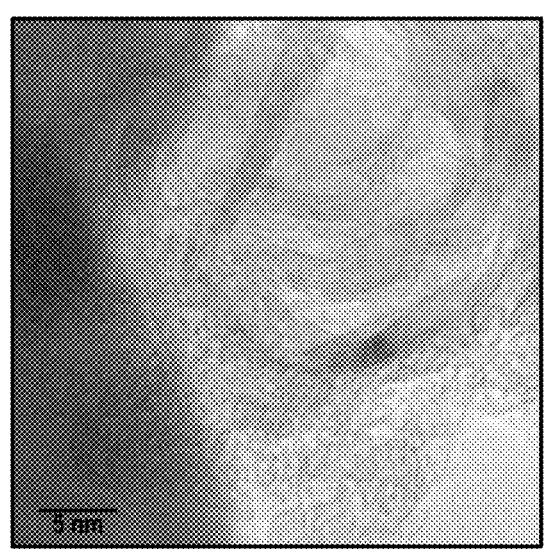

FIG. 31 is a transmission electron micrograph of activated carbon with an Iodine Number of 806. Parallel lines across image are atomically thin layers of graphene, while shorter curved segments are graphene crystallites.

DETAILED DESCRIPTION

This description will enable one skilled in the art to make and use the disclosure, and it describes several embodiments, adaptations, variations, alternatives, and uses of the disclosure. These and other embodiments, features, and advantages of the present disclosure will become more apparent to those skilled in the art when taken with reference to the following detailed description of the disclosure in conjunction with the accompanying drawings.

As used in this specification and the appended claims, the singular forms "a," "an," and "the" include plural referents unless the context clearly indicates otherwise. Unless defined otherwise, all technical and scientific terms used herein have the same meaning as is commonly understood by one of ordinary skill in the art to which this disclosure belongs.

Unless otherwise indicated, all numbers expressing reaction conditions, stoichiometries, concentrations of components, and so forth used in the specification and claims are to be understood as being modified in all instances by the term "about." Accordingly, unless indicated to the contrary, the numerical parameters set forth in the following specification and attached claims are approximations that may vary depending at least upon a specific analytical technique.

For present purposes, "biogenic" is intended to mean a material (whether a feedstock, product, or intermediate) that contains an element, such as carbon, that is renewable on time scales of months, years, or decades. Non-biogenic materials may be non-renewable, or may be renewable on time scales of centuries, thousands of years, millions of years, or even longer geologic time scales. Note that a biogenic material may include a mixture of biogenic and non-biogenic sources.

For present purposes, "reagent" is intended to mean a material in its broadest sense; a reagent may be a fuel, a chemical, a material, a compound, an additive, a blend component, a solvent, and so on. A reagent is not necessarily a chemical reagent that causes or participates in a chemical reaction. A reagent may or may not be a chemical reactant; it may or may not be consumed in a reaction. A reagent may be a chemical catalyst for a particular reaction. A reagent may cause or participate in adjusting a mechanical, physical, or hydrodynamic property of a material to which the reagent may be added. For example, a reagent may be introduced to a metal to impart certain strength properties to the metal. A reagent may be a substance of sufficient purity (which, in the current context, is typically carbon purity) for use in chemical analysis or physical testing.

Graphene is a monolayer of carbon atoms tightly packed into a two-dimensional honeycomb lattice, and is a basic building block for graphitic materials of other dimensionalities. Graphene can be wrapped up into zero-dimensional fullerenes, rolled into one-dimensional nanotubes, or stacked into three-dimensional graphite, for example. That is, although graphene is a single layer of atomic carbon, any number of layers (such as 1, 2, 3, 4, 5, 6, 7, 8, 9, 10 or more) may be present in any particular portion of a graphene-containing sample. As used herein, "graphene" refers to graphene in any of its forms, including related $sp^2$ graphitic allotropes that are typically planar, although not necessarily flat, single layers of graphene, and multiple layers of graphene. In one embodiment, the graphene is a one-atom thick planar sheet of $sp^2$-bonded carbon atoms that are in a hexagonal arrangement. In another embodiment, the graphene is a one-atom thick planar sheet of $sp^2$-bonded carbon atoms that are in a hexagonal arrangement in a honeycomb crystal lattice. In another embodiment, the graphene has a carbon-carbon bond length of about 0.142 nm. Unless the context dictates otherwise, all references to graphene include strictly a single layer as well as multiple layers of carbon atoms. Also, all references to graphene should be regarded as interchangeable with "biogenic graphene."

Biogenic activated carbon has relatively high carbon content compared to the initial feedstock utilized to produce the biogenic activated carbon. A biogenic activated carbon as provided herein will normally contain greater than about half its weight as carbon, since the typical carbon content of biomass is no greater than about 50 wt %. More typically, but depending on feedstock composition, a biogenic activated carbon will contain at least 55 wt %, at least 60 wt %, at least 65 wt %, at least 70 wt %, at least 75 wt %, at least 80 wt % 85 wt %, at least 90 wt %, at least 95 wt %, at least 96 wt %, at least 97 wt %, at least 98 wt %, at least 99 wt % carbon.

Notwithstanding the foregoing, the term "biogenic activated carbon" is used herein for practical purposes to consistently describe materials that may be produced by processes and systems of the disclosure, in various embodiments. Limitations as to carbon content, or any other concentrations, shall not be imputed from the term itself but rather only by reference to particular embodiments and equivalents thereof. For example it will be appreciated that a starting material having very low initial carbon content, subjected to the disclosed processes, may produce a biogenic activated carbon that is highly enriched in carbon relative to the starting material (high yield of carbon), but nevertheless relatively low in carbon (low purity of carbon), including less than or equal to about 50 wt % carbon.

"Pyrolysis" and "pyrolyze" generally refer to thermal decomposition of a carbonaceous material. In pyrolysis, less oxygen is present than is required for complete combustion of the material, such as less than or equal to about 10%, less than or equal to about 5%, less than or equal to about 1%, less than or equal to about 0.5%, less than or equal to about 0.1%, or less than or equal to about 0.01% of the oxygen that is required for complete combustion. In some embodiments, pyrolysis is performed in the absence of oxygen.

Exemplary changes that may occur during pyrolysis include any of the following: (i) heat transfer from a heat source increases the temperature inside the feedstock; (ii) the initiation of primary pyrolysis reactions at this higher temperature releases volatiles and forms a char; (iii) the flow of hot volatiles toward cooler solids results in heat transfer between hot volatiles and cooler unpyrolyzed feedstock; (iv) condensation of some of the volatiles in the cooler parts of the feedstock, followed by secondary reactions, can produce tar; (v) autocatalytic secondary pyrolysis reactions proceed while primary pyrolytic reactions simultaneously occur in competition; and (vi) further thermal decomposition, reforming, water-gas shift reactions, free-radical recombination, and/or dehydrations can also occur, which are a function of the residence time, temperature, and pressure profile.

Pyrolysis can at least partially dehydrate the feedstock. In various embodiments, pyrolysis removes greater than about 50%, greater than about 75%, greater than about 90%, greater than about 95%, greater than about 99%, or more than 99% of the water from the feedstock.

As discussed above, some variations of the disclosure are premised, at least in part, on the discovery that multiple reactors or multiple zones within a single reactor can be designed and operated in a way that optimizes carbon yield and product quality from pyrolysis, while maintaining flexibility and adjustability for feedstock variations and product requirements.

Generally speaking, temperatures and residence times are selected to achieve relatively slow pyrolysis chemistry. The benefit is potentially the substantial preservation of cell walls contained in the biomass structure, which means the final product can retain some, most, or all of the shape and strength of the starting biomass. In order to maximize this potential benefit, an apparatus that does not mechanically destroy the cell walls or otherwise convert the biomass particles into small fines can be utilized. Various reactor configurations are discussed following the process description below.

Additionally, if the feedstock is a milled or sized feedstock, such as wood chips or pellets, it may be desirable for the feedstock to be carefully milled or sized. Careful initial treatment will tend to preserve the strength and cell-wall integrity that is present in the native feedstock source (e.g., trees). This can also be important when the final product should retain some, most, or all of the shape and strength of the starting biomass.

In various embodiments, measures are taken to preserve the vascular structure of woody feedstock to create greater strength in biogenic activated carbon products. For example, and without limitation, in various embodiments the feedstock is prepared by drying feedstock over an extended period of time, for example over a period of time of no less than 1 hour, no less than about 2 hours, no less than about 3 hours, no less than about 4 hours, no less than about 5 hours, no less than about 6 hours, no less than about 7 hours, no less than about 8 hours, no less than about 9 hours, no less than about 10 hours, no less than about 11 hours, no less than about 12 hours, no less than about 13 hours, no less than about 14 hours, no less than about 15 hours, no less than about 16 hours, no less than about 17 hours, no less than about 18 hours, no less than about 19 hours, no less than about 20 hours, no less than about 21 hours, no less than about 22 hours, no less than about 23 hours, or no less than about 24 hours, to allow water and gases to exit the biomass without destroying the vascular structure of the feedstock. In various embodiments, use of a slow progressive heat rate during pyrolysis (for example in contrast to flash pyrolysis) over minutes or hours is used to allow water and gases to exit the biomass without destroying the vascular structure of the feedstock. For example and without limitation, a rate of temperature increase during the pyrolysis step may range from about 1° C. per minute to about 40° C. per minute, for example about 1° C. per minute, about 2° C. per minute, about 4° C. per minute, about 5° C. per minute, about 10° C. per minute, about 15° C. per minute, about 20° C. per minute, about 25° C. per minute, about 30° C. per minute, about 35° C. per minute, or about 40° C. per minute. In some embodiments, the temperature increase occurs in a pre-heat zone to produce a preheated feedstock. In some embodiments, the temperature increase occurs predominantly or entirely in a pre-heat zone to produce a preheated feedstock. In some embodiments, the temperature of a preheated feedstock is increased in a pre-pyrolysis zone. In some embodiments, the temperature increase occurs at least in part in a carbonization zone or a pyrolysis zone. In some embodiments, the temperature increase occurs predominantly or entirely in a carbonization zone or a pyrolysis zone. In some embodiments, a preheat zone, pre-pyrolysis zone, carbonization zone or pyrolysis zone is configured to increase the temperature during pyrolysis from an initial, low temperature to a final, higher temperature over time. In some embodiments, the temperature increase is linear or substantially linear over time. In some embodiments, the rate of temperature increase increases or decreases over time such that the temperature during preheating, pre-pyrolysis and/or carbonization or pyrolysis is at least partially nonlinear, for example logarithmic or substantially logarithmic for at least a portion of the preheat, pre-pyrolysis and/or carbonization or pyrolysis step. In various embodiments, an additive is used prior to drying or pyrolysis to reduce gas formation that could damage the vascular structure of the feedstock during pyrolysis. In various embodiments, prior to pyrolysis, dried feedstock is sized using a saw or other cutting device designed to be less destructive to the vascular structure of wood than other sizing approaches such as chipping or shearing wet wood that fractures wood and decreases its strength. In such embodiments, a biogenic activated carbon product has a greater strength index (e.g., CSR value) than a comparable biogenic activated carbon product not prepared in such a manner.

In various embodiments, the feedstock is prepared by milling biomass to form a plurality of biomass pieces that are substantially uniform size and substantially uniform shape. For example and without limitation, biomass can be processed to produce sawdust of approximately uniform grain size (e.g., mesh size). Alternatively, biomass can be processed to produce chips having substantially uniform dimensions (e.g., approximately 1 inch by approximately ½-inch by approximately ⅛-inch pieces). In other embodiments, feedstock can be prepared by milling biomass to form lengths of material with substantially uniform width and depth dimensions or diameters (e.g., wood bars, boards or dowels). In related embodiments, the lengths of material having substantially uniform width and depth or diameter can be further milled to produce feedstock pieces of substantially uniform lengths, resulting in a feedstock material having substantially uniform size and shape. For example, wood dowels having a uniform diameter (e.g., about 1⅛ inches) can be cut into pieces of substantially uniform length (e.g., about 1.5 inches). The resulting feedstock pieces have a substantially uniform shape (cylinders) and a substantially uniform size (about 1⅛ inch diameter by about 1.5 inch lengths). In some embodiments, a biogenic activated carbon product prepared from a feedstock consisting of pieces of substantially uniform shape and size is produced in greater mass yield than a comparable biogenic activated carbon product prepared from feedstock pieces of substantially non-uniform shape and/or size.

Referring now generally to FIGS. 1 to 13, block flow diagrams of a several exemplary multi reactor embodiments of the present disclosure are illustrated. Each figure is discussed in turn below. It should be appreciated FIGS. 1 to 13 represent some example embodiments but not all contemplated embodiments of the present disclosure. As discussed below, various additional non-illustrated embodiments and combinations of the several components and features discussed herein are also contemplated. As will be understood in the discussion below, any of the plurality of reactors discussed herein can be independent reactors, or alternatively within a single reactor BPU can include a plurality of zones, or a combination thereof. It should be appreciated that, although the figures each illustrate a different alternative embodiment, all other discussion in this disclosure can apply to each of the illustrated and non-illustrated embodiments.

Figure 1:
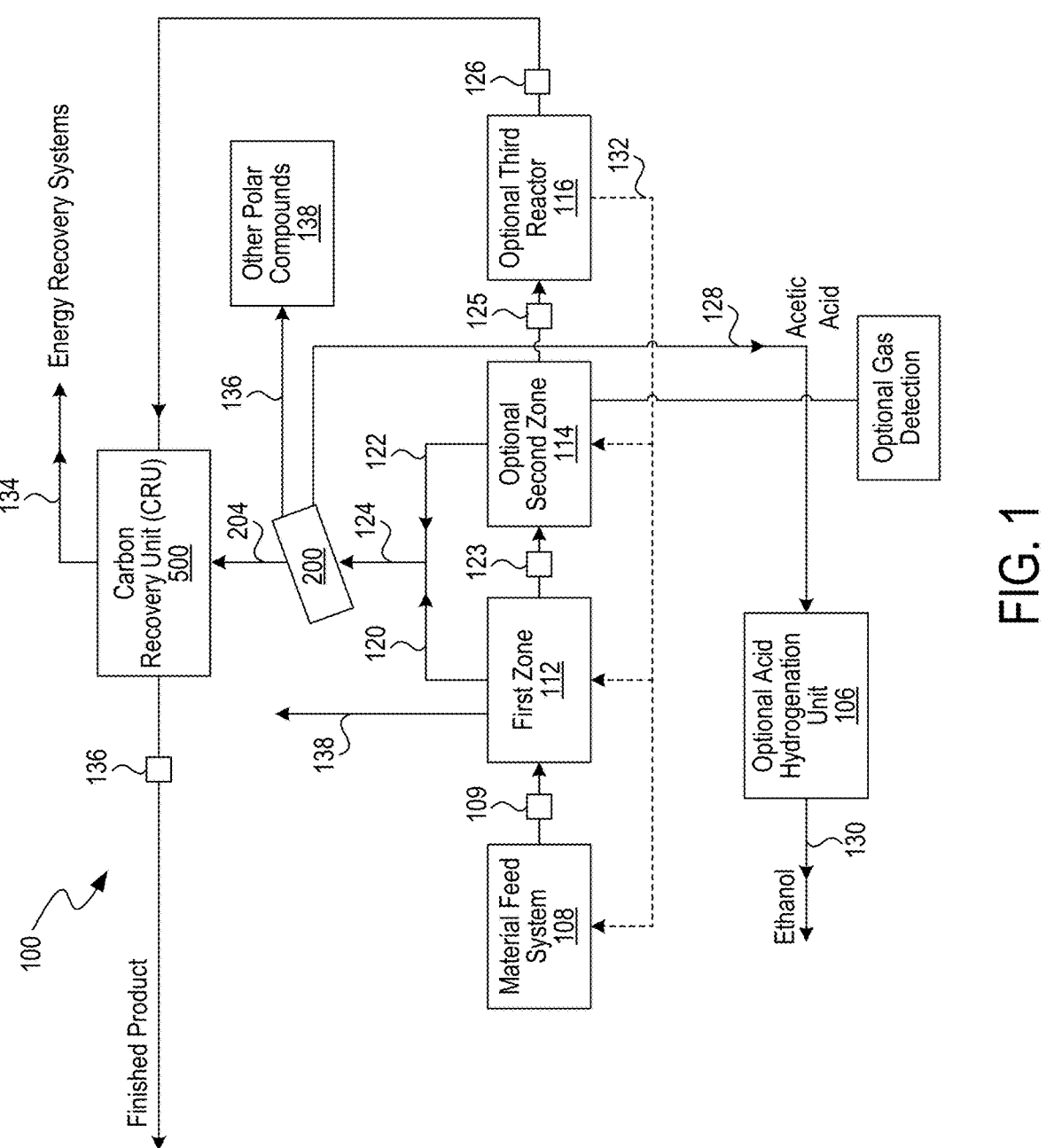
FIG. 1 depicts a multi-reactor embodiment of a system of the disclosure.

Referring now generally to FIG. 1, a block flow diagram of a multi reactor embodiment of the present disclosure is illustrated. This embodiment can utilize two to a plurality of different reactors. Three reactors are shown in the illustrative embodiment, however, any different number of reactors could be employed. In one embodiment, each reactor is connected to at least one other reactor via a material transport unit 304 (shown in FIG. 3). In one embodiment, the material transport unit 304 controls atmosphere and temperature conditions.

Figure 3:
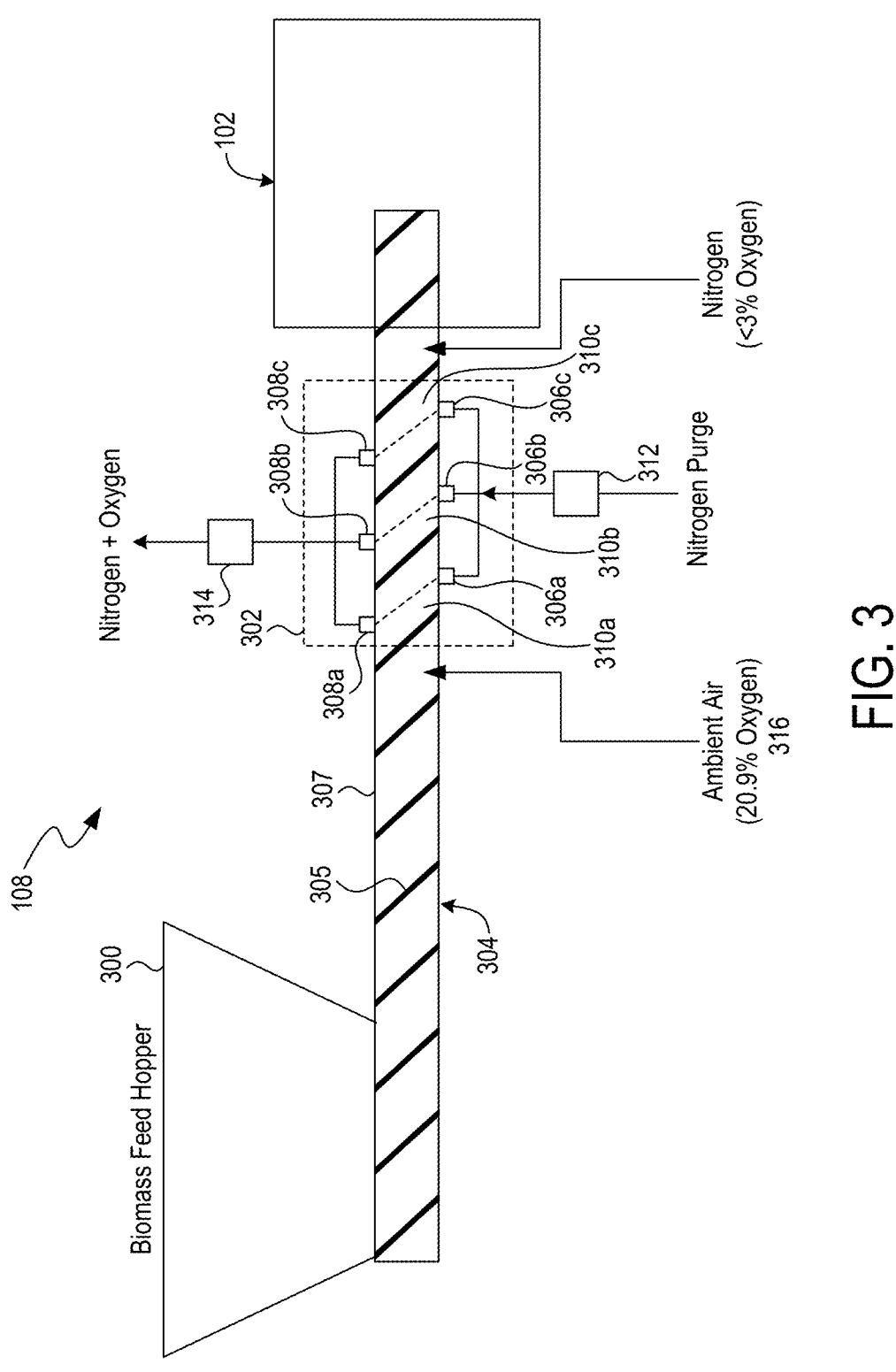
FIG. 3 depicts one embodiment of a zero-oxygen continuous feed mechanism suitable for use in connection with the present disclosure.

In the illustrated embodiment, the raw material 109, such as biomass, is optionally dried and sized outside the system and introduced into the first reactor 100 in a low-oxygen atmosphere, optionally through the use of a material feed system 108. As discussed in further detail below and as illustrated in FIG. 3, the material feed system 108 reduces the oxygen level in the ambient air in the system to less than or equal to about 3%. The raw material 109 enters the first reactor 112 via the enclosed material transport unit 304 after the oxygen levels have been decreased in the first reactor. In one embodiment, the raw material transport unit will include an encapsulated jacket or sleeve through which steam and off-gases from the reactor are sent and used to pre-heat the biomass either directly or sent to a process gas heater and or heat exchanger and then sent and used to pre-heat or pyrolize the biomass.

In the illustrated embodiment, the raw material 109 first travels from the material feed system 108 on the material transport unit 304 into the first reactor of the BPU 112.

As discussed in more detail below, in one embodiment, the first reactor 112 is configured to be connected to any other reactor in the system to recover waste heat 132 and conserve energy through a suitable waste heat recovery system. In one embodiment, the waste heat given off in the first reactor 112 is used to operate a steaming bin or another appropriate heating mechanism configured to dry raw materials 109 inside or outside of the system. In various embodiments, other byproducts of the waste heat, such as a substantially heated inert gas or the like, can be used elsewhere in the system to further enrich the material at any point along the process.

In the illustrated embodiment, the biomass 109 enters the first reactor 112, wherein the temperature is raised from the range of about ambient temperature to about 150° C. to a temperature of about 100° C. to about 200° C. In one embodiment, the temperature does not exceed 200° C. in the first reactor 112. As discussed in greater detail below, the first reactor 112 can include an output mechanism to capture and exhaust off-gases 120 from the biomass 123 while it is being heated. In one embodiment, the off-gases 120 are extracted for optional later use. In various embodiments, the heating source used for the various zones in the BPU 102 is electrical or gas. In one embodiment, the heating source used for the various reactors of the BPU 102 is waste gas from other reactors of the unit 102 or from external sources. In various embodiments, the heat is indirect.

Following preheating in the first reactor 112, the material transport unit 304 passes the preheated material 123 into the optional second reactor 114. In one embodiment reactor 114 is the same as reactor 112. In one embodiment where reactor 114 is different than reactor 112, the material transport unit 304 penetrates the second reactor 114 through a high-temperature vapor seal system (e.g. an airlock), which allows the material transport unit 304 to penetrate the second reactor while preventing gas from escaping. In one embodiment, the interior of the second reactor 114 is heated to a temperature of about 100° C. to about 600° C. or about 200° C. to about 600° C. In another embodiment, the second reactor 114 includes an output port similar to the first reactor 102 to capture and exhaust the gases 122 given off of the preheated material 123 while it is being carbonized. In one embodiment, the gases 122 are extracted for optional later use. In one illustrative embodiment, the off-gases 120 from the first reactor 112 and the off-gases 122 from the second reactor 114 are combined into one gas stream 124. Once carbonized, the carbonized biomass 125 exits the second reactor 114 and enters the third reactor 116 for cooling. Again, the third reactor can be the same reactor as 112 or 114 or different.

In one embodiment, when the biogenic activated carbon product 125 enters the third reactor 116, the carbonized biomass 125 is allowed to cool (actively or passively) to a specified temperature range to form carbonized biomass 126, as discussed above. In one embodiment, temperature of the carbonized biomass 125 is reduced in the third reactor under substantially inert atmospheric conditions. In another embodiment, the third reactor cools the carbonized biomass 125 with an additional water cooling mechanism. It should be appreciated that the carbonized biomass 126 is allowed to cool in the third reactor 116 to the point where it will not spontaneously combust if exposed to oxygenated air. In one such embodiment, the third reactor 116 reduces temperature of the carbonized biomass to below 200° C. In one embodiment, the third reactor includes a mixer (not shown) to agitate and uniformly cool the carbonized biomass. It should be appreciated that cooling may occur either directly or indirectly with water or other liquids; cooling may also occur either directly or indirectly with air or other cooled gases, or any combination of the above.

It should be appreciated that in several embodiments (not shown) one or more additional coolers or cooling mechanisms are employed to further reduce the temperature of the carbonized biomass. In various such embodiments, the cooler is separate from the other reactors 112, 114, 116, along the material transport system. In some embodiments, the cooler follows the reactors. In some embodiments, the cooler can be the same as the reactors 112, 114, 116. In other embodiments, the cooler is, for example, a screw, auger, conveyor (specifically a belt conveyor in one embodiment), drum, screen, pan, counterflow bed, vertical tower, jacketed paddle, cooled screw or combination thereof that cools either directly or indirectly with water or other liquids, or directly or indirectly with other gases, or combination of the above. In various embodiments, coolers could include water spray, cooled inert gas streams, liquid nitrogen, or ambient air if below ignition temperature. It should be appreciated that heat can be recovered from this step by capturing the flash steam generated by the water spray, or the superheated steam generated when saturated steam is introduced and heated by the carbonized biomass.

Figure 5:
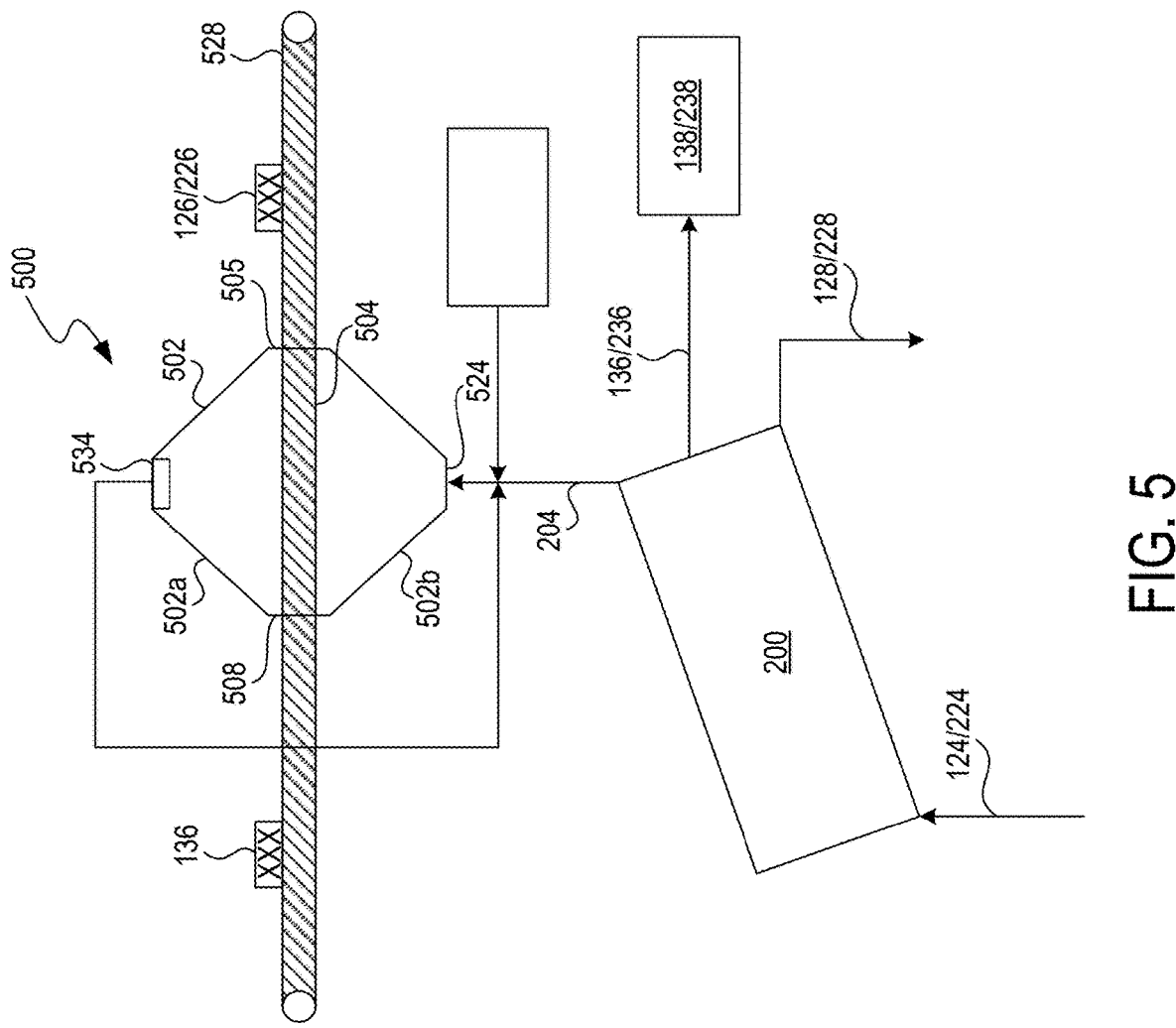
FIG. 5 depicts one embodiment of a carbon recovery unit suitable for use in connection with the present disclosure.

As illustrated in FIGS. 1 and 5, the gas-phase separator unit 200 includes at least one input and a plurality of outputs. The at least one input is connected to the exhaust ports on the first reactor 112 and the second reactor 114 of the BPU 102. One of the outputs is connected to the carbon recovery unit 104, and another one of the outputs is connected to collection equipment or further processing equipment such as an acid hydrogenation unit 106 or distillation column. In various embodiments, the gas-phase separator processes the off-gases 120, 122 from the first reactor 112 and the second reactor 114 to produce a condensate 128 and an enrichment gas 204. In various embodiments, condensables may be used for either energy recovery (134) (for example in the dryer, reactor or process gas heater), or for other carbon enrichment. In various embodiments, non-condensables (for example CO) may be used for energy recovery (134) (for example in a dryer, reactor or process gas heater), as an inert gas in the process (for example in the deaeration unit, reactor, BPU or cooler discussed in more detail below) or for carbon enrichment.

In various embodiments, the condensate 128 includes polar compounds, such as acetic acid, methanol and furfural. In another embodiment, the enrichment gas 204 produced by the gas-phase separator 200 includes at least non-polar gases, for example carbon monoxide, terpenes, methane, carbon dioxide, etc. In one embodiment, the gas-phase separator comprises a fractionation column. In one embodiment, acetic acid is sent via a line 128 to an optional acid hydrogenation unit. In another embodiment, methanol and/ or furfural are sent via optional additional line(s) 136 to a distillation/processing unit 138

In various embodiments, as discussed in more detail below, the carbon recovery unit itself has the facility to enrich the material. In various other embodiments, the material is enriched in a material enrichment unit separate from the carbon recovery unit. It should be appreciated that, in some such embodiments, the carbon recovery unit is a vessel for storing the carbonized material, and the separate material enrichment unit is the unit in which gases are introduced to enrich the material.

In the illustrated embodiment, the carbon recovery unit 500 also enriches the carbonized biomass 126. The carbonized biomass 126 exits the third reactor along the material transport unit 304 and enters the carbon recovery unit 500. In various embodiments, as illustrated in more detail in FIG. 5 and discussed above, the carbon recovery unit 500 also includes an input 524 connected to the gas-phase separator 200. In one embodiment, the enrichment gas 204 is directed into the carbon recovery unit to be combined with the biogenic activated carbon product 126 to create a high carbon biogenic activated carbon product 136. In another embodiment, a carbon-enriched gas from an external source can also be directed to the carbon recovery unit to be combined with the carbonized biomass 126 to add additional carbon to the ultimate high carbon biogenic activated carbon product produced. In various embodiments, the carbonized biomass 126 is temperature-reduced carbonized biomass. Illustratively, the system 100 can be co-located near a timber processing facility and carbon-enriched gas from the timber processing facility can be used as gas from an external source.

Figure 2:
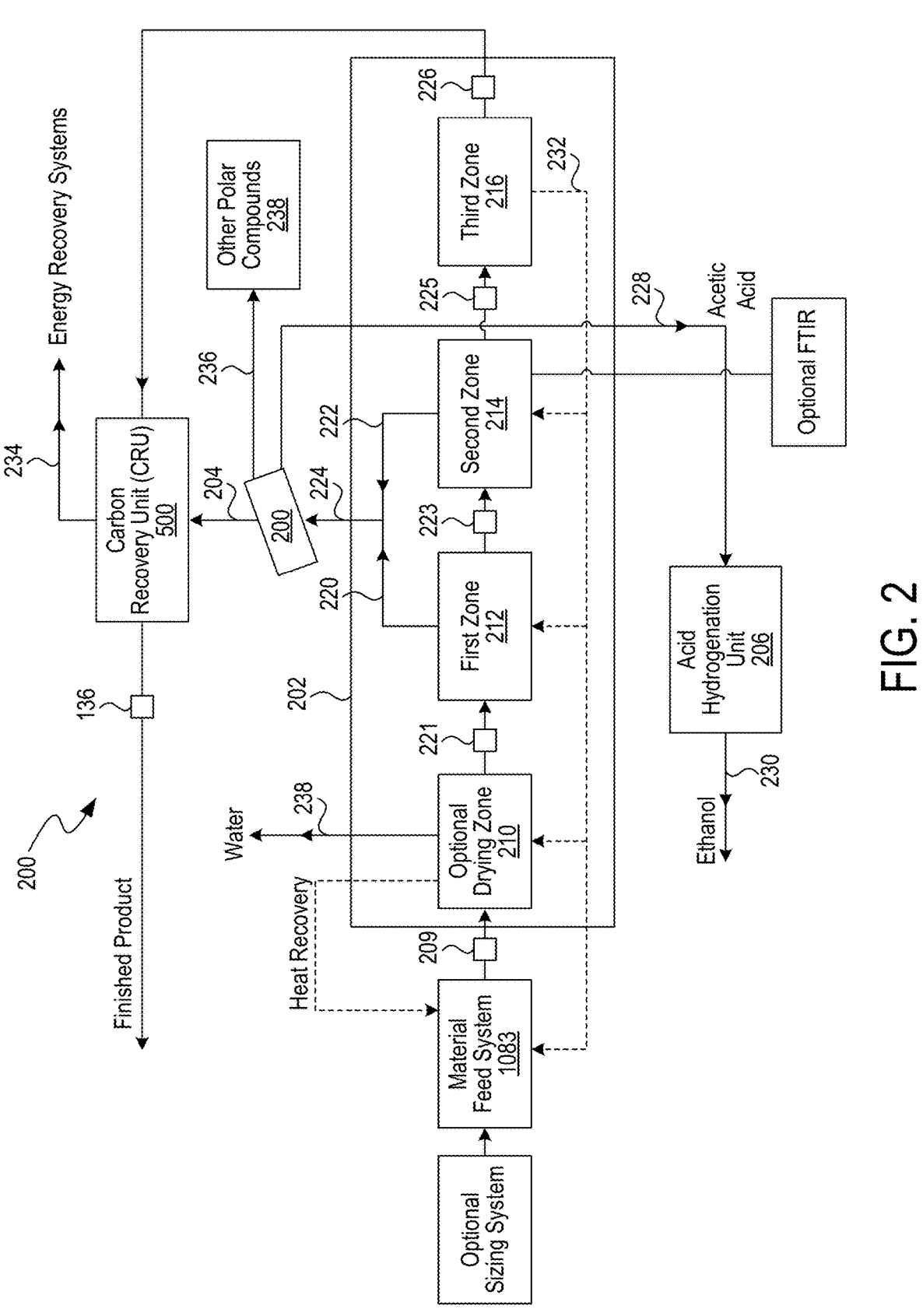
FIG. 2 depicts a single reactor, multi-zone embodiment of a system of the disclosure

Referring now generally to FIG. 2, a block flow diagram of a single reactor, multi-zone embodiment of the present disclosure is illustrated. In the illustrated embodiment, the raw material 209, such as biomass, is introduced into the reactor 200 in a low-oxygen atmosphere, optionally through the use of a material feed system 108 already described. As discussed in further detail below, the material feed system 108 reduces the oxygen level in the ambient air in the system to less than or equal to about 3%. The raw material 209 enters the BPU 202 in an enclosed material transport unit 304 after the oxygen levels have been decreased. In one embodiment, the material transport unit will include an encapsulated jacket or sleeve through which steam and off-gases from the reactor 200 are sent and used to pre-heat the biomass.

In the illustrated embodiment, the raw material first travels from the material feed system 108 on the material transport unit 304 through an optional drying zone 210 of the BPU 202. In one embodiment, the optional drying zone 210 heats the raw material to remove water and other moisture prior to being passed along to the preheat zone 212. In one embodiment, the interior of the optional drying zone 210 is heated to a temperature of about ambient temperature to about 150° C. Water 238 or other moisture removed from the raw material 209 can be exhausted, for example, from the optional drying zone 210. In another embodiment, the optional drying zone is adapted to allow vapors and steam to be extracted. In another embodiment, vapors and steam from the optional drying zone are extracted for optional later use. As discussed below, vapors or steam extracted from the optional drying zone can be used in a suitable waste heat recovery system with the material feed system. In one embodiment, the vapors and steam used in the material feed system pre-heat the raw materials while oxygen levels are being purged in the material feed system. In another embodiment, biomass is dried outside of the reactor and the reactor does not comprise a drying zone.

As discussed in more detail below, in one embodiment, the optional drying zone 210 is configured to be connected to the cooling zone 216 to recover waste heat 232 and conserve energy through a suitable waste heat recovery system. In one embodiment, the waste heat given off in the cooling zone 216 is used to operate a heating mechanism configured to dry raw materials 209 in the optional drying zone 210. After being dried for a desired period of time, the dried biomass 221 exits the optional drying zone 210 and enters preheat zone 212.

In the illustrated embodiment, the dried biomass 221 enters the first (preheat) zone 212, wherein the temperature is raised from the range of about ambient temperature to about 150° C. to a temperature range of about 100° C. to about 200° C. In one embodiment, the temperature does not exceed 200° C. in the first/preheat zone 212. It should be appreciated that if the preheat zone 212 is too hot or not hot enough, the dried biomass 221 may process incorrectly prior to entering the second zone 214. As discussed in greater detail below, the preheat zone 212 can includes an output mechanism to capture and exhaust off-gases 220 from the dried biomass 221 while it is being preheated. In another embodiment, the off-gases 220 are extracted for optional later use. In various embodiments, the heating source used for the various zones in the BPU 202 is electric or gas. In one embodiment, the heating source used for the various zones of the BPU 202 is waste gas from other zones of the unit 202 or from external sources. In various embodiments, the heat is indirect.

Following the preheat zone 212, the material transport unit 304 passes the preheated material 223 into the second (pyrolysis) zone 214. In one embodiment, the material transport unit 304 penetrates the second/pyrolysis zone through a high-temperature vapor seal system (such as an airlock, not shown), which allows the material transport unit 304 to penetrate the high-temperature pyrolysis zone while preventing (or minimizing) gas from escaping. In one embodiment, the interior of the pyrolysis zone 214 is heated to a temperature of about 100° C. to about 600° C. or about 200° C. to about 500° C. In another embodiment, the pyrolysis zone 214 includes an output port similar to the preheat zone 212 to capture and exhaust the gases 222 given off of the preheated biomass 223 while it is being carbonized. In one embodiment, the gases 222 are extracted for optional later use. In one illustrative embodiment, the off-gases 220 from the preheat zone 212 and the off-gases 222 from the pyrolysis zone 214 are combined into one gas stream 224. Once carbonized, the carbonized biomass 225 exits the second/pyrolysis zone 214 and enters the third/temperature-reducing or cooling zone 216.

In one embodiment, when the carbonized biomass 225 enters the cooling zone 216, the carbonized biomass 225 is allowed to cool to a specified temperature range of about 20° C. to 25° C. (about room temperature) to become temperature-reduced carbonized biomass 226, as discussed above. In various embodiments, the BPU 202 includes a plurality of cooling zones. In one embodiment, the cooling zone 216 cools the carbonized biomass to below 200° C. In one embodiment, the cooling zone includes a mixer to agitate and uniformly cool the materials. In various embodiments, one or more of the plurality of cooling zones is outside of the BPU 202.

As illustrated in FIGS. 2 and 5, the gas-phase separator unit 200 includes at least one input and a plurality of outputs. In this illustrative embodiment, the at least one input is connected to the exhaust ports on the first/preheat zone 212 and the second/pyrolysis zone 214 of the BPU 202. One of the outputs is connected to the carbon recovery unit 500 (which is configured to enrich the material), and another one of the outputs is connected to collection equipment or further processing equipment such as an acid hydrogenation unit 206 or distillation column. In various embodiments, the gas-phase separator processes the off-gases 220, 222 from the first/preheat zone 212 and the second/pyrolysis zone 214 to produce a condensate 228 and an enrichment gas 204. In one embodiment, the condensate 228 includes polar compounds, such as acetic acid, methanol and furfural. In one embodiment, the enrichment gas 204 produced by the gas-phase separator 200 includes at least non-polar gases. In one embodiment, the gas-phase separator comprises a fractionation column. In one embodiment, acetic acid is sent via a line 228 to an optional acid hydrogenation unit 206. In another embodiment, methanol and/or furfural are sent via optional additional line(s) 236 to a distillation/processing unit 238.

In the illustrated embodiments, the carbonized biomass exits the cooling reactor/zone along the material transfer unit 304 and enters the carbon recovery unit 500. In various embodiments, as illustrated in more detail in FIG. 5 and discussed above, the carbon recovery unit 500 also includes an input 524 connected to the gas-phase separator 200. In one embodiment, the enrichment gas 204 is directed into the carbon recovery unit 500 to be combined with the biogenic activated carbon product 226 to create a high carbon biogenic activated carbon product 136. In another embodiment, a carbon-enriched gas from an external source can also be directed to the carbon recovery unit 500 to be combined with the biogenic activated carbon product 226 to add additional carbon to the biogenic activated carbon product. In various embodiments, gases pulled from the carbon recovery unit 500 at reference 234 are optionally used in energy recovery systems and/or systems for further carbon enrichment. Similarly, in various embodiments, gases pulled from one or more zones of the BPU 202 are optionally used in energy recovery systems and/or systems for further carbon enrichment. Illustratively, the system 200 can be co-located near a timber processing facility and carbon-enriched gas from the timber processing facility can be used as gas from an external source.

Now referring generally to FIG. 3, one material feed system embodiment of the present disclosure is illustrated. As discussed above, high oxygen levels in the ambient air surrounding the raw material as it processes could result in undesirable combustion or oxidation of the raw material, which reduces the amount and quality of the final product. In one embodiment, the material feed system is a closed system and includes one or more manifolds configured to purge oxygen from the air surrounding the raw material. In one embodiment, oxygen level of about 0.5% to about 1.0% are used for pre-heating, pyrolyzing/carbonizing and cooling. It should be appreciated that a primary goal of the closed material feed system is to reduce oxygen levels to less than or equal to about 3%, less than or equal to about 2%, less than or equal to about 1% or less than or equal to about 0.5%. After the oxygen level is reduced, the biomass is transferred along the material feed system into the BPU. It should be appreciated that in various embodiments, pre-heating of inert gases through recovered process energy and subsequent introduction of pre-heated inert gases to the BPU, reactor or trimming reactor makes the system more efficient.

In some embodiments, a trimming reactor is included in the system. In one trimming reactor embodiment, pyrolyzed material from the BPU is fed into a separate additional reactor for further pyrolysis where heated inert gas is introduced to create a product with higher fixed carbon levels. In various embodiments, the secondary process may be conducted in a container such as a drum, tank, barrel, bin, tote, pipe, sack, press, or roll-off container. In various embodiments, the final container also may be used for transport of the carbonized biomass. In some embodiments, the inert gas is heated via a heat exchanger that derives heat from gases extracted from the BPU and combusted in a process gas heater.

As seen in FIG. 3, the closed material feed system 108 includes a raw material feed hopper 300, a material transport unit 304 and an oxygen purge manifold 302.

In one embodiment, the raw material feed hopper 300 is any suitable open-air or closed-air container configured to receive raw or sized/dried biomass 109/209. The raw material feed hopper 300 is operably connected with the material transport unit 304, which, in one embodiment, is a screw or auger system operably rotated by a drive source. In one embodiment, the raw material 109/209 is fed into the material transport unit 304 by a gravity-feed system. It should be appreciated that the material transport unit 304 of FIG. 3 is fashioned such that the screw or auger 305 is enclosed in a suitable enclosure 307. In one embodiment, the enclosure 307 is substantially cylindrically shaped. In various embodiments, material feed systems include a screw, auger, conveyor, drum, screen, chute, drop chamber, pneumatic conveyance device, including a rotary airlock or a double or triple flap airlock.

As the raw material 109/209 is fed from the raw material feed hopper 300 to the material transport unit 304, the auger or screw 305 is rotated, moving the raw material 109/209 toward the oxygen purge manifold 302. It should be appreciated that, when the raw material 109/209 reaches the oxygen purge manifold 302, the ambient air among the raw material 109/209 in the material transport unit 304 includes about 20.9% oxygen. In various embodiments, the oxygen purge manifold 302 is arranged adjacent to or around the material transport unit 304. Within the oxygen fold manifold of one embodiment, the enclosure 307 of the material transport unit 304 includes a plurality of gas inlet ports 310*a*, 310*b*, 310*c* and a plurality of gas outlet ports 308*a*, 308*b*, 308*c*.

The oxygen purge manifold 302 has at least one gas inlet line 312 and at least one gas outlet line 314. In various embodiments, the at least one gas inlet line 312 of the oxygen purge manifold 302 is in operable communication with each of the plurality of gas inlet ports 310a, 310b, 310c. Similarly, in various embodiments, the at least one gas outlet line 314 of the oxygen purge manifold 302 is in operable communication with each of the plurality of gas outlet ports 308a, 308b, 308c. It should be appreciated that, in one embodiment, the gas inlet line 312 is configured to pump an inert gas into the gas inlet ports 310a, 310b, 310c. In one such embodiment, the inert gas is nitrogen containing substantially no oxygen. In one embodiment, the inert gas will flow counter-current to the biomass.

As will be understood, the introduction of inert gas 312 into the enclosed material transport unit 304 will force the ambient air out of the enclosed system. In operation, when the inert gas 312 is introduced to the first gas inlet port 310a of one embodiment, a quantity of oxygen-rich ambient air is forced out of outlet port 308a. It should be appreciated that, at this point, the desired level of less than or equal to about 2% oxygen, less than or equal to about 1% oxygen, less than or equal to about 0.5% oxygen or less than or equal to about 0.2% oxygen may not be achieved. Therefore, in various embodiments, additional infusions of the inert gas 312 must be made to purge the requisite amount of oxygen from the air surrounding the raw material 109 in the enclosed system. In one embodiment, the second gas inlet port 310b pumps the inert gas 312 into the enclosed system subsequent to the infusion at the first gas inlet port 310a, thereby purging more of the remaining oxygen from the enclosed system. It should be appreciated that, after one or two infusions of inert gas 312 to purge the oxygen 314, the desired level of less oxygen may be achieved. If, in one embodiment, the desired oxygen levels are still not achieved after two inert gas infusions, a third infusion of inert gas 312 at gas inlet 310c will purge remaining undesired amounts of oxygen 314 from the enclosed system at gas outlet 308c. Additional inlets/outlets may also be incorporated if desired. In various embodiments, oxygen levels are monitored throughout the material feed system to allow calibration of the amount and location of inert gas infusions.

In one alternative embodiment, heat, steam and gases recovered from the reactor are directed to the feed system where they are enclosed in jacket and separated from direct contact with the feed material, but indirectly heat the feed material prior to introduction to the reactor.

In one alternative embodiment, heat, steam and gases recovered from the drying zone of the reactor are directed to the feed system where they are enclosed in jacket and separated from direct contact with the feed material, but indirectly heat the feed material prior to introduction to the reactor.

It should be appreciated that the gas inlet ports 310a, 310b, 310c and the corresponding gas outlet ports 308a, 308b, 308c, respectively, of one embodiment are slightly offset from one another with respect to a vertical bisecting plane through the material transport unit 304. For example, in one embodiment, inlet port 310a and corresponding outlet port 308a are offset on material transport unit 304 by an amount that approximately corresponds with the pitch of the auger 305 in the material transport unit 304. In various embodiments, after the atmosphere surrounding the raw material 109/209 is satisfactorily de-oxygenated, it is fed from the material feed system 108 into the BPU 102. In various embodiments, oxygen levels are monitored throughout the material feed system to allow the calibration of the amount and location of inert gas infusions.

It should be appreciated that, in one embodiment, the raw material 109/209, and subsequently the dried biomass 221, preheated biomass 123/223, carbonized biomass 125/225 and carbonized biomass 126/226, travel through the reactor 102 (or reactors) along a continuous material transport unit 304. In another embodiment, the material transport unit carrying the material differs at different stages in the process. In one embodiment, the process of moving the material through the reactor, zones or reactors is continuous. In one such embodiment, the speed of the material transport unit 304 is appropriately calibrated and calculated by an associated controller and processor such that the operation of the material transport unit 304 does not require interruption as the material moves through the reactor or reactors.

In another embodiment, the controller associated with the reactor 102 or reactors (112/114/116) is configured to adjust the speed of the material transport unit 304 based on one or more feedback sensors, detected gas (e.g. from the optional FTIR), measured parameters, temperature gauges, or other suitable variables in the reactor process. It should be appreciated that, in various embodiments, any suitable moisture sensors, temperature sensors or gas sensors in operable communication with the controller and processor could be integrated into or between each of the zones/reactors or at any suitable position along the material transport unit 304. In one embodiment, the controller and processor use the information from sensors or gauges to optimize the speed and efficiency of the BPU 100/200. In one embodiment, the controller associated with the reactor 102 or reactors (112/114/116) is configured to operate the material transport unit 304. In one embodiment, the controller associated with the reactor 102 or reactors (112/114/116) is configured to monitor the concentration, temperature and moisture of the gas inside the material transport unit 304 or inside any of the reactors. In one embodiment, the controller is configured to adjust the speed of the material transport unit 304, the input of gases into the material transport unit and the heat applied to the material in the material transport unit based upon one or more readings taken by the various sensors.

Figure 4:
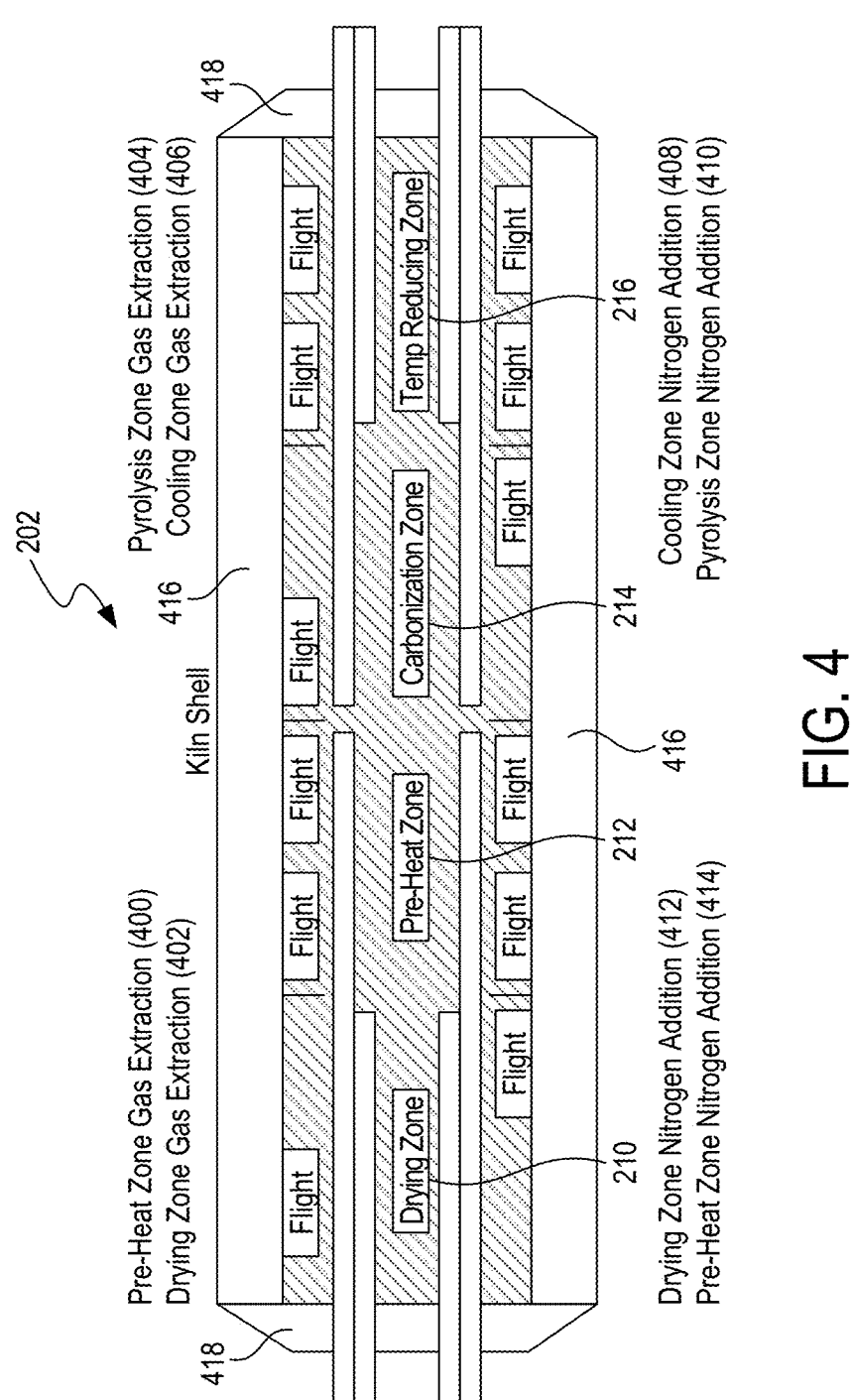
FIG. 4 depicts another embodiment of a single reactor, multi-zone biomass processing unit suitable for use in connection with the present disclosure.

Referring now to FIGS. 2 and 4, one embodiment of the BPU 102 is illustrated. It should be appreciated that the graphical representation of the BPU 202 in FIG. 4 corresponds substantially to the BPU 202 in FIG. 2. It should also be appreciated that, in various embodiments, the BPU 202 is enclosed in a kiln shell to control and manipulate the high amounts of heat required for the reactor process. As seen in FIG. 4, in one embodiment, the kiln shell of the BPU 202 includes several insulating chambers (416, 418) surrounding the four zones 210, 212, 214 and 216. In one embodiment, the kiln includes four separated zones. In various embodiments, each of the four zones 210, 212, 214 and 216 of the BPU 202 includes at least one inlet flight and at least one outlet flight. As discussed in greater detail below, within each zone of one such embodiment, the inlet and outlet flights are configured to be adjustable to control the flow of feed material, gas and heat into and out of the zone. A supply of inert air can be introduced into the inlet flight and the purged air can be extracted from the corresponding outlet flight. In various embodiments, one or more of the outlet flights of a zone in the BPU 202 are connected to one or more of the other inlet or outlet flights in the BPU.

In one embodiment, after the raw material 209 is de-oxygenated in the material feed system 108, it is introduced to the BPU 202, and specifically to the first of four zones the optional drying zone 210. As seen in FIG. 4, the drying zone includes inlet flight 422b and outlet flight 420a. In one embodiment, the drying zone is heated to a temperature of about 80° C. to about 150° C. to remove water or other moisture from the raw materials 209. The biomass is then moved to the second or pre-heat zone 212 where the biomass is pre-heated as described above.

In another embodiment, the material that has optionally been dried and pre-heated is moved to the third or carbonization zone. In one embodiment, carbonization occurs at a temperature from about 200° C. to about 700° C., for example about 200° C., about 210° C., about 220° C., about 230° C., about 240° C., about 250° C., about 260° C., about 270° C., about 280° C., about 290° C., about 300° C., about 310° C., about 320° C., about 330° C., about 340° C., about 350° C., about 360° C., about 370° C., about 380° C., about 390° C., about 400° C., 410° C., about 420° C., about 430° C., about 440° C., about 450° C., about 460° C., about 470° C., about 480° C., about 490° C., about 500° C., about 510° C., about 520° C., about 530° C., about 540° C., about 550° C., about 560° C., about 570° C., about 580° C., about 590° C., about 600° C., about 610° C., about 620° C., about 630° C., about 640° C., about 650° C., about 660° C., about 670° C., about 680° C., about 690° C., or about 700° C. In another embodiment, a carbonization zone of a reactor 421 is adapted to allow gases produced during carbonization to be extracted. In another embodiment, gases produced during carbonization are extracted for optional later use. In one embodiment, a carbonization temperature is selected to minimize or eliminate production of methane ($CH_4$) and maximize carbon content of the carbonized biomass.

In another embodiment, carbonized biomass is moved to a temperature-reducing or cooling zone (third zone) and is allowed to passively cool or is actively cooled. In one embodiment, carbonized biomass solids are cooled to a temperature±10, 20, 30 or 40° C. of room temperature.

In various embodiments, the BPU includes a plurality of gas introduction probes and gas extraction probes. In the embodiment of the BPU illustrated in FIG. 4, the BPU further includes a plurality of gas introduction probes: 408, 410, 412 and 414, and a plurality of gas extraction probes: 400, 402, 404 and 406. It should be appreciated that, in various embodiments, one of each gas introduction probes and one of each gas extraction probes correspond with a different one of the plurality of zones 210, 212, 214 and 216. It should also be appreciated that, in various alternative embodiments, the BPU 202 includes any suitable number of gas introduction probes and gas extraction probes, including more than one gas introduction probes and more than one gas extraction probes for each of the plurality of zones.

In the illustrated embodiment, the drying zone 210 is associated with gas introduction probe 412 and gas extraction probe 402. In one embodiment, the gas introduction probe 412 introduces nitrogen to the drying zone 210 and the gas extraction probe 402 extracts gas from the drying zone 210. It should be appreciated that, in various embodiments, the gas introduction probe 412 is configured to introduce a mixture of gas into the drying zone 210. In one embodiment, the gas extracted is oxygen. It should be appreciated that, in various embodiments, the gas extraction probe 402 extracts gases from the drying zone 210 to be reused in a heat or energy recovery system, as described in more detail above.

In the illustrated embodiment, the pre-heat zone 212 is associated with gas introduction probe 414 and gas extraction probe 400. In one embodiment, gas introduction probe 414 introduces nitrogen to the pre-heat zone 212 and gas extraction probe 400 extracts gas from the pre-heat zone 212. It should be appreciated that, in various embodiments, the gas introduction probe 414 is configured to introduce a mixture of gas into the pre-heat zone 212. In various embodiments, the gas extracted in gas extraction probe 400 includes carbon-enriched off-gases. It should be appreciated that in one embodiment, as discussed above, the gases extracted from the pre-heat zone 212 and pyrolysis zone 214 are reintroduced to the material at a later stage in the process, for example in the carbon recovery unit. In various embodiments, the gases extracted from any of the zones of the reactor are used for either energy recovery in the dryer or process gas heater, for further pyrolysis in a trimming reactor, or in the carbon enrichment unit.

In the illustrated embodiment, the pyrolysis zone 214 is associated with gas introduction probe 410 and gas extraction probe 404. In one embodiment, gas introduction probe 410 introduces nitrogen to the pyrolysis zone 214 and gas extraction probe 404 extracts gas from the pyrolysis zone 214. It should be appreciated that, in various embodiments, the gas introduction probe 410 is configured to introduce a mixture of gas into the pyrolysis zone 214. In various embodiments, the gas extracted in the gas extraction probe 404 includes carbon-enriched off-gases. It should be appreciated that in one embodiment, as discussed above, the carbon-enriched gases extracted from the pyrolysis zone 214 are used and reintroduced to the material at a later stage in the process. In various embodiments, as described in more detail below, the extracted gas 400 from the pre-heat zone 212 and the extracted gas 404 from the pyrolysis zone 214 are combined prior to being reintroduced to the material.

In the illustrated embodiment, the cooling zone 116 is associated with gas introduction probe 408 and gas extraction probe 406. In one embodiment, gas introduction probe 408 introduces nitrogen to the cooling zone 116 and gas extraction probe 406 extracts gas from the cooling zone 116. It should be appreciated that, in various embodiments, the gas introduction probe 408 is configured to introduce a mixture of gas into the cooling zone 116. It should be appreciated that, in various embodiments, the gas extraction probe 406 extracts gases from the cooling zone 116 to be reused in a heat or energy recovery system, as described in more detail above.

It should be appreciated that the gas introduction probes and gas extraction probes of various embodiments described above are configured to operate with the controller and plurality of sensors discussed above to adjust the levels and concentrations of gas being introduced to and gas being extracted from each zone.

In various embodiments, the gas introduction probes and gas extraction probes are made of a suitable pipe configured to withstand high temperature fluctuations. In one embodiment, the gas introduction probes and gas extraction probes include a plurality of openings through which the gas is introduced or extracted. In various embodiments, the plurality of openings are disposed on the lower side of the inlet and gas extraction probes. In various embodiments, each of the plurality of openings extends for a substantial length within the respective zone.

In one embodiment, the gas introduction probes extend from one side of the BPU 202 through each zone. In one such embodiment, each of the four gas introduction probes extend from a single side of the BPU to each of the respective zones. In various embodiments, gaseous catalysts are added that enrich fixed carbon levels. It should be appreciated that, in such an embodiment, the plurality of openings for each of the four gas introduction probes are only disposed in the respective zone associated with that particular gas introduction probe.

For example, viewing FIG. 4, if each of the gas introduction probes extends from the left side of the drying zone into each one of the zones, all four gas introduction probes would travel through the drying zone, with the drying zone gas introduction probes terminating in the drying zone. The three remaining gas introduction probes would all travel through the pre-heat zone, with the pre-heat zone gas introduction probe terminating in the pre-heat zone. The two remaining gas introduction probes would travel through the pyrolysis zone, with the pyrolysis zone gas introduction probe terminating in the pyrolysis zone. The cooling zone gas introduction probe would be the only gas introduction probe to travel into and terminate in the cooling zone. It should be appreciated that in various embodiments, the gas extraction probes are configured similar to the gas introduction probes described in this example. It should also be appreciated that the gas introduction probes and gas extraction probes can each start from either side of the BPU.

In various embodiments, the gas introduction probes are arranged concentrically with one another to save space used by the multiple-port configuration described in the example above. In one such embodiment, each of the four inlet probes/ports would have a smaller diameter than the previous inlet probe/port. For example, in one embodiment, the drying zone gas introduction probe has the largest interior diameter, and the pre-heat zone gas introduction probe is situated within the interior diameter of the drying zone inlet probe/port, the pyrolysis zone gas introduction probe is then situated within the interior diameter of the pre-heat zone gas introduction probe and the cooling zone gas introduction probe is situated within the pyrolysis zone gas introduction probe. In one example embodiment, a suitable connector is attached to each of the four gas introduction probes outside of the BPU 102 to control the air infused into each of the four gas introduction probes individually.

In one such embodiment, similar to the example above, the drying zone gas introduction probe would terminate in the drying zone, and the three other gas introduction probes would continue onto the preheat zone. However, with a concentric or substantially concentric arrangement, only the outer-most gas introduction probe is exposed in each zone before being terminated. Therefore, in one such embodiment, the individual zone gas introductions are effectively controlled independent of one another, while only requiring one continuous gas introduction probe line. It should be appreciated that a similar concentric or substantially concentric configuration is suitably used for the gas extraction probes in one embodiment.

In one embodiment, each zone or reactor is adapted to extract and collect off-gases from one or more of the individual zones or reactors. In another embodiment, off-gases from each zone/reactor remain separate for disposal, analysis and/or later use. In various embodiments, each reactor/zone contains a gas detection system such as an FTIR that can monitor gas formation within the zone/reactor. In another embodiment, off-gases from a plurality of zones/reactors are combined for disposal, analysis and/or later use, and in various embodiments, off gases from one or more zones/reactors are fed to a process gas heater. In another embodiment, off-gases from one or more zones/reactors are fed into a carbon recovery unit. In another embodiment, off-gases from one or more zones/reactors are fed to a gas-phase separator prior to introduction in the carbon recovery unit. In one embodiment, a gas-phase separator comprises a fractionation column. Any fractionation column known to those skilled in the art may be used. In one embodiment, off-gases are separated into non-polar compounds and polar compounds using a standard fractionation column heated to a suitable temperature, or a packed column. In another embodiment, non-polar compounds or enriched gases from a gas-phase separator are extracted for optional later use, and in various embodiments, off gases from one or more zones/reactors are fed to a process gas heater. In one embodiment, gases extracted from the pre-heat zone/reactor, the pyrolysis zone/reactor and optionally the cooling zone/reactor are extracted into a combined stream and fed into the gas-phase separator. In various embodiments, one or more of the zones/reactors is configured to control whether and how much gas is introduced into the combined stream.

As discussed above and generally illustrated in FIG. 5, the off-gases 124/224 from the BPU 102/202 are directed into the gas-phase separator 200. In various embodiments, the off-gases 124/224 include the extracted gases 120 from the first/preheat zone/reactor 112/212 combined with the extracted gases 122/222 from the second/pyrolysis zone/reactor 114/214 or either gas stream alone. When the off-gases 124/224 enter the gas-phase separator 200, the off-gases 124/224 are separated into polar compounds 128/228/136/236 and non-polar compounds 204, such as non-polar gases. In various embodiments, the gas-phase separator 200 is a known fractionation column.

In various embodiments, the enriched gases 204 extracted from the combined off-gases 124/224 are directed from the gas-phase separator 200 into the carbon recovery unit 500 via input 524, which enriches the material. As discussed above, and as illustrated in FIGS. 8 and 11, it should be appreciated that in various embodiments, the extracted gases are first introduced into a material enrichment unit, and then into a separate carbon recovery unit. In the embodiment illustrated in FIG. 5, the material enrichment takes place in the carbon recovery unit 500. In one embodiment (FIG. 5), the gas-phase separator 200 includes a plurality of outputs. In various embodiments, one output from the gas-phase separator 200 is connected to the carbon recovery unit 500 to introduce an enriched gas stream to the carbon recovery unit 500. In one embodiment, a portion of the enriched gas stream is directed to the carbon recovery unit 500 and another portion is directed to a scrubber, or another suitable purifying apparatus to clean and dispose of unwanted gas. In various embodiments, off-gases that are not sent to the carbon recovery unit may be used for either energy recovery (for example in a process gas heater) or as an inert gas (for example in the deaeration unit, reactor, BPU, or cooler). Similarly, in various embodiments, off-gases from the carbon recovery unit may be used for either energy recovery (for example in a process gas heater), as an inert gas (for example in the deaeration unit, reactor, BPU, or cooler), or in a secondary recovery unit.

In one embodiment, another output from the gas-phase separator extracts polar compounds, optionally condensing them into a liquid component, including a plurality of different liquid parts. In various embodiments, the liquid includes water, acetic acid, methanol and furfural. In various embodiments, the outputted liquid is stored, disposed of, further processed, or re-used. For example, it should be appreciated that the water outputted in one embodiment can be re-used to heat or cool another portion of a system. In another embodiment, the water is drained. It should also be appreciated that the acetic acid, methanol and furfural outputted in one embodiment can be routed to storage tanks for re-use, re-sale, distillation or refinement.

As seen in FIG. 5, the carbon recovery unit 500 of one embodiment comprises a housing with an upper portion and a lower portion. It should be appreciated that, in various embodiments in which a material enrichment unit is separate from the carbon recovery unit, the material enrichment unit includes features similar to those discussed with respect to the carbon recovery unit 500 of FIG. 5. In one embodiment, the carbon recovery unit, comprises: a housing 502 with an upper portion 502a and a lower portion 502b; an inlet 524 at a bottom of the housing configured to carry reactor off-gas; an outlet 534 at a top of the upper portion of the housing configured to carry a concentrated gas stream; a path 504 defined between the upper portion and lower portion of the housing; and a transport system 528 following the path, the transport system configured to transport reagent, wherein the housing is shaped such that the reagent adsorbs at least some of the reactor off-gas. In various embodiments, the upper portion includes a plurality of outlets and the lower portion includes a plurality of inlets.

In one embodiment, the housing 502 is substantially free of corners having an angle of 110 degrees or less, 90 degrees or less, 80 degrees or less or 70 degrees or less. In one embodiment, the housing 502 is substantially free of convex corners. In another embodiment, the housing 502 is substantially free of convex corners capable of producing eddies or trapping air. In another embodiment, the housing 502 is substantially shaped like a cube, rectangular prism, ellipsoid, a stereographic ellipsoid, a spheroid, two cones affixed base-to-base, two regular tetrahedrons affixed base-to-base, two rectangular pyramids affixed base-to-base or two isosceles triangular prisms affixed base-to-base.

In one embodiment, the upper portion 502a and lower portion 502b of the housing 502 are each substantially shaped like a half-ellipsoid, half rectangular prism, half-stereographic ellipsoid, a half-spheroid, a cone, a regular tetrahedron, a rectangular pyramid, an isosceles triangular prism or a round-to-rectangular duct transition.

In another embodiment, the inlet 524 at the bottom of the lower portion of the housing 502b and the outlet 534 at the top of the upper portion of the housing 502a are configured to connect with a pipe. In another embodiment, the top of the lower portion of the housing 502b and the bottom of the upper portion of the housing 502a are substantially rectangular, circular or elliptical. In another embodiment, the width between the top of the lower portion of the housing 502b and the bottom of the upper portion of the housing 502a is wider than a width of the transport system 528. In one embodiment, the width of the transport system 528 is its height.

In one embodiment, the carbon recovery unit 500 comprises a path 504 defined between the upper portion and the lower portion, an inlet opening 506 and an outlet opening 508. In one embodiment, the inlet opening and outlet opening are configured to receive the transport system. In one embodiment, the transport system 528 is at least semi-permeable or permeable to the enriching gas.

In one embodiment, the inlet opening 506 includes an inlet opening sealing mechanism to reduce escape of gas and the outlet opening 508 includes an outlet opening sealing mechanism to reduce escape of gas. In one embodiment, the inlet and outlet opening sealing mechanisms comprise an airlock.

In various embodiments, the lower portion 502b of the housing of the carbon recovery unit has a narrow round bottom connection opening, which is connected to the gas-phase separator 200 for the transport of gas stream 204. In various embodiments, the top of the lower portion 502b of the housing of the carbon recovery unit 500 is substantially rectangular in shape, and substantially wider than the narrow round bottom connection opening. It should be appreciated that in one embodiment, the lower portion transitions from the round bottom opening to a rectangular top opening. In one embodiment, the rectangular top opening of the lower portion is about six feet wide (along the direction of the conveyor system). In various embodiments, the top portion of the carbon recovery unit 500 is shaped substantially similarly to the lower portion. In one embodiment, the lower opening of the top portion is wider than the top opening of the lower portion. In one embodiment, the rectangular lower opening of the top portion is about six and a half feet wide (along the direction of the conveyor system). In one embodiment, the top portion is configured to capture all gases passed through the carbon recovery unit 500 that are not adsorbed by the activated materials.

It should be appreciated that, in various embodiments, the shape of the lower portion of the carbon recovery unit aids in slowing down and dispersing the gases 204 across a wider surface area of the conveyor carrying the biogenic activated carbon product 126/226. In various embodiments, the precise shape of the lower 502b and upper 502a portions of the carbon recovery unit 500 depend upon the angle of gas dispersion coming from the gas-phase separator pipe. It should be appreciated that in various embodiments, the gas naturally will tend to expand as it is pumped up at a flared range of between 5 and 30 degrees from the vertical. In one embodiment, the flare angle is approximately 15 degrees. It should be appreciated that the lower portion of the carbon recovery unit is constructed with as few creases and corners as possible to prevent the trapping of air or formation of eddies.

In one embodiment, the carbon recovery unit 500 is configured to connect to the gas-phase separator 200 as discussed above, as well as the BPU 102/202. In various embodiments, the carbon recovery unit 500 is connected to the output of the cooling reactor/zone 216/116, or the last cooling zone of the BPU 102/202 or outside of the BPU. In one embodiment, the output of the cooling reactor/zone 116/216 includes biogenic activated carbon product that have been processed in the BPU 102/202. In one embodiment, the biogenic activated carbon product 126/226 enters the carbon recovery unit 500 along a suitable transport system. In various embodiments, the top portion and the bottom portion of the carbon recovery unit are connected to one another, and define a pathway through which a transport system passes. In one embodiment, the transport system is constructed with a porous or mesh material configured to allow gas to pass there through. It should be appreciated that the transport system is configured to pass through an opening of the carbon recovery unit 500 and then through an exit opening in the carbon recovery. In some embodiments, the entrance and the exit into and out of the carbon recovery unit are appropriately sealed with an airlock or another suitable sealing mechanism to prevent gases from escaping through the conveyor opening. In various embodiments, off-gases that are not sent to the carbon recovery unit may be used for either energy recovery (for example in a process gas heater) or as an inert gas (for example in the deaeration unit, reactor, BPU, or cooler). Similarly, in various embodiments, off-gases from the carbon recovery unit may be used for either energy recovery (for example in a process gas heater), as an inert gas (for example in the deaeration unit, reactor, BPU, or cooler), or in a secondary recovery unit.

In various embodiments, the process operates by first outputting the biogenic activated carbon product 126/226 from the cooling zone 116/216 onto the transport system using a suitable discharge mechanism from the cooling reactor/zone 116/216. In one embodiment, the biogenic activated carbon product 126/216 are spread across the width of the transport system to minimize material stacking or bunching and maximize surface area for gaseous absorption. At the point which the biogenic activated carbon product 126/216 are deposited and suitably spread onto the transport system, in various embodiments, the transport system transports the biogenic activated carbon product 126/216 through the opening in the carbon recovery unit 104 defined between the lower portion and the top portion discussed above. In the carbon recovery unit 104, the biogenic activated carbon product 126/216 adsorb gases piped into the lower portion of the carbon recovery unit 104 from the gas-phase separator 200. After the biogenic activated carbon product is enriched with non-polar gases, it should be appreciated that the biogenic activated carbon product becomes a high carbon biogenic activated carbon product. In various embodiments, the high carbon biogenic activated carbon product is a final product of the process disclosed herein and is transported away from the carbon recovery unit 104 into a suitable storage or post-processing apparatus.

In one embodiment, after the enriched gases 204 pass through the conveyor and the biogenic activated carbon product 126/216, the resulting gas is extracted at the top portion of the carbon recovery unit 104. In various embodiments, the exhausted gases 134 are carried away to a suitable scrubber, stack or recovery system. In some embodiments, the exhaust gases are exploited for any reusable qualities in the system, including usage in a secondary carbon recovery unit or for energy. In various embodiments, off-gases that are not sent to the carbon recovery unit may be used for either energy recovery (for example in a process gas heater) or as an inert gas (for example in the deaeration unit, reactor, BPU, or cooler). Similarly, in various embodiments, off-gases from the carbon recovery unit may be used for either energy recovery (for example in a process gas heater), as an inert gas (for example in the deaeration unit, reactor, BPU, or cooler), or in a secondary recovery unit.

It should be appreciated that the biogenic activated carbon product 126/216 include a high amount of carbon, and carbon has a high preference for adsorbing non-polar gases. It should also be appreciated that the enriched gas stream 204 includes primarily non-polar gases like terpenes, carbon monoxide, carbon dioxide and methane. In various embodiments, as the enriched gases are directed from the gas-phase separator into the carbon recovery unit, the gas flow rate and the conveyor speed are monitored and controlled to ensure maximum absorption of the non-polar gases in the biogenic activated carbon product 126/216. In another embodiment, the high-energy organic compounds comprise at least a portion of the enriched gases 204 eluted during carbonization of the biomass, and outputted from the gas-phase separator 200 to the carbon recovery unit 104. In various embodiments, the enriched gases 204 are further enriched with additional additives prior to being introduced to the carbon recovery unit or material enrichment unit.

As discussed in more detail below, in various embodiments, the residence time of the biogenic activated carbon product 126/216 in the carbon recovery unit is controlled and varies based upon the composition of the biogenic activated carbon product 126/216 and gas flow and composition. In one embodiment, the biogenic activated carbon product is passed through one or more carbon recovery units more than one time. In various embodiments, the output of enriched air from the gas-phase separator and the output of exhausted air from the carbon recovery unit 104 can be diverted or bifurcated into an additional carbon recovery unit or further refined or used for energy or inert gas for use in the process.

Referring more generally to FIGS. 6 to 13, various embodiments of the present disclosure are illustrated and discussed. It should be appreciated that the various embodiments and alternatives discussed below with respect to FIGS. 6 to 13 apply to the embodiments of FIGS. 1 to 5 discussed above, and vice versa.

Figures 6, 7:
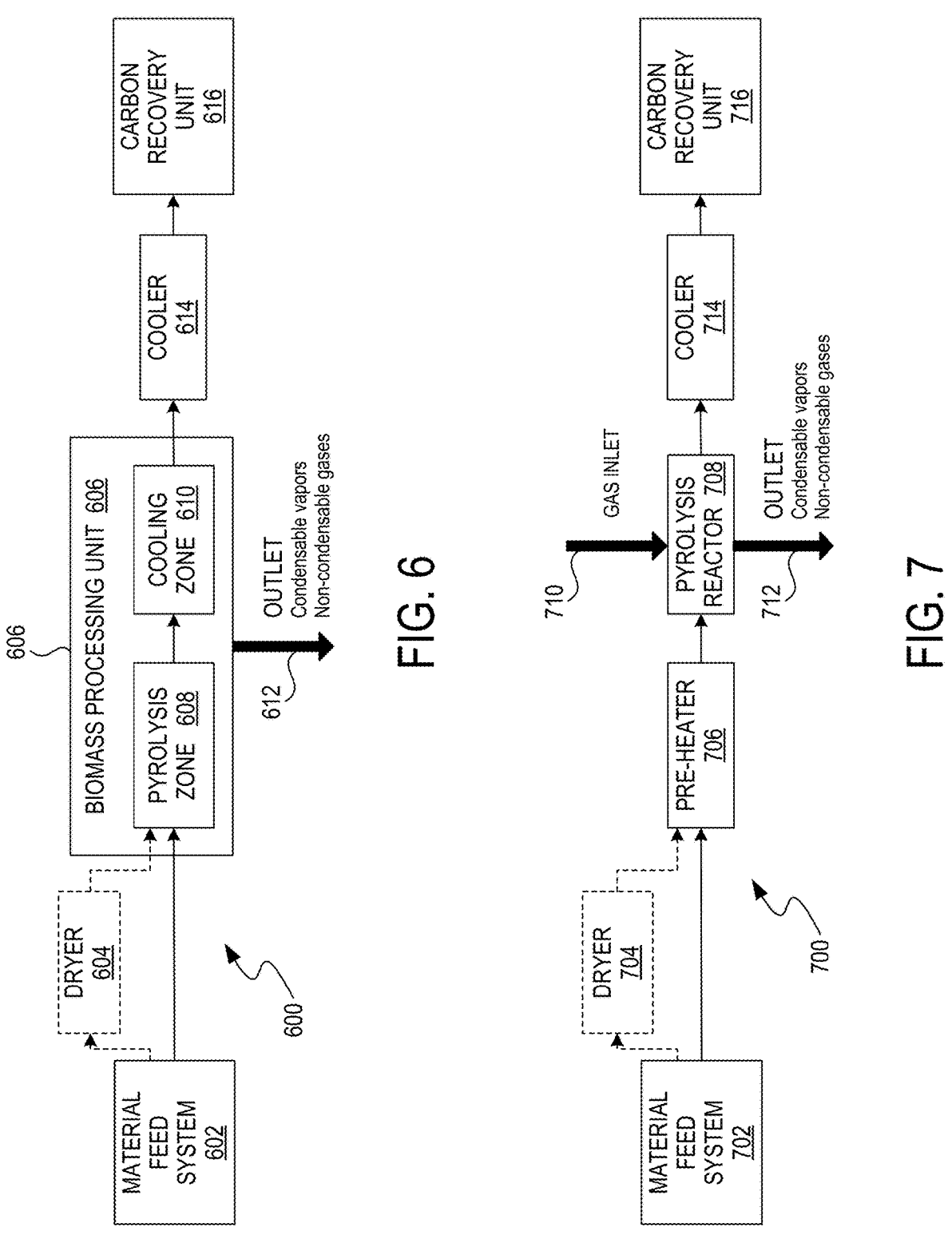
FIG. 6 depicts an embodiment of one embodiment of a single-reactor biomass processing unit of the present disclosure with an optional dryer.
FIG. 7 depicts a pyrolysis reactor system embodiment of the disclosure with an optional dryer and a gas inlet.

Referring specifically now to FIG. 6, this embodiment can utilize a BPU including a single reactor having two to a greater plurality of different zones. Two zones are shown in the illustrative embodiment, however, any different number of zones could be employed. In one embodiment, each zone is connected to at least one other zone via a material transport unit (not pictured). In one embodiment, the material transport unit controls atmosphere and temperature conditions.

Specifically in one embodiment illustrated in FIG. 6, the system 600 includes a material feed system 602, a BPU 606 including a pyrolysis zone 608 and a cooling zone 610, a cooler 614 and a carbon recovery unit 616. It should be appreciated that the cooler 614 of FIG. 6 is outside of the BPU 606, and is in addition to the cooling zone 610 that resides within the BPU 606.

In various embodiments, the system 600 includes an optional dryer between the material feed system 602 and the BPU 606. In various embodiments, the BPU 606 includes a plurality of zones. In FIG. 6, the BPU 606 includes a pyrolysis zone 608 and a cooling zone 610. The BPU 606 also includes at least a plurality of inlets and outlets for adding substances to and removing various substances from the plurality of zone 608, 610, including at least condensable vapors and non-condensable gases 612. It should be appreciated that in various embodiments discussed below, one or more of the plurality of zone 608 or 610 are enclosed by the BPU 606.

Referring now to FIG. 7, a system 700 of one embodiment is illustrated and discussed. System 700 includes a single-reactor system, including a material feed system 702, a pre-heater 706, a pyrolysis reactor 708, a cooler, 714 and a carbon recovery unit 716. In various embodiments, the system 700 includes an optional dryer 704 between the material feed system 702 and the pre-heater 706. As seen in FIG. 7, the pyrolysis reactor 708 of one embodiment includes at least one gas inlet 710 and at least one outlet 712 for outputting substances from the pyrolysis reactor 708. In various embodiments, the substances outputted through outlet 712 include condensable vapors and/or non-condensable gases. It should be appreciated that the pyrolysis reactor 708 can include one or more zones, not discussed in detail herein. In various embodiments, the system 700 includes one or more reactors in addition to the pyrolysis reactor 708.

Figure 8:
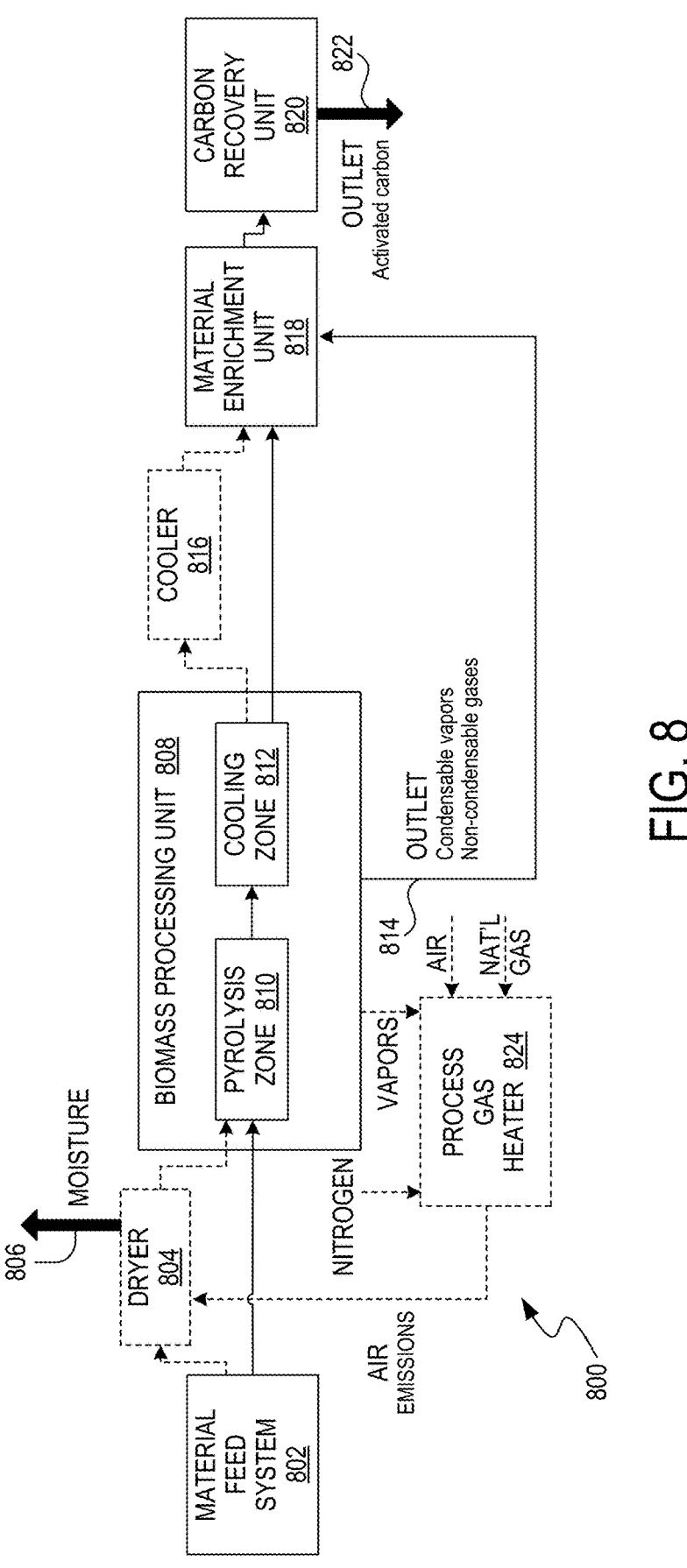
FIG. 8 depicts an embodiment of a single-reactor biomass processing unit of the disclosure with a gas inlet and an optional cooler.

Referring now to FIG. 8, a single-reactor, multiple zone BPU system 800 of one embodiment is illustrated and discussed. System 800 includes a material feed system 802, a BPU 808 having a pyrolysis zone 810 and a cooling zone 812, a material enrichment unit 818, and a carbon recovery unit 820. Similar to the embodiments discussed above, FIG. 8 also includes an optional dryer 804 located between the material feed system 802 and the BPU 808. It should be appreciated that moisture 806 from the dryer 804 is removed during the drying process. FIG. 8 also includes an optional cooler 816 outside of the BPU 808 and before the material enrichment unit 818. As discussed in more detail below, the material enrichment unit 818 is in communication with a gas outlet 814 of the BPU 808, which carries condensable vapors and non-condensable gases from the BPU. It should be appreciated that various embodiments illustrated in FIG. 8 include a separate carbon recovery unit 820 from the material enrichment unit 818. As discussed above, in various embodiments, the carbon recovery unit 820 of FIG. 8 is an appropriate vessel in which the enriched material is stored following the material enrichment unit 818, and the carbon recovery unit 820 does not further enrich the material.

It should be appreciated that, in various embodiments, an optional process gas heater 824 is disposed in the system and attached to the BPU 808. In various embodiments, vapors or other off-gases from the BPU 808 are inputted into the optional process gas heater 824, along with an external source of any one or more of air, natural gas, and nitrogen. As discussed below, in various embodiments, the air emissions from the process gas heater 824 are inputted into dryer 804 as a heat or energy recovery system.

Figure 9:
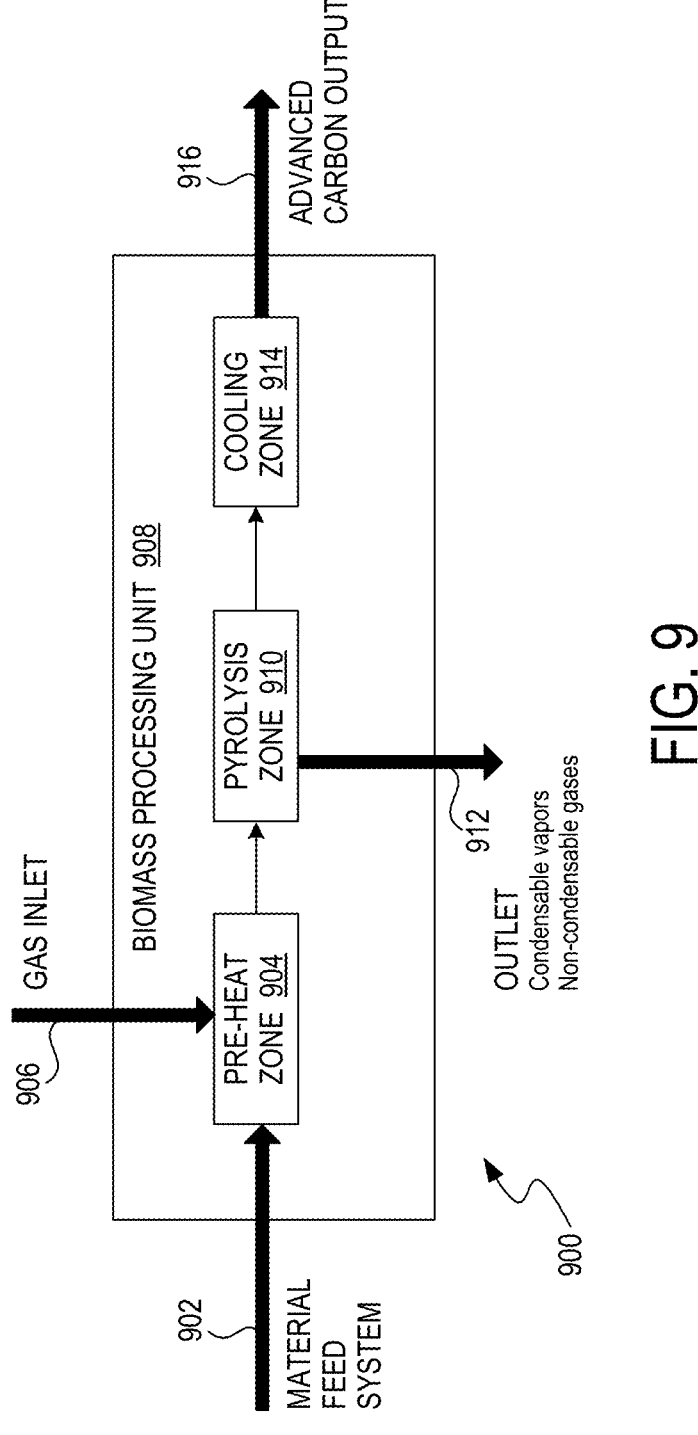
FIG. 9 depicts a single-reactor biomass processing unit system embodiment of the disclosure with an optional dryer and de-aerator, and an inert gas inlet.

Referring now to FIG. 9, a BPU 908 of a system 900 of one embodiment is illustrated and discussed. The BPU 908 includes a plurality of zones: the pre-heat zone 904, the pyrolysis zone 910, and the cooling zone 914. The BPU 908 of one embodiment also includes a material feed system 902 in communication with one of the zones at least one gas inlet 906 in communication with one or more of the zones 904, 910, 914. In various embodiments, as discussed below, one of the zones also includes at least one outlet 912 for outputting substances, in one embodiment, condensable vapors and/or non-condensable gases. In various embodiments, one of the zones also includes an outlet for outputting the advanced carbon from the system 900.

It should be appreciated that, although FIG. 9 shows the gas inlet 906 being connected to the pre-heat zone 904, various embodiments include inlets into any combination of the three zones. Similarly, it should be appreciated that although the gaseous outlet 912 comes from the pyrolysis zone 910, various embodiments include outlets out of one or more of any combination of the three zones. As discussed below, various embodiments contemplated include inputs and outputs within the BPU: e.g., an outlet of the pyrolysis zone 910 is then input into the pre-heat zone 904. It should be appreciated that, in the illustrated embodiment, each of the reactors in the BPU is connected to one another via the material feed system, as discussed above.

In various embodiments, the pre-heat zone 904 of the BPU 908 is configured for feeding biomass 902 (or another carbon-containing feedstock) in a manner that does not "shock" the biomass, which would rupture the cell walls and initiate fast decomposition of the solid phase into vapors and gases. In one embodiment, pre-heat zone 904 can be thought of as mild pyrolysis.

In various embodiments, pyrolysis zone 910 of the BPU 908 is configured as the primary reaction zone, in which preheated material undergoes pyrolysis chemistry to release gases and condensable vapors, resulting in a solid material which is a high-carbon reaction intermediate. Biomass components (primarily cellulose, hemicellulose, and lignin) decompose and create vapors, which escape by penetrating through pores or creating new nanopores. The latter effect contributes to the creation of porosity and surface area.

In various embodiments, the cooling zone 914 of the BPU 908 is configured for receiving the high-carbon reaction intermediate and cooling down the solids, i.e. the cooling zone 914 will be a lower temperature than the pyrolysis zone 910. In the cooling zone 914, the chemistry and mass transport can be complex. In various embodiments, secondary reactions occur in the cooling zone 914. It should be appreciated that carbon-containing components that are in the gas phase can decompose to form additional fixed carbon and/or become adsorbed onto the carbon. Thus, the advanced carbon 916 is not simply the solid, devolatilized residue of the processing steps, but rather includes additional carbon that has been deposited from the gas phase, such as by decomposition of organic vapors (e.g., tars) that can form carbon.

Figure 10:
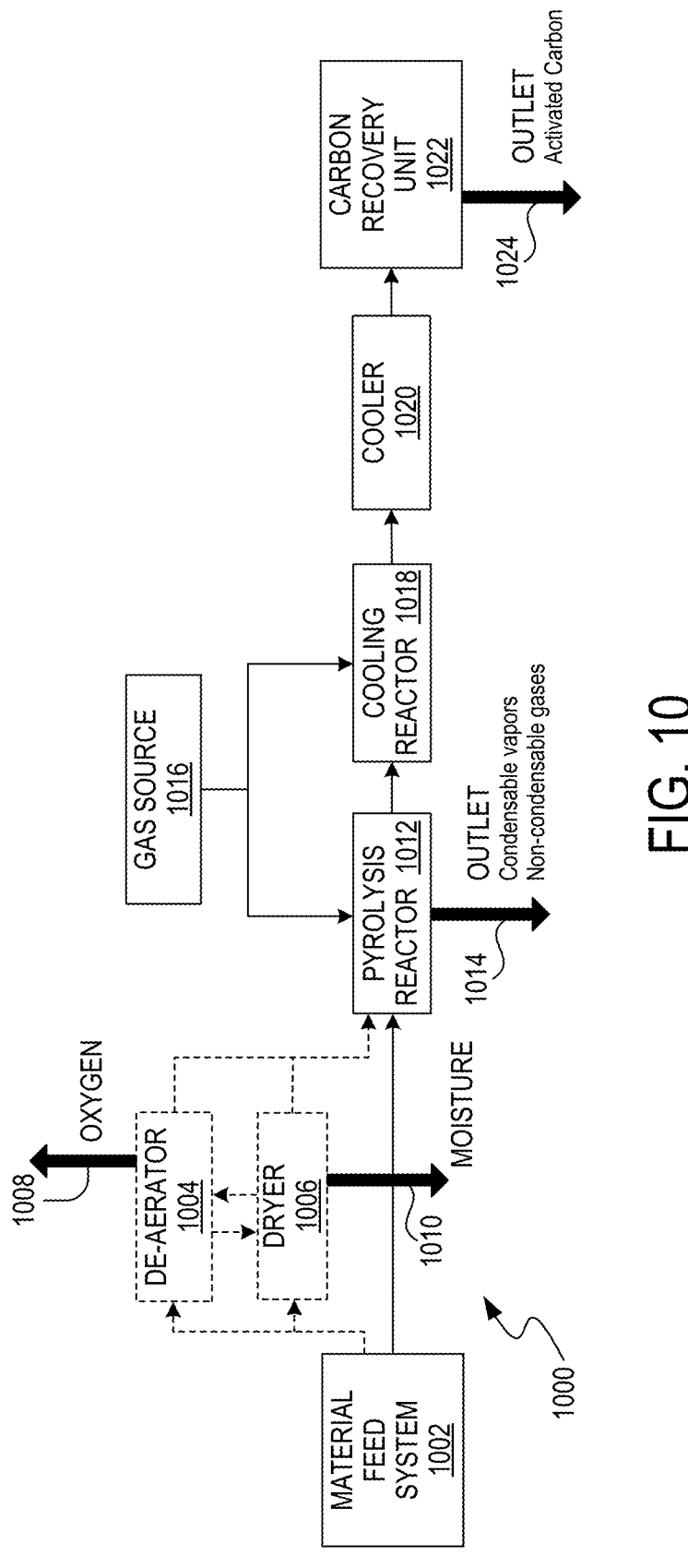
FIG. 10 depicts a multiple-reactor system embodiment of the disclosure with an optional dryer and de-aerator, and an inert gas inlet.

Referring now to FIGS. 10 to 13, various multiple reactor embodiments of the system are illustrated and discussed. Similar to each of the embodiments, the systems include an optional deaerator and an optional dryer, as discussed in more detail below. Referring to FIG. 10, the system 1000 includes material feed system 1002, a pyrolysis reactor 1012, a cooling reactor 1018, a cooler 1020 and a carbon recovery unit 1022. As discussed further below, a gas source 1016 is configured to input gas into one or both of the pyrolysis reactor 1012 and the cooling reactor 1018. In various embodiments, the pyrolysis reactor includes an outlet to output at least condensable vapors and/or non-condensable gases. In various embodiments, the carbon recovery unit 1022 includes an outlet 1024 to output activated carbon from the system 1000.

It should be appreciated that, in various embodiments illustrated at least in FIGS. 10 to 13, the illustrated systems includes an optional de-aerator and an optional dryer. As seen in FIG. 10, for example, represented by broken lines, the optional de-aerator 1004 is connected to the system 1000 between the material feed system 1002 and the pyrolysis reactor 1002. Similarly, the dryer 1006 is connected to the system 1000 between the material feed system 1002 and the pyrolysis reactor 1012. In various embodiments, the dryer 1006 and deaerator 1004 are also connected to one another such that the material from the material feed system can follow any number of different paths through the material feed system, the de-aerator, the dryer, and to the pyrolysis reactor. It should be appreciated that in some embodiments, the material only passes through one of the optional de-aerator 1004 and dryer 1006.

In some embodiments, with reference to FIG. 10, a process for producing a biogenic activated carbon comprises the following steps:

(a) providing a carbon-containing feedstock comprising biomass;

(b) optionally drying the feedstock to remove at least a portion of moisture contained within the feedstock;

(c) optionally deaerating the feedstock to remove at least a portion of interstitial oxygen, if any, contained with the feedstock;

(d) pyrolyzing the feedstock in the presence of a substantially inert gas phase for at least 10 minutes and with at least one temperature selected from about 250° C. to about 700° C., to generate hot pyrolyzed solids, condensable vapors, and non-condensable gases;

(e) separating at least a portion of the condensable vapors and at least a portion of the non-condensable gases from the hot pyrolyzed solids;

(f) cooling the hot pyrolyzed solids to generate cooled pyrolyzed solids; and (g) recovering a biogenic activated carbon comprising at least a portion of the cooled pyrolyzed solids.

Figure 11:
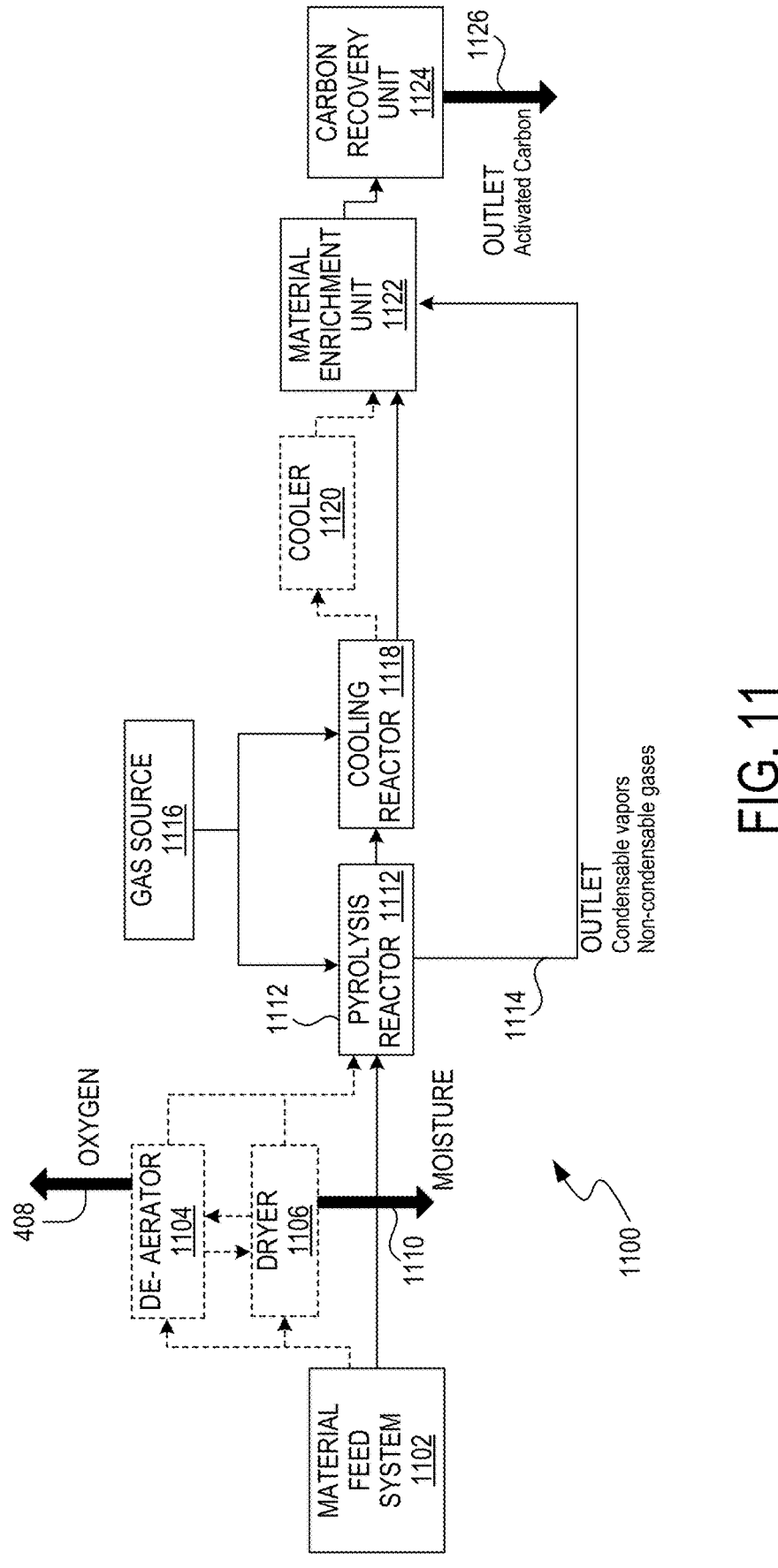
FIG. 11 depicts a multiple-reactor system embodiment of the disclosure with an optional dryer and cooler, and a material enrichment unit.
Figure 12:
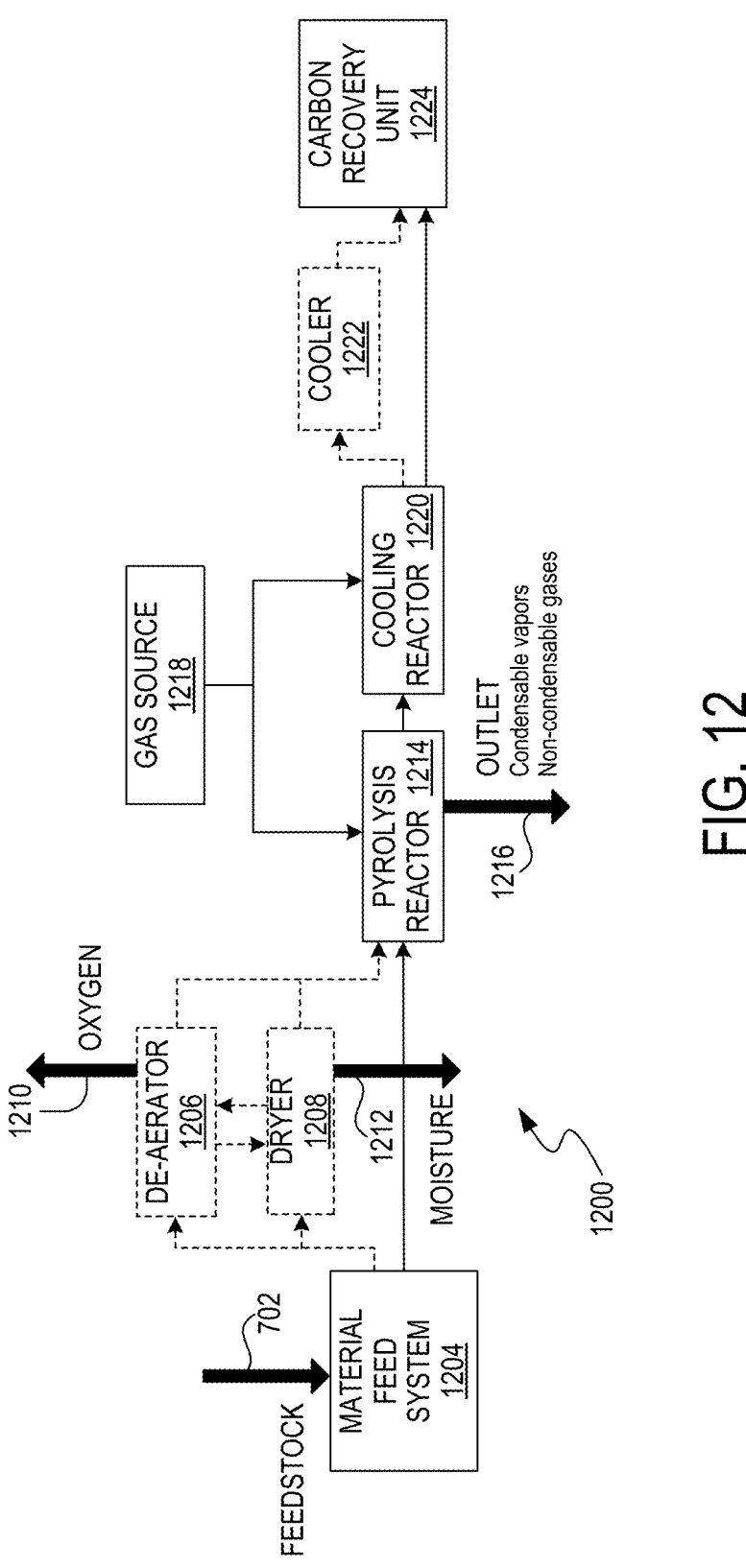
FIG. 12 depicts a multiple-reactor system embodiment of the disclosure with an optional dryer, de-aerator, a cooler, and an inert gas inlet.
Figure 13:
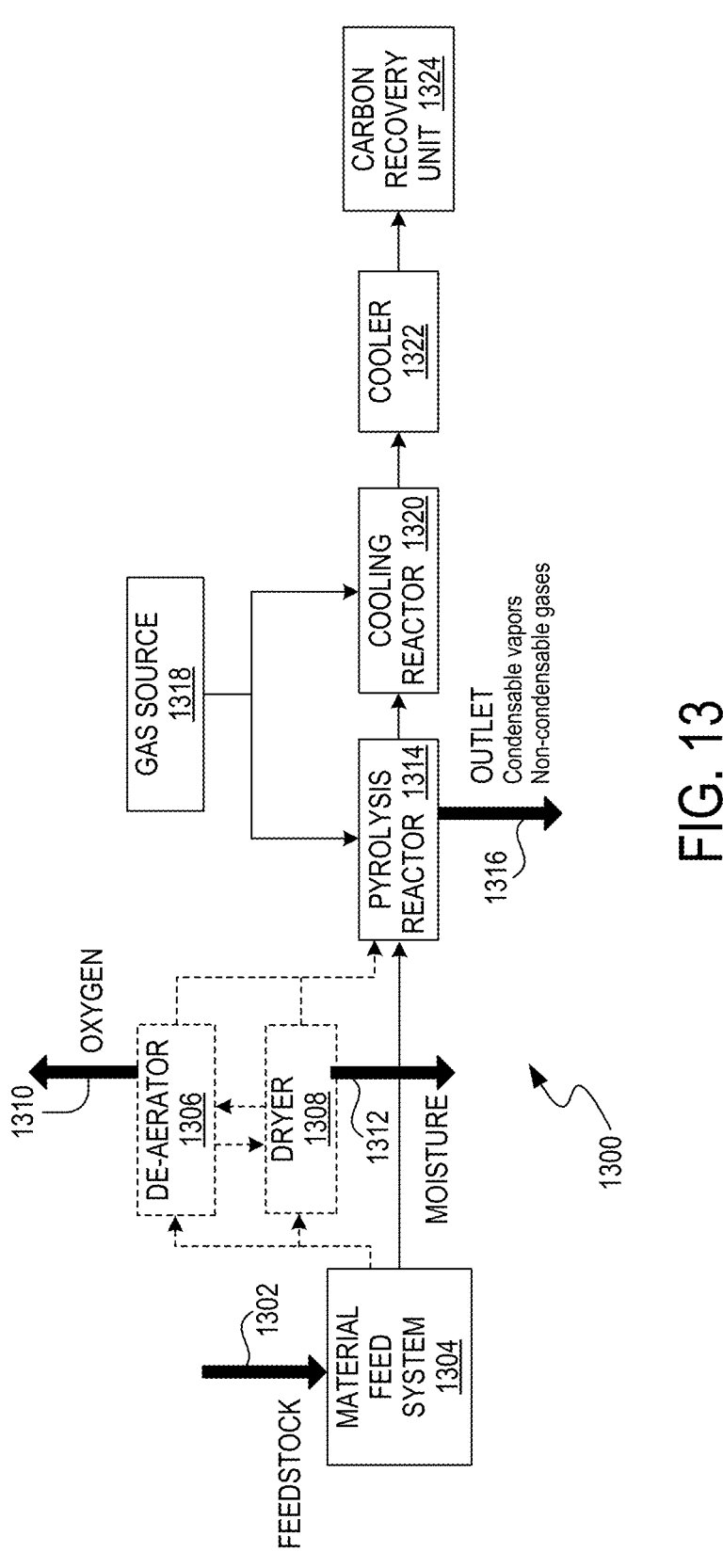
FIG. 13 depicts a multiple-reactor system embodiment of the disclosure with an optional dryer and de-aerator, an inert gas inlet, and a cooler.

Referring now to FIG. 11 a multiple reactor system 1100 of one embodiment is illustrated. Similar to the embodiment discussed above and illustrated in FIG. 10, this embodiment includes a material feed system 1102, pyrolysis reactor 1112, cooling reactor 1118, and carbon recovery unit 1124. In the illustrated embodiment of FIG. 11, the cooler 1120 is optional, and a material enrichment unit 1122 is disposed between the optional cooler 1120 and the carbon recovery unit 1124. It should be appreciated that, in various embodiments, the material enrichment unit 1122 enriches the material before it continues into the separate carbon recovery unit 1124, which may or may not further enrich the material. In various embodiments, an optional deaerator 1104 and an optional dryer 1106 are disposed between the material feed system 1102 and the pyrolysis reactor 1112. In the illustrated embodiment, the pyrolysis reactor 1112 also includes an outlet 1114 configured to remove substances such as condensable vapors and non-condensable gases, and route the removed substances to the material enrichment unit 1122.

Various embodiments extend the concept of additional carbon formation by including a separate material enrichment unit 818, 1122 in which cooled carbon is subjected to an environment including carbon-containing species, to enrich the carbon content of the final product. When the temperature of this unit is below pyrolysis temperatures, the additional carbon is expected to be in the form of adsorbed carbonaceous species, rather than additional fixed carbon.

As will be described in detail below, there are a large number of options as to intermediate input and output (purge or probe) streams of one or more phases present in any particular reactor, various mass and energy recycle schemes, various additives that may be introduced anywhere in the process, adjustability of process conditions including both reaction and separation conditions in order to tailor product distributions, and so on. Zone or reactor-specific input and output streams enable good process monitoring and control, such as through FTIR sampling and dynamic process adjustments.

The present disclosure is different than fast pyrolysis, and it is different than conventional slow pyrolysis. High-quality carbon materials in the present disclosure, including compositions with high fractions of fixed carbon, may be obtained from the disclosed processes and systems.

"Biomass," for purposes of this disclosure, shall be construed as any biogenic feedstock or mixture of a biogenic and non-biogenic feedstock. Elementally, biomass includes at least carbon, hydrogen, and oxygen. The methods and apparatus of the disclosure can accommodate a wide range of feedstocks of various types, sizes, and moisture contents.

Biomass includes, for example, plant and plant-derived material, vegetation, agricultural waste, forestry waste, wood waste, paper waste, animal-derived waste, poultry-derived waste, and municipal solid waste. In various embodiments of the disclosure utilizing biomass, the biomass feedstock may include one or more materials selected from: timber harvesting residues, softwood chips, hardwood chips, tree branches, tree stumps, knots, leaves, bark, sawdust, off-spec paper pulp, cellulose, corn, corn stover, wheat straw, rice straw, sugarcane bagasse, switchgrass, miscanthus, animal manure, municipal garbage, municipal sewage, commercial waste, grape pumice, almond shells, pecan shells, coconut shells, coffee grounds, grass pellets, hay pellets, wood pellets, cardboard, paper, carbohydrates, plastic, and cloth. A person of ordinary skill in the art will readily appreciate that the feedstock options are virtually unlimited.

Various embodiments of the present disclosure are also be used for carbon-containing feedstocks other than biomass, such as a fossil fuel (e.g., coal or petroleum coke), or any mixtures of biomass and fossil fuels (such as biomass/coal blends). In some embodiments, a biogenic feedstock is, or includes, coal, oil shale, crude oil, asphalt, or solids from crude-oil processing (such as petcoke). Feedstocks may include waste tires, recycled plastics, recycled paper, and other waste or recycled materials. Any method, apparatus, or system described herein may be used with any carbonaceous feedstock. Carbon-containing feedstocks may be transportable by any known means, such as by truck, train, ship, barge, tractor trailer, or any other vehicle or means of conveyance.

Selection of a particular feedstock or feedstocks is not regarded as technically critical, but is carried out in a manner that tends to favor an economical process. Typically, regardless of the feedstocks chosen, there can be (in some embodiments) screening to remove undesirable materials. The feedstock can optionally be dried prior to processing.

The feedstock employed may be provided or processed into a wide variety of particle sizes or shapes. For example, the feed material may be a fine powder, or a mixture of fine and coarse particles. The feed material may be in the form of large pieces of material, such as wood chips or other forms of wood (e.g., round, cylindrical, square, etc.). In some embodiments, the feed material comprises pellets or other agglomerated forms of particles that have been pressed together or otherwise bound, such as with a binder.

It is noted that size reduction is a costly and energy-intensive process. Pyrolyzed material can be sized with significantly less energy input, i.e. it can be more energy efficient to reduce the particle size of the product, not the feedstock. This is an option in the present disclosure because the process does not require a fine starting material, and there is not necessarily any particle-size reduction during processing. The present disclosure provides the ability to process very large pieces of feedstock. Notably, some market applications of the activated carbon product actually require large sizes (e.g., on the order of centimeters), so that in some embodiments, large pieces are fed, produced, and sold. It should be appreciated that, while not necessary in all embodiments of this disclosure, smaller sizing has resulted in higher fixed carbon numbers under similar process conditions and may be utilized in some applications that typically call for small sized activated carbon products and/or higher fixed carbon content.

When it is desired to produce a final carbonaceous biogenic activated carbon product that has structural integrity, such as in the form of cylinders, there are at least two options in the context of this disclosure. First, the material produced from the process is collected and then further process mechanically into the desired form. For example, the product is pressed or pelletized, with a binder. The second option is to utilize feed materials that generally possess the desired size and/or shape for the final product, and employ processing steps that do not destroy the basic structure of the feed material. In some embodiments, the feed and product have similar geometrical shapes, such as spheres, cylinders, or cubes.

The ability to maintain the approximate shape of feed material throughout the process is beneficial when product strength is important. Also, this control avoids the difficulty and cost of pelletizing high fixed-carbon materials.

The starting feed material in various embodiments is provided with a range of moisture levels, as will be appreciated. In some embodiments, the feed material is already sufficiently dry that it need not be further dried before pyrolysis. Typically, it will be desirable to utilize commercial sources of biomass which will usually contain moisture, and feed the biomass through a drying step before introduction into the pyrolysis reactor. However, in some embodiments a dried feedstock is used. It should be appreciated that, in various embodiments, while any biomass works, the following factors may impact the process and its products: how material is grown, harvested, irrigated, material species selection and carbon content. Particularly, in various embodiments, low fertilizer and low phosphorous used in growing results in better properties for metal making. In various embodiments, low impact shearing during harvest results in greater strength. In various embodiments, less irrigation and smaller growth rings may result in greater strength.

It should be appreciated that, in various embodiments additives and/or catalysts are included in the BPU, and temperature profiles within the BPU are selected to promote production of carbon dioxide over carbon monoxide, leading to greater fixed carbon in the final product.

It is desirable to provide a relatively low-oxygen environment in the pyrolysis reactor, such as about 10%, 5%, 3%, or 1% $O_2$ in the gas phase. First, uncontrolled combustion should be avoided in the pyrolysis reactor, for safety reasons. Some amount of total carbon oxidation to $CO_2$ may occur, and the heat released from the exothermic oxidation may assist the endothermic pyrolysis chemistry. Large amounts of oxidation of carbon, including partial oxidation to syngas, will reduce the carbon yield to solids.

Practically speaking, it can be difficult to achieve a strictly oxygen-free environment in each of the reactor(s) or the BPU. This limit can be approached, and in some embodiments, the reactor(s) or the BPU is substantially free of molecular oxygen in the gas phase. To ensure that little or no oxygen is present in the reactor(s) or BPU, it may be desirable to remove air from the feed material before it is introduced to the reactor(s) or the BPU. There are various ways to remove or reduce air in the feedstock.

In some embodiments, as seen in FIGS. 10, 11, 12 and 13, a deaeration unit is utilized in which feedstock, before or after drying, is conveyed in the presence of another gas which can remove adsorbed oxygen and penetrate the feedstock pores to remove oxygen from the pores. Most gases that have lower than 21 vol % $O_2$ may be employed, at varying effectiveness. In some embodiments, nitrogen is employed. In some embodiments, CO and/or $CO_2$ is employed. Mixtures may be used, such as a mixture of nitrogen and a small amount of oxygen. Steam may be present in the deaeration gas, although adding significant moisture back to the feed should be avoided. The effluent from the deaeration unit may be purged (to the atmosphere or to an emissions treatment unit) or recycled.

In principle, the effluent (or a portion thereof) from the deaeration unit could be introduced into the pyrolysis reactor itself since the oxygen removed from the solids will now be highly diluted. In this embodiment, it may be advantageous to introduce the deaeration effluent gas to the last zone of the reactor, when it is operated in a countercurrent configuration.

Various types of deaeration units may be employed. In one embodiment, if drying it to be performed, deaerating after drying prevents the step of scrubbing soluble oxygen out of the moisture present. In certain embodiments, the drying and deaerating steps are combined into a single unit, or some amount of deaeration is achieved during drying.

The optionally dried and optionally deaerated feed material is introduced to a pyrolysis reactor or multiple reactors in series or parallel. The material feed system in various embodiments introduces the feedstock using any known means, including screw material feed systems or lock hoppers, for example. In some embodiments, a material feed system incorporates an airlock.

When a single reactor is employed (such as in FIG. 6, 3 or 4), multiple zones can be present. Multiple zones, such as two, three, four, or more zones, can allow for the separate control of temperature, solids residence time, gas residence time, gas composition, flow pattern, and/or pressure in order to adjust the overall process performance.

As discussed above, references to "zones" shall be broadly construed to include regions of space within a single physical unit (such as in FIG. 6, 8 or 9), physically separate units (such as in FIGS. 7 and 10 to 13), or any combination thereof. For a BPU, the demarcation of zones within that BPU may relate to structure, such as the presence of flights within the BPU or distinct heating elements to provide heat to separate zones. Alternatively, or additionally, in various embodiments, the demarcation of zones in a BPU relates to function, such as at least: distinct temperatures, fluid flow patterns, solid flow patterns, and extent of reaction. In a single batch reactor, "zones" are operating regimes in time, rather than in space. Various embodiments include the use of multiple batch BPUs.

It will be appreciated that there are not necessarily abrupt transitions from one zone to another zone. For example, the boundary between the preheating zone and pyrolysis zone may be somewhat arbitrary; some amount of pyrolysis may take place in a portion of the preheating zone, and some amount of "preheating" may continue to take place in the pyrolysis zone. The temperature profile in the BPU is typically continuous, including at zone boundaries within the zone.

Some embodiments, as seen for example in FIG. 9, employ a pre-heat zone 304 that is operated under conditions of preheating and/or mild pyrolysis. In various embodiments, the temperature of the pre-heat zone 304 is from about 80° C. to about 500° C., such as about 300° C. to about 400° C. In various embodiments, the temperature of the pre-heat zone 304 is not so high as to shock the biomass material which ruptures the cell walls and initiates fast decomposition of the solid phase into vapors and gases. Pyrolysis commonly known as fast or flash pyrolysis is avoided in the present disclosure.

All references to zone temperatures in this specification should be construed in a non-limiting way to include temperatures that may apply to the bulk solids present, or the gas phase, or the reactor or BPU walls (on the process side). It will be understood that there will be a temperature gradient in each zone, both axially and radially, as well as temporally (i.e., following start-up or due to transients). Thus, references to zone temperatures may be references to average temperatures or other effective temperatures that may influence the actual kinetics. Temperatures may be directly measured by thermocouples or other temperature probes, or indirectly measured or estimated by other means.

The second zone, or the primary pyrolysis zone, is operated under conditions of pyrolysis or carbonization. The temperature of the pyrolysis zone may be selected from about 250° C. to about 700° C., such as about 300° C., 350° C., 400° C., 450° C., 500° C., 550° C., 600° C., or 650° C. Within this zone, preheated biomass undergoes pyrolysis chemistry to release gases and condensable vapors, leaving a significant amount of solid material as a high-carbon reaction intermediate. Biomass components (primarily cellulose, hemicellulose, and lignin) decompose and create vapors, which escape by penetrating through pores or creating new pores. The temperature will at least depend on the residence time of the pyrolysis zone, as well as the nature of the feedstock and product properties.

The cooling zone is operated to cool down the high-carbon reaction intermediate to varying degrees. In various embodiments, the temperature of the cooling zone is a lower temperature than that of the pyrolysis zone. In various embodiments, the temperature of the cooling zone is selected from about 100° C. to about 550° C., such as about 150° C. to about 350° C.

In various embodiments, chemical reactions continue to occur in the cooling zone. It should be appreciated that in various embodiments, secondary pyrolysis reactions are initiated in the cooling zone. Carbon-containing components that are in the gas phase can condense (due to the reduced temperature of the cooling zone). The temperature remains sufficiently high, however, to promote reactions that may form additional fixed carbon from the condensed liquids (secondary pyrolysis) or at least form bonds between adsorbed species and the fixed carbon. One exemplary reaction that may take place is the conversion of carbon monoxide to carbon dioxide plus fixed carbon (Boudouard reaction).

The residence times of the zones may vary. For a desired amount of pyrolysis, higher temperatures may allow for lower reaction times, and vice versa. The residence time in a continuous BPU (reactor) is the volume divided by the volumetric flow rate. The residence time in a batch reactor is the batch reaction time, following heating to reaction temperature.

It should be recognized that in multiphase BPUs, there are multiple residence times. In the present context, in each zone, there will be a residence time (and residence-time distribution) of both the solids phase and the vapor phase. For a given apparatus employing multiple zones, and with a given throughput, the residence times across the zones will generally be coupled on the solids side, but residence times may be uncoupled on the vapor side when multiple inlet and outlet ports are utilized in individual zones. in various embodiments, the solids and vapor residence times are uncoupled.

The solids residence time of the preheating zone may be selected from about 5 min to about 60 min, such as about 10 min depending on the temperature and time required to reach a preheat temperature. The heat-transfer rate, which will depend on the particle type and size, the physical apparatus, and on the heating parameters, will dictate the minimum residence time necessary to allow the solids to reach a predetermined preheat temperature.

The solids residence time of the pyrolysis zone may be selected from about 10 min to about 120 min, such as about 20 min, 30 min, or 45 min. Depending on the pyrolysis temperature in this zone, there should be sufficient time to allow the carbonization chemistry to take place, following the necessary heat transfer. For times below about 10 min, in order to remove high quantities of non-carbon elements, the temperature would need to be quite high, such as above 700° C. This temperature would promote fast pyrolysis and its generation of vapors and gases derived from the carbon itself, which is to be avoided when the intended product is solid carbon.

In a static system of various embodiments, an equilibrium conversion is reached at a certain time. When, as in certain embodiments, vapor is continuously flowing over solids with continuous volatiles removal, the equilibrium constraint may be removed to allow for pyrolysis and devolatilization to continue until reaction rates approach zero. Longer times would not tend to substantially alter the remaining recalcitrant solids.

The solids residence time of the cooling zone in various embodiments may be selected from about 5 min to about 60 min, such as about 30 min. Depending on the cooling temperature in this zone, there should be sufficient time to allow the carbon solids to cool to the desired temperature.

The cooling rate and temperature will dictate the minimum residence time necessary to allow the carbon to be cooled. Additional time may not be desirable, unless some amount of secondary pyrolysis is desired.

As discussed above, the residence time of the vapor phase may be separately selected and controlled. The vapor residence time of the preheating zone may be selected from about 0.1 min to about 10 min, such as about 1 min. The vapor residence time of the pyrolysis zone may be selected from about 0.1 min to about 20 min, such as about 2 min. The vapor residence time of the cooling zone may be selected from about 0.1 min to about 15 min, such as about 1.5 min. Short vapor residence times promote fast sweeping of volatiles out of the system, while longer vapor residence times promote reactions of components in the vapor phase with the solid phase.

The mode of operation for the reactor, and overall system, may be continuous, semi-continuous, batch, or any combination or variation of these. In some embodiments, the BPU is a continuous, countercurrent reactor in which solids and vapor flow substantially in opposite directions. The BPU may also be operated in batch but with simulated countercurrent flow of vapors, such as by periodically introducing and removing gas phases from the batch vessel.

Various flow patterns may be desired or observed. With chemical reactions and simultaneous separations involving multiple phases in multiple zones, the fluid dynamics can be quite complex. Typically, the flow of solids may approach plug flow (well-mixed in the radial dimension) while the flow of vapor may approach fully mixed flow (fast transport in both radial and axial dimensions). Multiple inlet and outlet ports for vapor may contribute to overall mixing.

The pressure in each zone may be separately selected and controlled. The pressure of each zone may be independently selected from about 1 kPa to about 3000 kPa, such as about 101.3 kPa (normal atmospheric pressure). Independent zone control of pressure is possible when multiple gas inlets and outlets are used, including vacuum ports to withdraw gas when a zone pressure less than or equal to about atmospheric is desired. Similarly, in a multiple reactor system, the pressure in each reactor may be independently selected and controlled.

The process may conveniently be operated at atmospheric pressure, in some embodiments. There are many advantages associated with operation at atmospheric pressure, ranging from mechanical simplicity to enhanced safety. In certain embodiments, the pyrolysis zone is operated at a pressure of about 90 kPa, 95 kPa, 100 kPa, 101 kPa, 102 kPa, 105 kPa, or 110 kPa (absolute pressures).

Vacuum operation (e.g., 10-100 kPa) would promote fast sweeping of volatiles out of the system. Higher pressures (e.g., 100-1000 kPa) may be useful when the off-gases will be fed to a high-pressure operation. Elevated pressures may also be useful to promote heat transfer, chemistry, or separations.

The step of separating at least a portion of the condensable vapors and at least a portion of the non-condensable gases from the hot pyrolyzed solids may be accomplished in the reactor itself, or using a distinct separation unit. A substantially inert sweep gas may be introduced into one or more of the zones. Condensable vapors and non-condensable gases are then carried away from the zone (s) in the sweep gas, and out of the BPU.

The sweep gas may be $N_2$, Ar, CO, $CO_2$, $H_2$, $H_2O$, $CH_4$, other light hydrocarbons, or combinations thereof, for example. The sweep gas may first be preheated prior to introduction, or possibly cooled if it is obtained from a heated source.

The sweep gas more thoroughly removes volatile components, by getting them out of the system before they can condense or further react. The sweep gas allows volatiles to be removed at higher rates than would be attained merely from volatilization at a given process temperature. Or, use of the sweep gas allows milder temperatures to be used to remove a certain quantity of volatiles. The reason the sweep gas improves the volatiles removal is that the mechanism of separation is not merely relative volatility but rather liquid/vapor phase disengagement assisted by the sweep gas. The sweep gas can both reduce mass-transfer limitations of volatilization as well as reduce thermodynamic limitations by continuously depleting a given volatile species, to cause more of it to vaporize to attain thermodynamic equilibrium.

It is important to remove gases laden with volatile organic carbon from subsequent processing stages, in order to produce a product with high fixed carbon. Without removal, the volatile carbon can adsorb or absorb onto the pyrolyzed solids, thereby requiring additional energy (cost) to achieve a purer form of carbon which may be desired. By removing vapors quickly, it is also speculated that porosity may be enhanced in the pyrolyzing solids. In various embodiments, such as activated carbon products, higher porosity is desirable.

In certain embodiments, the sweep gas in conjunction with a relatively low process pressure, such as atmospheric pressure, provides for fast vapor removal without large amounts of inert gas necessary.

In some embodiments, the sweep gas flows countercurrent to the flow direction of feedstock. In other embodiments, the sweep gas flows cocurrent to the flow direction of feedstock. In some embodiments, the flow pattern of solids approaches plug flow while the flow pattern of the sweep gas, and gas phase generally, approaches fully mixed flow in one or more zones.

The sweep may be performed in any one or more of the zones. In some embodiments, the sweep gas is introduced into the cooling zone and extracted (along with volatiles produced) from the cooling and/or pyrolysis zones. In some embodiments, the sweep gas is introduced into the pyrolysis zone and extracted from the pyrolysis and/or preheating zones. In some embodiments, the sweep gas is introduced into the preheating zone and extracted from the pyrolysis zone. In these or other embodiments, the sweep gas may be introduced into each of the preheating, pyrolysis, and cooling zones and also extracted from each of the zones.

In some embodiments, the zone or zones in which separation is carried out is a physically separate unit from the BPU. The separation unit or zone may be disposed between zones, if desired. For example, there may be a separation unit placed between pyrolysis and cooling zones.

The sweep gas may be introduced continuously, especially when the solids flow is continuous. When the pyrolysis reaction is operated as a batch process, the sweep gas may be introduced after a certain amount of time, or periodically, to remove volatiles. Even when the pyrolysis reaction is operated continuously, the sweep gas may be introduced semi-continuously or periodically, if desired, with suitable valves and controls.

The volatiles-containing sweep gas may exit from the one or more zones, and may be combined if obtained from multiple zones. The resulting gas stream, containing various vapors, may then be fed to a process gas heater for control of air emissions, as discussed above and illustrated in FIG.

8. Any known thermal-oxidation unit may be employed. In some embodiments, the process gas heater is fed with natural gas and air, to reach sufficient temperatures for substantial destruction of volatiles contained therein.

The effluent of the process gas heater will be a hot gas stream comprising water, carbon dioxide, and nitrogen. This effluent stream may be purged directly to air emissions, if desired. In some embodiments, the energy content of the process gas heater effluent is recovered, such as in a waste-heat recovery unit. The energy content may also be recovered by heat exchange with another stream (such as the sweep gas). The energy content may be utilized by directly or indirectly heating, or assisting with heating, a unit elsewhere in the process, such as the dryer or the reactor. In some embodiments, essentially all of the process gas heater effluent is employed for indirect heating (utility side) of the dryer. The process gas heater may employ other fuels than natural gas.

The yield of carbonaceous material may vary, depending on the above-described factors including type of feedstock and process conditions. In some embodiments, the net yield of solids as a percentage of the starting feedstock, on a dry basis, is at least 25%, 30%, 35%, 40%, 45%, 50%, or higher. The remainder will be split between condensable vapors, such as terpenes, tars, alcohols, acids, aldehydes, or ketones; and non-condensable gases, such as carbon monoxide, hydrogen, carbon dioxide, and methane. The relative amounts of condensable vapors compared to non-condensable gases will also depend on process conditions, including the water present. In some embodiments, incorporation of an additive before a pyrolysis step improves yield of carbonaceous material compared to an identical process where the additive is added after the pyrolysis step (if at all). In some embodiments, an additive (e.g., a halogen-containing additive) is added to wet biomass and/or after drying the biomass but before pyrolysis and the resulting mass yield of carbonaceous material (e.g., biogenic activated carbon) is greater than the mass yield of a biogenic activated carbon produced additive (i) not added at any time, or (ii) added after pyrolysis, but by an otherwise identical process.

In terms of the carbon balance, in some embodiments the net yield of carbon as a percentage of starting carbon in the feedstock is at least 25%, 30%, 40%, 50%, 60%, 70%, or higher. For example, the in some embodiments the carbonaceous material contains between about 40% and about 70% of the carbon contained in the starting feedstock. The rest of the carbon results in the formation of methane, carbon monoxide, carbon dioxide, light hydrocarbons, aromatics, tars, terpenes, alcohols, acids, aldehydes, or ketones, to varying extents.

In alternative embodiments, some portion of these compounds is combined with the carbon-rich solids to enrich the carbon and energy content of the product. In these embodiments, some or all of the resulting gas stream from the reactor, containing various vapors, may be condensed, at least in part, and then passed over cooled pyrolyzed solids derived from the cooling zone and/or from the separate cooler. These embodiments are described in more detail below.

Following the reaction and cooling within the cooling zone (if present), the carbonaceous solids may be introduced into a cooler. In some embodiments, solids are collected and simply allowed to cool at slow rates. If the carbonaceous solids are reactive or unstable in air, it may be desirable to maintain an inert atmosphere and/or rapidly cool the solids to, for example, a temperature less than or equal to about 40° C., such as ambient temperature. In some embodiments, a water quench is employed for rapid cooling. In some embodiments, a fluidized-bed cooler is employed. A "cooler" should be broadly construed to also include containers, tanks, pipes, or portions thereof. It should be appreciated that in various embodiments, the cooler is distinct from the cooling unit or cooling reactor.

In some embodiments, the process further comprises operating the cooler to cool the warm pyrolyzed solids with steam, thereby generating the cool pyrolyzed solids and superheated steam; wherein the drying is carried out, at least in part, with the superheated steam derived from the cooler. Optionally, the cooler may be operated to first cool the warm pyrolyzed solids with steam to reach a first cooler temperature, and then with air to reach a second cooler temperature, wherein the second cooler temperature is lower than the first cooler temperature and is associated with a reduced combustion risk for the warm pyrolyzed solids in the presence of the air.

Following cooling to ambient conditions, the carbonaceous solids may be recovered and stored, conveyed to another site operation, transported to another site, or otherwise disposed, traded, or sold. The solids may be fed to a unit to reduce particle size. A variety of size-reduction units are known in the art, including crushers, shredders, grinders, pulverizers, jet mills, pin mills, and ball mills.

Screening or some other means for separation based on particle size may be included. The screening may be upstream or downstream of grinding, if present. A portion of the screened material (e.g., large chunks) may be returned to the grinding unit. The small and large particles may be recovered for separate downstream uses. In some embodiments, cooled pyrolyzed solids are ground into a fine powder, such as a pulverized carbon or activated carbon product or increased strength.

Various additives may be introduced throughout the process, before, during, or after any step disclosed herein. The additives may be broadly classified as process additives, selected to improve process performance such as carbon yield or pyrolysis time/temperature to achieve a desired carbon purity; and product additives, selected to improve one or more properties of the biogenic activated carbon, or a downstream product incorporating the reagent. Certain additives may provide enhanced process and product characteristics, such as overall yield of biogenic activated carbon product compared to the amount of biomass feedstock.

The additive may be added at any suitable time during the entire process. For example and without limitation, the additive may be added before, during or after a feedstock drying step; before, during or after a feedstock deaerating step; before, during or after a pyrolysis step; before, during or after a separation step; before, during or after any cooling step; before, during or after a biogenic activated carbon recovery step; before, during or after a pulverizing step; before, during or after a sizing step; and/or before, during or after a packaging step. Additives may be incorporated at or on feedstock supply facilities, transport trucks, unloading equipment, storage bins, conveyors (including open or closed conveyors), dryers, process heaters, or any other units. Additives may be added anywhere into the pyrolysis process itself, using suitable means for introducing additives. Additives may be added after carbonization, or even after pulverization, if desired.

Figure 21:
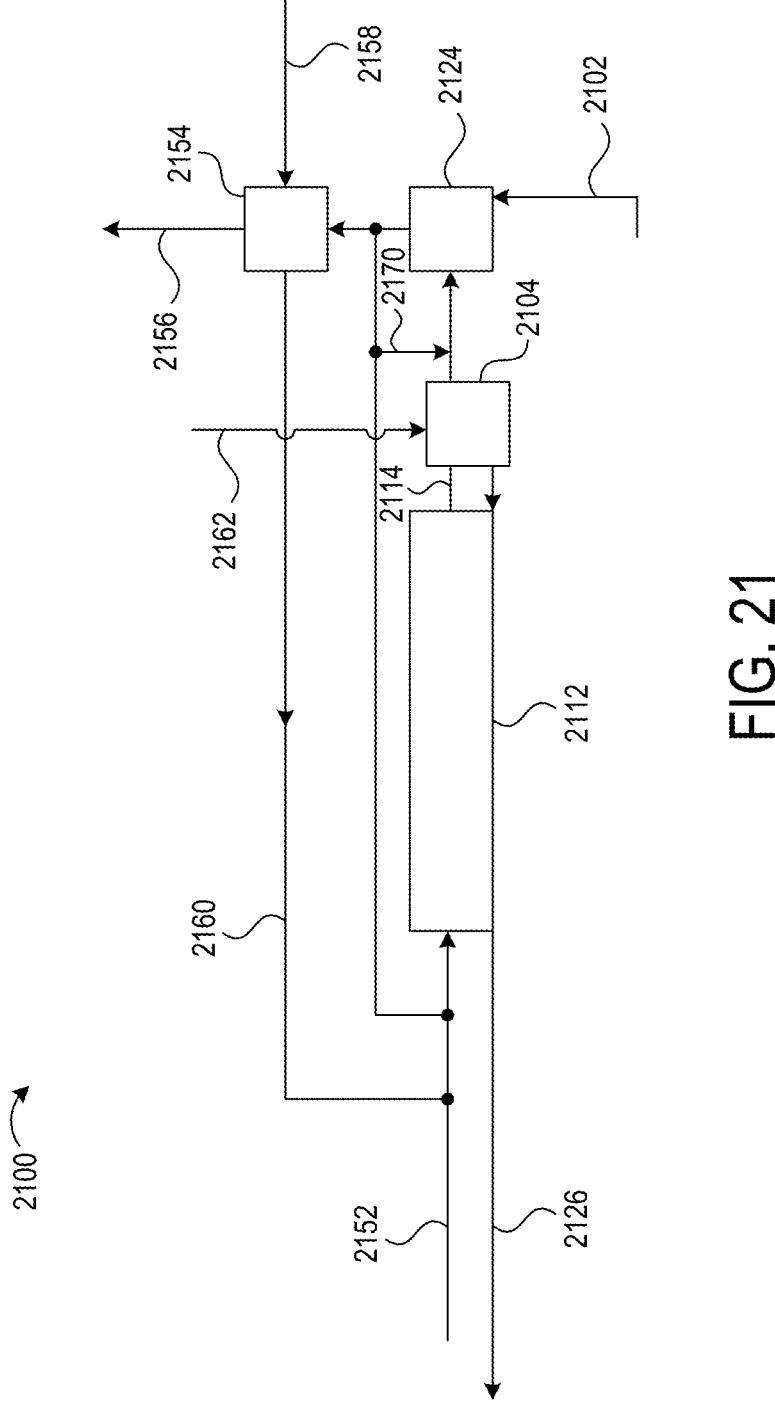
FIG. 21 depicts a single-reactor biomass processing unit embodiment of the disclosure for producing biogenic activated carbon.

Accordingly, one example of a single-reactor biomass processing unit consistent with the present disclosure is depicted in FIG. 21. Unit 2100 comprises a hopper 2104 into which feedstock 2102 is fed. Hopper 2104 is optionally configured to enable addition and/or mixing of reactor off-gases (e.g., vapor stream 2114) and/or additives and/or gases from external sources 2162 to feedstock 2102 before conveying the feedstock 2102 to reactor 2112. Activated carbon 2126 is mechanically conveyed through reactor 2112 before exiting at the opposite end. Steam, nitrogen, carbon dioxide, or a combination thereof 2152 is introduced into reactor 2112 in a countercurrent manner compared to the biomass path. Vapor stream 2114 is removed at least in part from the reactor 2112 and is optionally fed into hopper 2104, and then to a thermal oxidizer 2124. Heat exchanger 2154 enables heat from the emissions of the thermal oxidizer to heat gas stream 2158, which can comprise nitrogen and/or carbon dioxide. Gas stream 2158, or a portion thereof, is recycled via path 2160 to the reactor 2112, and/or optionally to the feedstock 2102 before entry into the reactor 2112 (not shown). Off-gases 2156 can be disposed of according to standard methods, for example through a stack.

Figure 22:
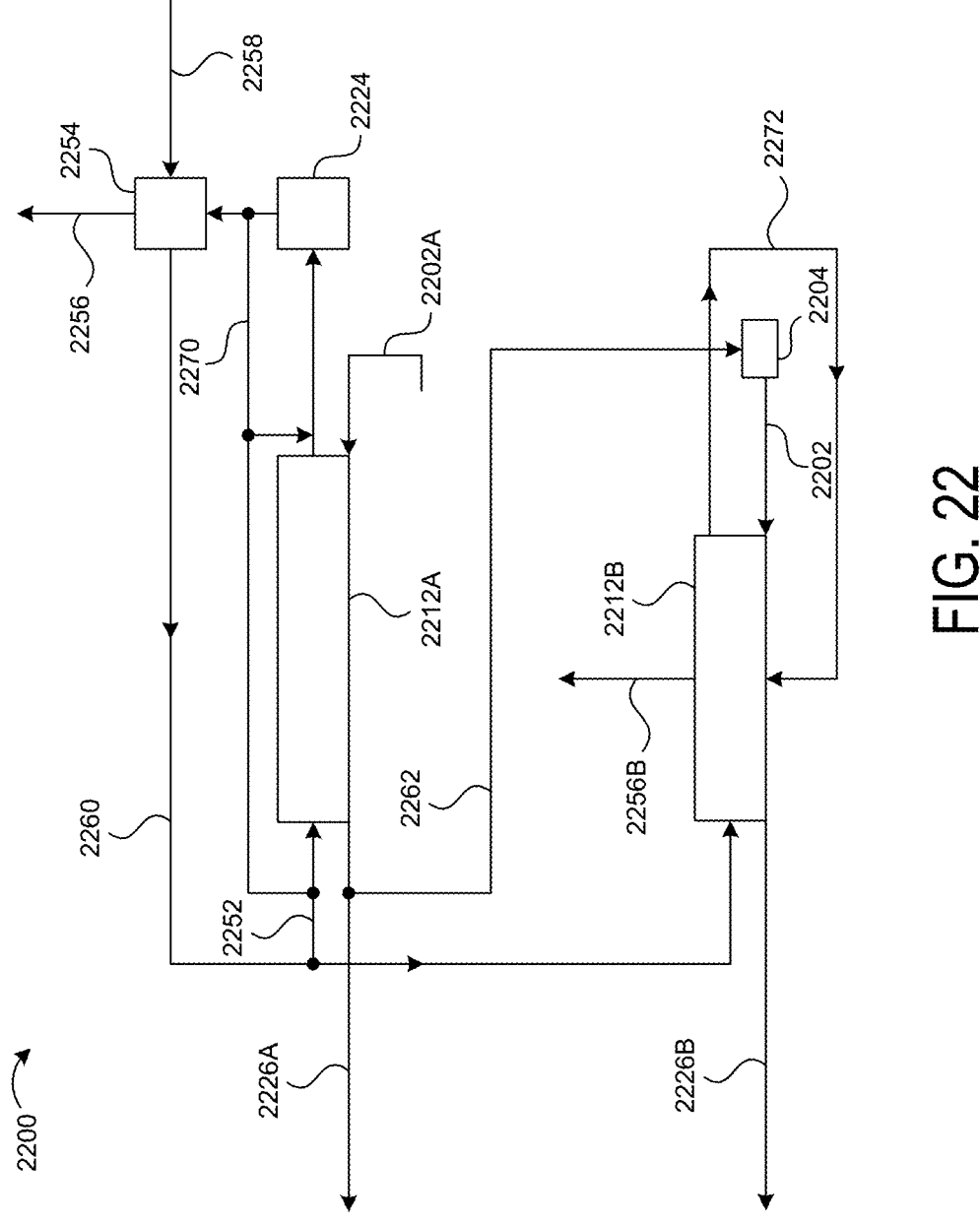
FIG. 22 depicts a two-reactor biomass processing unit embodiment of the disclosure for producing biogenic activated carbon.
Figure 23:
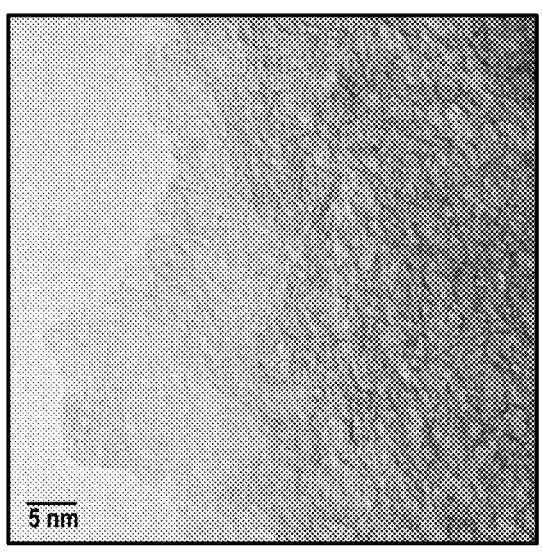
FIG. 23 is a transmission electron micrograph of exemplary activated carbon with an Iodine Number of 2029. The dark, curved line segments are graphene crystallites.
Figure 24:
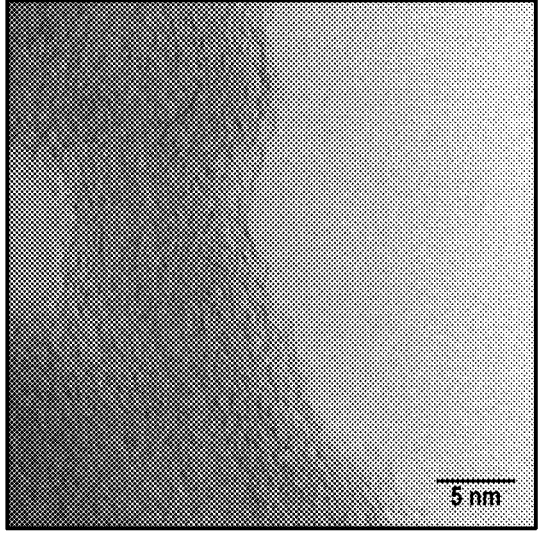
FIG. 24 is a transmission electron micrograph of exemplary activated carbon with an Iodine Number of 2029. The dark, curved line segments are graphene crystallites.
Figure 25:
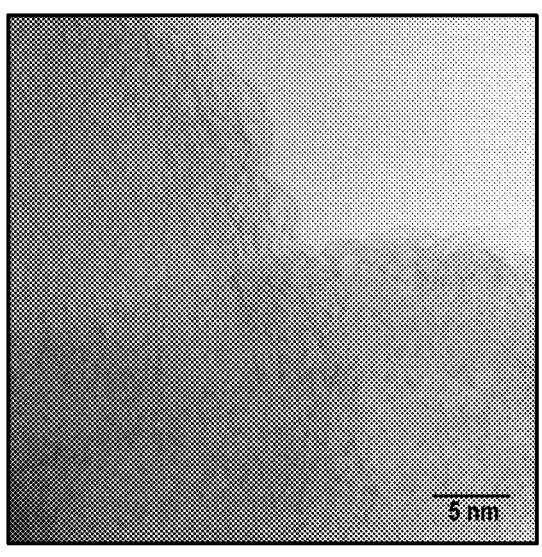
FIG. 25 is a transmission electron micrograph of activated carbon with an Iodine Number of 2029. Parallel lines across image are atomically thin layers of graphene.
Figure 26:
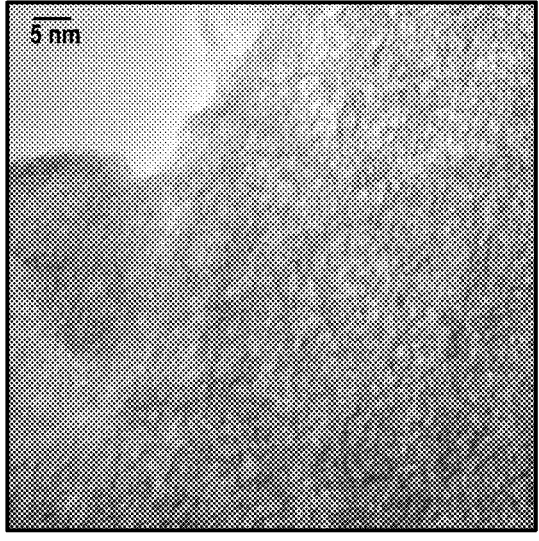
FIG. 26 is a transmission electron micrograph of activated carbon with an Iodine Number of 2029. Dark, curved line segments are graphene crystallites.
Figure 27:
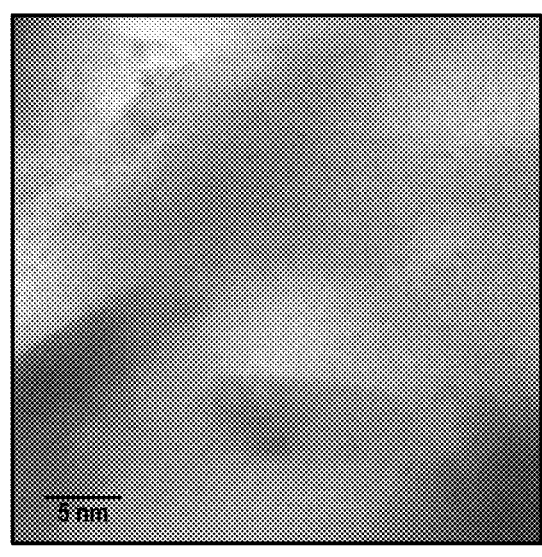
FIG. 27 is a transmission electron micrograph of activated carbon with an Iodine Number of 716. Parallel lines across image are atomically thin layers of graphene.
Figure 28:
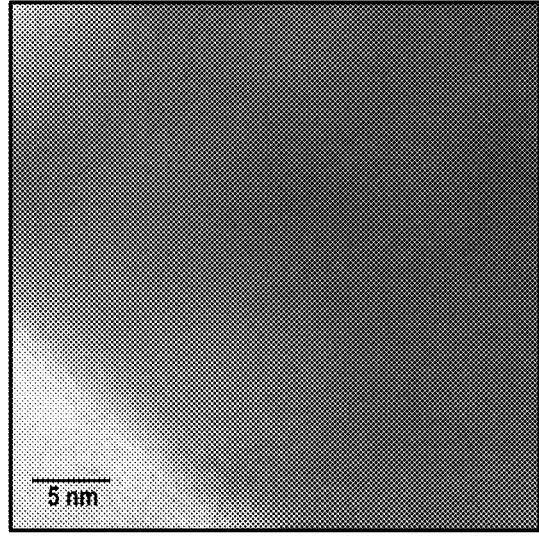
FIG. 28 is a transmission electron micrograph of activated carbon with an Iodine Number of 716. Parallel lines across image are atomically thin layers of graphene within graphite.
Figure 29:
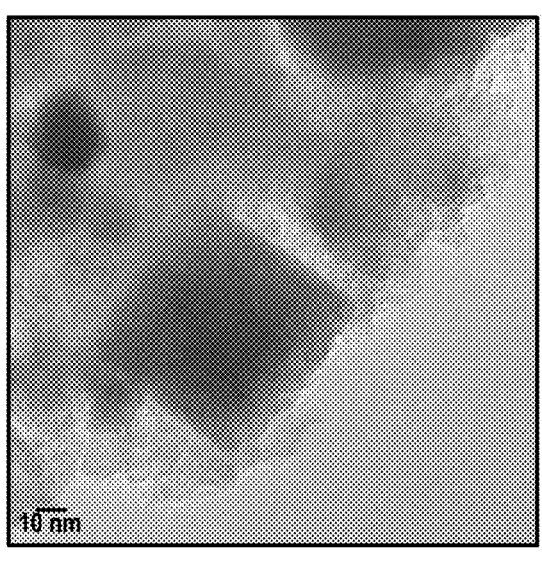
FIG. 29 is a transmission electron micrograph of activated carbon with an Iodine Number of 716. The roughly square object at bottom center is zoomed out from FIG. 28. Lighter regions comprise small graphene crystallites.
Figure 30:
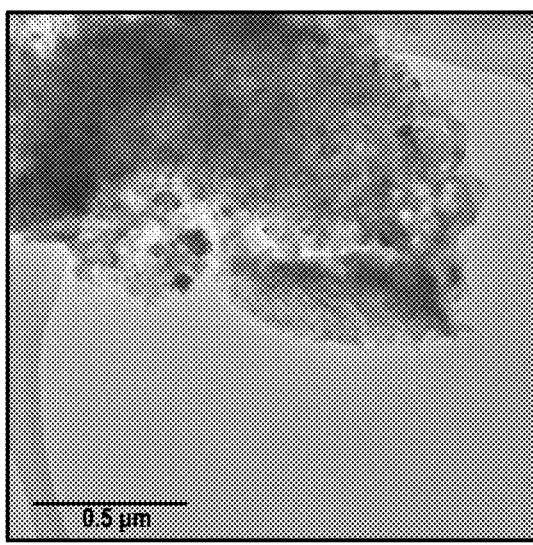
FIG. 30 is a transmission electron micrograph of activated carbon with an Iodine Number of 716. The small, dark, square object left of center is the graphite piece from FIGS. 28 and 29. Lighter regions indicate small graphene crystallites.

The embodiment shown in FIG. 22 illustrates a two-reactor biomass processing unit consistent with the present disclosure. Unit 2200 comprises a first multizone reactor unit 2212A, configured substantially similarly to processing unit 2100 described above with respect to FIG. 21. In this embodiment, however, at least a portion of the biogenic activated carbon 2226A produced by reactor 2212A is fed into a hopper 2204 and then into second reactor 2212B via path 2202. At least a portion of the optionally thermally oxidized and optionally adjusted vapor stream 2260 produced by first reactor 2212A, thermal oxidizer 2224 and heat exchanger 2254 is fed countercurrently into second reactor 2212B. Optionally, at least a portion of the off-gases from second reactor 2212B are recycled via path 2272 to indirectly heat the second reactor 2212B. Alternatively or in addition, portions of the off-gases that are not recycled as heat can be disposed of, for example by a stack, via path 2256B. Biogenic activated carbon product exits second reactor 2212B via path 2226B.

In these or other embodiments, the present disclosure provides a continuous process for producing biogenic activated carbon, the process comprising:

(a) providing a starting carbon-containing feedstock comprising biomass;

(b) optionally drying said feedstock to remove at least a portion of moisture from said feedstock;

(c) in one or more indirectly heated reaction zones, mechanically conveying said feedstock and countercurrently contacting said feedstock with a vapor stream comprising a substantially inert gas and an activation agent comprising at least one of water or carbon dioxide, to generate solids, condensable vapors, and non-condensable gases, wherein said condensable vapors and said non-condensable gases enter said vapor stream;

(d) removing at least a portion of said vapor stream from said reaction zone, to generate a separated vapor stream;

(e) recycling at least a portion of said separated vapor stream, or a thermally treated form thereof, to said feedstock prior to step (c) and/or to a gas inlet of said reaction zone(s); and (f) recovering at least a portion of said solids from said reaction zone(s) as biogenic activated carbon.

In some embodiments, step (b) is carried out to remove at least a portion of moisture contained within the feedstock. For example, the feedstock may be dried to contain about 12 wt % or less moisture, such as about 8 wt % or about 4 wt % or less moisture. In certain embodiments, no additional water is added to the feedstock. The activation agent may include water that is derived from moisture contained originally in the feedstock.

In some embodiments, the activation agent includes both water and carbon dioxide. The ratio of water to carbon dioxide may be optimized to increase activation of the solids.

At least one of the indirectly heated reaction zones is preferably maintained at a reaction temperature selected from about 700° C. to about 900° C. All of the indirectly heated reaction zones are maintained at a maximum reaction temperature less than or equal to about 950° C., in some embodiments.

In some embodiments, step (d) comprises removing at least a portion of the condensable vapors from the reaction zone. In some embodiments, step (d) comprises removing all of the vapor stream from the reaction zone.

In some embodiments, step (e) comprises introducing at least some of the separated vapor stream to the gas inlet of the reaction zone and/or to the feedstock prior to step (c). In some embodiments, step (e) comprises introducing a thermally treated form of at least some of the separated vapor stream to the gas inlet of the reaction zone and/or to the feedstock prior to step (c).

In some embodiments, step (e) further comprises additional heating of the separated vapor stream, or a thermally treated form thereof. In some embodiments, step (e) further comprises adjusting gas composition of the separated vapor stream, or a thermally treated form thereof. Adjusting gas composition may include introducing one or more species selected from the group consisting of water, carbon dioxide, nitrogen, and oxygen.

In some embodiments, the adjusted gas composition comprises from 0% to 100% water, for example about 0%, about 1%, about 2%, about 3%, about 4%, about 5%, about 6%, about 7%, about 8%, about 9%, about 10%, about 11%, about 12%, about 13%, about 14%, about 15%, about 16%, about 17%, about 18%, about 19%, about 20%, about 21%, about 22%, about 23%, about 24%, about 25%, about 26%, about 27%, about 28%, about 29%, about 30%, about 31%, about 32%, about 33%, about 34%, about 35%, about 36%, about 37%, about 38%, about 39%, about 40%, about 41%, about 42%, about 43%, about 44%, about 45%, about 46%, about 47%, about 48%, about 49%, about 50%, about 51%, about 52%, about 53%, about 54%, about 55%, about 56%, about 57%, about 58%, about 59%, about 60%, about 61%, about 62%, about 63%, about 64%, about 65%, about 66%, about 67%, about 68%, about 69%, about 70%, about 71%, about 72%, about 73%, about 74%, about 75%, about 76%, about 77%, about 78%, about 79%, about 80%, about 81%, about 82%, about 83%, about 84%, about 85%, about 86%, about 87%, about 88%, about 89%, about 90%, about 91%, about 92%, about 93%, about 94%, about 95%, about 96%, about 97%, about 98%, about 99%, or about 100% water.

In some embodiments, the adjusted gas composition comprises from 0% to 100% carbon dioxide, for example about 0%, about 1%, about 2%, about 3%, about 4%, about 5%, about 6%, about 7%, about 8%, about 9%, about 10%, about 11%, about 12%, about 13%, about 14%, about 15%, about 16%, about 17%, about 18%, about 19%, about 20%, about 21%, about 22%, about 23%, about 24%, about 25%, about 26%, about 27%, about 28%, about 29%, about 30%, about 31%, about 32%, about 33%, about 34%, about 35%, about 36%, about 37%, about 38%, about 39%, about 40%, about 41%, about 42%, about 43%, about 44%, about 45%, about 46%, about 47%, about 48%, about 49%, about 50%, about 51%, about 52%, about 53%, about 54%, about 55%, about 56%, about 57%, about 58%, about 59%, about 60%, about 61%, about 62%, about 63%, about 64%, about 65%, about 66%, about 67%, about 68%, about 69%, about 70%, about 71%, about 72%, about 73%, about 74%, about 75%, about 76%, about 77%, about 78%, about 79%, about 80%, about 81%, about 82%, about 83%, about 84%, about 85%, about 86%, about 87%, about 88%, about 89%, about 90%, about 91%, about 92%, about 93%, about 94%, about 95%, about 96%, about 97%, about 98%, about 99%, or about 100% carbon dioxide.

In some embodiments, the adjusted gas composition comprises from 0% to 100% nitrogen, for example about 0%, about 1%, about 2%, about 3%, about 4%, about 5%, about 6%, about 7%, about 8%, about 9%, about 10%, about 11%, about 12%, about 13%, about 14%, about 15%, about 16%, about 17%, about 18%, about 19%, about 20%, about 21%, about 22%, about 23%, about 24%, about 25%, about 26%, about 27%, about 28%, about 29%, about 30%, about 31%, about 32%, about 33%, about 34%, about 35%, about 36%, about 37%, about 38%, about 39%, about 40%, about 41%, about 42%, about 43%, about 44%, about 45%, about 46%, about 47%, about 48%, about 49%, about 50%, about 51%, about 52%, about 53%, about 54%, about 55%, about 56%, about 57%, about 58%, about 59%, about 60%, about 61%, about 62%, about 63%, about 64%, about 65%, about 66%, about 67%, about 68%, about 69%, about 70%, about 71%, about 72%, about 73%, about 74%, about 75%, about 76%, about 77%, about 78%, about 79%, about 80%, about 81%, about 82%, about 83%, about 84%, about 85%, about 86%, about 87%, about 88%, about 89%, about 90%, about 91%, about 92%, about 93%, about 94%, about 95%, about 96%, about 97%, about 98%, about 99%, or about 100% nitrogen.

In some embodiments, the adjusted gas composition comprises from 0% to 100% oxygen, for example about 0%, about 1%, about 2%, about 3%, about 4%, about 5%, about 6%, about 7%, about 8%, about 9%, about 10%, about 11%, about 12%, about 13%, about 14%, about 15%, about 16%, about 17%, about 18%, about 19%, about 20%, about 21%, about 22%, about 23%, about 24%, about 25%, about 26%, about 27%, about 28%, about 29%, about 30%, about 31%, about 32%, about 33%, about 34%, about 35%, about 36%, about 37%, about 38%, about 39%, about 40%, about 41%, about 42%, about 43%, about 44%, about 45%, about 46%, about 47%, about 48%, about 49%, about 50%, about 51%, about 52%, about 53%, about 54%, about 55%, about 56%, about 57%, about 58%, about 59%, about 60%, about 61%, about 62%, about 63%, about 64%, about 65%, about 66%, about 67%, about 68%, about 69%, about 70%, about 71%, about 72%, about 73%, about 74%, about 75%, about 76%, about 77%, about 78%, about 79%, about 80%, about 81%, about 82%, about 83%, about 84%, about 85%, about 86%, about 87%, about 88%, about 89%, about 90%, about 91%, about 92%, about 93%, about 94%, about 95%, about 96%, about 97%, about 98%, about 99%, or about 100% oxygen. In some embodiments, the adjusted gas composition comprises no more than about 16%, no more than about 14%, no more than about 12%, no more than about 10%, no more than about 8%, no more than about 6%, no more than about 4%, or no more than about 2% of oxygen.

The separated vapor stream, or a thermally treated form thereof, may contain, or be adjusted to contain, less than or equal to about 1 wt % (such as about 0.1, 0.2, 0.5, or 0.8 wt %) combined carbon monoxide and VOC content. The gas composition may be adjusted to contain at least about 70 wt %, at least about 75% nitrogen, at least about 80% nitrogen, at least about 85% nitrogen, at least about 90% nitrogen, at least about 95% nitrogen, or about 100% nitrogen, in some embodiments.

At least some of the separated vapor stream, or a thermally treated form thereof, may be introduced to a delivery system configured for mechanically feeding the feedstock into a first indirectly heated reaction zone. Such a delivery system may include a feed auger or screw, for example.

In some embodiments, at least some of the activation agent is derived from the separated vapor stream, or a thermally treated form thereof. Step (e) may increase the yield of carbon in the solids. Additionally, step (e) preferably increases the surface area and Iodine Number of the solids. In some embodiments, step (f) comprises recovering all of the solids from the reaction zone as biogenic activated carbon.

An additive is optionally introduced before, during, or after one or more of steps (a)-(f), and wherein the additive is selected from an acid, a base, a salt, a metal, a metal oxide, a metal hydroxide, a metal halide, iodine, an iodine compound, or a combination thereof. The additive may be selected from the group consisting of magnesium, manganese, aluminum, nickel, iron, chromium, silicon, boron, cerium, molybdenum, phosphorus, tungsten, vanadium, iron chloride, iron bromide, magnesium oxide, dolomite, dolomitic lime, fluorite, fluorspar, bentonite, calcium oxide, lime, sodium hydroxide, potassium hydroxide, hydrogen bromide, hydrogen chloride, sodium silicate, potassium permanganate, organic acids, iodine, an iodine compound, and combinations thereof.

The biogenic activated carbon may be characterized by an Iodine Number of at least about 500, 1000, 1500, or 2000. The biogenic activated carbon may be characterized by a surface area of at least about 1000 $m^2$/g, 1500 $m^2$/g, 2000 $m^2$/g, or higher.

In some embodiments, at least a portion of the biogenic activated carbon is present in the form of graphene. The biogenic activated carbon may be responsive to an externally applied magnetic field. Also, the biogenic activated carbon may have a higher electrical conductance and/or capacitance than the starting carbon-containing feedstock.

In some embodiments, the biogenic activated carbon is responsive to an externally applied magnetic field. In some embodiments, the magnetic properties of the biogenic activated carbon are due at least in part to the presence of a magnetic metal or compound thereof, such as iron. In other embodiments, the biogenic activated carbon is responsive to an externally applied magnetic field notwithstanding the presence of iron, an iron compound, another magnetic metal or compound thereof, an ore, a metalloid or compound thereof, or another non-graphene material that itself responds to an externally applied magnetic field. That is, in some embodiments, the biogenic activated carbon is responsive to an externally applied magnetic field to an extent beyond that which can be attributed to the presence of iron, an iron compound, another magnetic metal or compound thereof, an ore, a metalloid or compound thereof, or another non-graphene material that itself responds to an externally applied magnetic field.

In certain embodiments, the process further comprises introducing at least some of the separated vapor stream, or a thermally treated form thereof, to a reactor for growing graphene on a substrate in two or three dimensions. In such a process, the carbon contained in the vapor is deposited onto a substrate (such as silicon) to form single layers of carbon. The substrate may be a layer or a three-dimensional object.

The liquid or vapor stream from an external source may vary widely. Exemplary vapor streams may include CO, $CO_2$, $CH_4$, light hydrocarbons, tars, etc. Exemplary liquid streams may include heavier hydrocarbons (including olefins or aromatics), methanol, ethanol, or heavier alcohols, organic acids, aldehydes, etc. The external source may be a VOC off-gas stream from an adjacent or co-located chemical or fuel plant, for example. Combinations are possible, including not only liquid/vapor streams but also mixtures of external sources with recycled gases within the system, i.e., the separated vapor stream, or a thermally treated form thereof.

In some embodiments, the present disclosure provides a continuous process for producing graphene, the process comprising:

(a) providing a starting carbon-containing feedstock comprising biomass;

(b) optionally drying said feedstock to remove at least a portion of moisture from said feedstock;

(c) in one or more indirectly heated reaction zones, mechanically conveying said feedstock and countercurrently contacting said feedstock with a vapor stream comprising a substantially inert gas and an activation agent including at least one of water or carbon dioxide, to generate solids, condensable vapors, and non-condensable gases, wherein said condensable vapors and said non-condensable gases enter said vapor stream;

(d) removing at least a portion of said vapor stream from said reaction zone, to generate a separated vapor stream;

(e) recycling at least a portion of said separated vapor stream, or a thermally treated form thereof, to said feedstock prior to step (c) and/or to a gas inlet of said reaction zone(s); and (f) recovering at least a portion of said solids from said reaction zone(s) as graphene.

In some embodiments, the solids recovered in step (f) consist of graphene-containing biogenic activated carbon. The graphene-containing biogenic activated carbon may contain widely varying fractions of graphene relative to total carbon present. For example, the mass (or mole) ratio of carbon present as graphene to total carbon in the biogenic activated carbon may be from about 0.0001 to about 1, such as about 0.001, about 0.005, about 0.01, about 0.005, about 0.1, about 0.15, about 0.2, about 0.25, about 0.3, about 0.4, about 0.5, about 0.6, about 0.7, about 0.8, about 0.9, about 0.95, or higher.

It should also be noted that the graphene content is not necessarily uniform throughout the biogenic activated carbon. In some embodiments, it is believed (without being limited by hypothesis) that graphene is grown from carbon-containing vapors that pass over the pyrolyzed or pyrolyzing feedstock, the graphene may be primarily present at or near the surface of the resulting solids. In other embodiments, with sufficient heat and mass transport into the solids, graphene formation may occur essentially throughout the solids.

The process may further comprise separating graphene from the graphene-containing biogenic activated carbon. The separation may be achieved by mechanical, magnetic, or electrical means, such as by a centrifuge, magnetic separator, or electrostatic precipitator, respectively.

In some embodiments, the solids are further treated to increase graphene content in the solids. For example, a catalyst may be introduced to enhance graphene growth. The solids may be introduced to a separate process to fabricate or transfer graphene on a substrate or on a device.

In some embodiments, an external source of carbon is introduced to increase surface area and/or increase carbon yield and/or increase graphene content. In some of these embodiments, a continuous process for producing biogenic activated carbon comprises:

(a) providing a starting carbon-containing feedstock comprising biomass;

(b) optionally drying said feedstock to remove at least a portion of moisture from said feedstock;

(c) in one or more indirectly heated reaction zones, mechanically conveying said feedstock and counter-currently contacting said feedstock with a vapor stream comprising a substantially inert gas and an activation agent including at least one of water or carbon dioxide, to generate solids, condensable vapors, and non-condensable gases, wherein said condensable vapors and said non-condensable gases enter said vapor stream;

(d) removing at least a portion of said vapor stream from said reaction zone, to generate a separated vapor stream;

(e) recycling at least a portion of said separated vapor stream, or a thermally treated form thereof, to said feedstock prior to step (c) and/or to a gas inlet of said reaction zone(s); and (f) recovering at least a portion of said solids from said reaction zone(s), wherein said solids include graphene-containing biogenic activated carbon.

In one embodiment, a continuous process for producing graphene-containing biogenic activated carbon comprises:

(a) providing a starting carbon-containing feedstock comprising biomass;

(b) optionally drying said feedstock to remove at least a portion of moisture from said feedstock;

(c) in one or more indirectly heated reaction zones, mechanically conveying said feedstock and counter-currently contacting said feedstock with a vapor stream comprising a substantially inert gas and an activation agent including at least one of water or carbon dioxide, to generate solids, condensable vapors, and non-condensable gases, wherein said condensable vapors and said non-condensable gases enter said vapor stream;

(d) removing at least a portion of said vapor stream from said reaction zone, to generate a separated vapor stream;

(e) recycling at least a portion of said separated vapor stream, or a thermally treated form thereof, to said feedstock prior to step (c) and/or to a gas inlet of said reaction zone(s); and (f) recovering at least a portion of said solids from said reaction zone(s), wherein said solids include graphene-containing biogenic activated carbon.

In some embodiments, the process further comprises treating the solids recovered in step (f) to increase graphene content. In some embodiments, the process further comprises using at least a portion of the solids recovered in step (f) to fabricate graphene on a substrate or a device.

In some embodiments, the graphene or graphene-containing biogenic activated carbon is responsive to an externally applied magnetic field. In some embodiments, the graphene or graphene-containing biogenic activated carbon has an electrical conductance value and/or an electrical capacitance value that is greater than the carbon-containing feedstock.

In some embodiments, the present disclosure provides a continuous process for producing graphene-containing biogenic activated carbon, the process comprising:

(a) providing a starting carbon-containing feedstock comprising biomass;

(b) optionally drying said feedstock to remove at least a portion of moisture from said feedstock;

(c) in one or more indirectly heated reaction zones, mechanically conveying said feedstock and counter-currently contacting said feedstock with a vapor stream comprising a substantially inert gas and an activation agent comprising at least one of water or carbon dioxide, to generate solids, condensable vapors, and non-condensable gases, wherein said condensable vapors and said non-condensable gases enter said vapor stream;

(d) removing at least a portion of said vapor stream from said reaction zone, to generate a separated vapor stream;

(e) recycling at least a portion of said separated vapor stream, or a thermally treated form thereof, to said feedstock prior to step (c) and/or to a gas inlet of said reaction zone(s), to increase the surface area of carbon in said solids; and (f) recovering at least a portion of said solids from said reaction zone(s) as biogenic activated carbon, wherein said biogenic activated carbon comprises, on a dry basis, about 55 wt % or more total carbon, about 15 wt % or less hydrogen, and less than or equal to about 1 wt % nitrogen, wherein at least a portion of said biogenic activated carbon is present in the form of graphene, wherein said biogenic activated carbon composition is characterized by an Iodine Number higher than about 500, and wherein said biogenic activated carbon is responsive to an externally applied magnetic field.

In some variations, the present disclosure provides a process for producing a biogenic activated carbon product, the process comprising:

(a) providing a carbon-containing feedstock comprising biomass;

(a') adding an additive to the feedstock to produce an enhanced feedstock;

(b) optionally drying the enhanced feedstock to produce a dried enhanced feedstock;

(c) optionally deaerating the enhanced feedstock or the dried enhanced feedstock to remove at least a portion of interstitial oxygen, if any, contained with the enhanced feedstock or the dried enhanced feedstock;

(d) in a pyrolysis zone, pyrolyzing the feedstock produced in any of steps (a'), (b) or (c), or a combination thereof, in the presence of a substantially inert gas for at least about 10 minutes and with a pyrolysis temperature selected from about 250° C. to about 700° C., to generate hot pyrolyzed solids, condensable vapors, and non-condensable gases;

(e) separating at least a portion of the condensable vapors and at least a portion of the non-condensable gases from the hot pyrolyzed solids;

(f) in a cooling zone, cooling the hot pyrolyzed solids, in the presence of the substantially inert gas for at least about 5 minutes and with a cooling-zone temperature less than or equal to about the pyrolysis temperature, to generate warm pyrolyzed solids;

(g) in an optional cooler that is separate from the cooling zone, further cooling the warm pyrolyzed solids to generate cool pyrolyzed solids;

(h) recovering a biogenic activated carbon product comprising at least a portion of the warm or cool pyrolyzed solids; and (i) pulverizing said biogenic activated carbon composition to reduce average particle size of said biogenic activated carbon composition.

Some embodiments provide a process for producing a biogenic activated carbon composition, said process comprising:

(a) providing a carbon-containing feedstock comprising biomass;

(a') adding an additive to the feedstock to produce an enhanced feedstock;

(b) optionally drying the enhanced feedstock to produce a dried enhanced feedstock;

(c) optionally deaerating the enhanced feedstock or the dried enhanced feedstock to remove at least a portion of interstitial oxygen, if any, contained with the enhanced feedstock or the dried enhanced feedstock;

(d) in a pyrolysis zone, pyrolyzing the feedstock produced in any of steps (a'), (b) or (c), or a combination thereof, in the presence of a substantially inert gas for at least 10 minutes and with a pyrolysis temperature selected from about 250° C. to about 700° C., to generate hot pyrolyzed solids, condensable vapors, and non-condensable gases;

(e) separating at least a portion of said condensable vapors and at least a portion of said non-condensable gases from said hot pyrolyzed solids;

(f) in a cooling zone, cooling said hot pyrolyzed solids, in the presence of said substantially inert gas for at least 5 minutes and with a cooling temperature less than or equal to about said pyrolysis temperature, to generate warm pyrolyzed solids;

(g) in an optional cooler that is separate from said cooling zone, cooling said warm pyrolyzed solids to generate cool pyrolyzed solids;

(h) recovering a biogenic activated carbon composition comprising at least a portion of said cool pyrolyzed solids; and (i) pulverizing said biogenic activated carbon composition to reduce average particle size of said biogenic activated carbon composition.

In some embodiments, the process comprises adding an additive before the pyrolysis step. In such embodiments, the resulting biogenic activated carbon may be produced in a mass yield that is higher than biogenic activated carbon produced without additive, or with additive added during or after the pyrolysis step but by an otherwise identical method. In a related embodiment, the biogenic activated carbon product performs as well as or better than the comparable biogenic activated carbon product. In some embodiments, the process requires less energy input to produce a biogenic activated carbon product when an additive is added before the pyrolysis step. In some embodiments, the resulting biogenic activated carbon has a higher fixed carbon content compared to a biogenic activated carbon produced without additive (or with additive added during or after the pyrolysis step) but by an otherwise identical process. In some embodiments, the additive is distributed more thoroughly and/or evenly throughout the biogenic activated carbon as compared to biogenic activated carbon produced by the same process but wherein the additive is added during or after the pyrolysis step. In some embodiments, the biogenic activated carbon requires less additive to achieve a desired performance characteristic when added before the pyrolysis step compared to a biogenic activated carbon produced by an otherwise identical process but wherein the additive is added during or after the pyrolysis step.

In some embodiments, an additive is selected from a metal, a metal oxide, a metal hydroxide, or a combination thereof. For example an additive may be selected from, but is by no means limited to, magnesium, manganese, aluminum, nickel, chromium, silicon, boron, cerium, molybdenum, phosphorus, tungsten, vanadium, iron halide, iron chloride, iron bromide, magnesium oxide, dolomite, dolomitic lime, fluorite, fluorspar, bentonite, calcium oxide, lime, and combinations thereof.

In some embodiments, an additive is selected from an acid, a base, or a salt thereof. For example an additive may be selected from, but is by no means limited to, sodium hydroxide, potassium hydroxide, magnesium oxide, hydrogen bromide, hydrogen chloride, sodium silicate, potassium permanganate, organic acids (e.g., citric acid), or combinations thereof.

In some embodiments, an additive is selected from a metal halide. Metal halides are compounds between metals and halogens (fluorine, chlorine, bromine, iodine, and astatine). The halogens can form many compounds with metals. Metal halides are generally obtained by direct combination, or more commonly, neutralization of basic metal salt with a hydrohalic acid. In some embodiments, an additive is selected from iron halide ($FeX_2$ and/or $FeX_3$), iron chloride ($FeCl_2$ and/or $FeCl_3$), iron bromide ($FeBr_2$ and/or $FeBr_3$), or hydrates thereof, and any combinations thereof.

In some variations, a biogenic activated carbon composition comprises, on a dry basis:

55 wt % or more total carbon;

15 wt % or less hydrogen;

1 wt % or less nitrogen;

0.5 wt % or less phosphorus;

0.2 wt % or less sulfur;

an additive selected from an acid, a base, a salt, a metal, a metal oxide, a metal hydroxide, a metal halide, iodine, an iodine compound, or a combination thereof.

In some embodiments, the additive comprises iodine or an iodine compound, or a combination of iodine and one or more iodine compounds. When the additive comprises iodine, it may be present in the biogenic activated carbon composition as absorbed or intercalated molecular $I_2$, as physically or chemically adsorbed molecular $I_2$, as absorbed or intercalated atomic I, as physically or chemically adsorbed atomic I, or any combination thereof.

When the additive comprises one or more iodine compounds, they may be selected from the group consisting of iodide ion, hydrogen iodide, an iodide salt, a metal iodide, ammonium iodide, an iodine oxide, triiodide ion, a triiodide salt, a metal triiodide, ammonium triiodide, iodate ion, an iodate salt, a polyiodide, iodoform, iodic acid, methyl iodide, an iodinated hydrocarbon, periodic acid, orthoperiodic acid, metaperiodic acid, and combinations, salts, acids, bases, or derivatives thereof.

In some variations, the biogenic activated carbon composition is produced by a process comprising at least the steps of:

(a) providing a carbon-containing feedstock comprising biomass;

(b) optionally drying the feedstock to remove at least a portion of moisture contained within the feedstock;

(c) optionally deaerating the feedstock to remove at least a portion of interstitial oxygen, if any, contained with the feedstock;

(d) in a pyrolysis zone, pyrolyzing the feedstock in the presence of a substantially inert gas for at least 10 minutes and with a pyrolysis temperature selected from about 250° C. to about 700° C., to generate hot pyrolyzed solids, condensable vapors, and non-condensable gases;

(e) separating at least a portion of the condensable vapors and at least a portion of the non-condensable gases from the hot pyrolyzed solids;

(f) in a cooling zone, cooling the hot pyrolyzed solids, in the presence of the substantially inert gas for at least 5 minutes and with a cooling temperature less than or equal to about the pyrolysis temperature, to generate warm pyrolyzed solids;

(g) in a cooling unit that is separate from the cooling zone, cooling the warm pyrolyzed solids to generate cool pyrolyzed solids;

(h) recovering a biogenic activated carbon composition comprising at least a portion of the cool pyrolyzed solids; and (i) pulverizing the biogenic activated carbon composition to reduce average particle size of the biogenic activated carbon composition.

In some variations, a process for producing a biogenic activated carbon composition, the process comprising:

(a) providing a carbon-containing feedstock comprising biomass;

(b) optionally drying the feedstock to remove at least a portion of moisture contained within the feedstock;

(c) optionally deaerating the feedstock to remove at least a portion of interstitial oxygen, if any, contained with the feedstock;

(d) in a pyrolysis zone, pyrolyzing the feedstock in the presence of a substantially inert gas for at least 10 minutes and with a pyrolysis temperature selected from about 250° C. to about 700° C., to generate hot pyrolyzed solids, condensable vapors, and non-condensable gases;

(e) separating at least a portion of the condensable vapors and at least a portion of the non-condensable gases from the hot pyrolyzed solids;

(f) in a cooling zone, cooling the hot pyrolyzed solids, in the presence of the substantially inert gas for at least 5 minutes and with a cooling temperature less than or equal to about the pyrolysis temperature, to generate warm pyrolyzed solids;

(g) in a cooling unit that is separate from the cooling zone, cooling the warm pyrolyzed solids to generate cool pyrolyzed solids;

(h) recovering a biogenic activated carbon composition comprising at least a portion of the cool pyrolyzed solids; and (i) pulverizing the biogenic activated carbon composition to reduce average particle size of the biogenic activated carbon composition, wherein an additive is introduced before, during, or after one or more of steps (a)-(i), and wherein the additive is selected from an acid, a base, a salt, a metal, a metal oxide, a metal hydroxide, a metal halide, iodine, an iodine compound, or a combination thereof.

In some embodiments, the additive comprises iodine or an iodine compound, or a combination of iodine and one or more iodine compounds, optionally dissolved in a solvent. Various solvents for iodine or iodine compounds are known in the art. For example, alkyl halides such as (but not limited to) n-propyl bromide or n-butyl iodide may be employed. Alcohols such as methanol or ethanol may be used. In some embodiments, a tincture of iodine may be employed to introduce the additive into the composition.

In some embodiments, the additive comprises iodine that is introduced as a solid that sublimes to iodine vapor for incorporation into the biogenic activated carbon composition. At room temperature, iodine is a solid. Upon heating, the iodine sublimes into a vapor. Thus, solid iodine particles may be introduced into any stream, vessel, pipe, or container (e.g. a barrel or a bag) that also contains the biogenic activated carbon composition. Upon heating the iodine particles will sublime, and the 12 vapor can penetrate into the carbon particles, thus incorporating iodine as an additive on the surface of the particles and potentially within the particles.

In one embodiment, the present disclosure provides a method of reducing or removing at least one contaminant from a gas-phase emission stream, said method comprising:

(a) providing a gas-phase emissions stream comprising at least one contaminant;

(b) contacting the gas-phase emissions stream with an additive and activated carbon particles comprising a biogenic activated carbon composition to generate contaminant-adsorbed particles; and (c) separating at least a portion of said contaminant-adsorbed particles from said gas-phase emissions stream to produce a contaminant-reduced gas-phase emissions stream.

In some embodiments, the activated carbon particles further comprise the additive. In some embodiments, step (b) comprises directly adding the additive to said gas-phase emissions stream. In some embodiments, the additive is selected from the group consisting of an acid, a base, a salt, a metal, a metal oxide, a metal hydroxide, a metal halide, iodine, an iodine compound, and combinations thereof. In some embodiments, the additive is selected from the group consisting of magnesium, manganese, aluminum, nickel, iron, chromium, silicon, boron, cerium, molybdenum, phosphorus, tungsten, vanadium, iron chloride, iron bromide, magnesium oxide, dolomite, dolomitic lime, fluorite, fluorospar, bentonite, calcium oxide, lime, sodium hydroxide, potassium hydroxide, hydrogen bromide, hydrogen chloride, sodium silicate, potassium permanganate, organic acids, iodine, an iodine compound, and combinations thereof. In some embodiments, the contaminant is a metal selected from the group consisting of mercury, boron, selenium, arsenic, compounds thereof, salts thereof and mixtures thereof. In some embodiments, the contaminant is a hazardous air pollutant. In some embodiments, the contaminant is a volatile organic compound. In some embodiments, the contaminant is a non-condensable gas selected from the group consisting of nitrogen oxides, carbon monoxide, carbon dioxide, hydrogen sulfide, sulfur dioxide, sulfur trioxide, methane, ethane, ethylene, ozone, ammonia, and combinations thereof.

In some embodiments, the contaminant-adsorbed carbon particles include at least one contaminant selected from the group consisting of carbon dioxide, nitrogen oxides, mercury, sulfur dioxide, absorbed forms thereof, adsorbed forms thereof, reacted forms thereof, or mixtures thereof.

In some embodiments, the gas-phase emissions stream is derived from, arises out of, or is produced by combustion of a fuel comprising said biogenic activated carbon composition. In some embodiments, the gas-phase emissions stream is derived from, arises out of, or is produced by co-combustion of coal and said biogenic activated carbon composition.

In some embodiments, the method further comprises (d) treating said contaminant-adsorbed carbon particles to regenerate said activated carbon particles.

In some embodiments, the method further comprises (d') combusting said contaminant-adsorbed carbon particles to generate energy.

In one embodiment, a method of using a biogenic activated carbon composition to reduce mercury emissions comprises:

(a) providing a gas-phase emissions stream comprising mercury;

(b) contacting the gas-phase emissions stream with activated-carbon particles comprising a biogenic activated carbon composition comprising iron or an iron-containing compound to generate mercury-adsorbed carbon particles; and (c) separating at least a portion of said mercury-adsorbed carbon particles from said gas-phase emissions stream using electrostatic precipitation, to produce a mercury-reduced gas-phase emissions stream.

In some embodiments, the presence of said iron or an iron-containing compound in the activated-carbon particles enhances said electrostatic precipitation during step (c), thereby improving mercury control.

In some embodiments, the method further comprises: (d) separating at least a portion of the mercury-adsorbed carbon particles from other electrostatic precipitates formed in step (c). In some embodiments, step (d) comprises exposing said mercury-adsorbed carbon particles to a magnetic field.

In some embodiments, a process for producing energy comprises:

(a) providing a carbon-containing feedstock comprising a biogenic activated carbon composition; and (b) oxidizing said carbon-containing feedstock to generate energy and a gas-phase emissions stream comprising at least one contaminant, wherein the biogenic activated carbon composition adsorbs at least a portion of the at least one contaminant.

In some embodiments, the carbon-containing feedstock comprises the at least one contaminant, or a precursor thereof. In some embodiments, the carbon-containing feedstock further comprises biomass. In some embodiments, the carbon-containing feedstock further comprises coal. In some embodiments, the carbon-containing feedstock consists essentially of said biogenic activated carbon composition. In some embodiments, the at least one contaminant comprises a metal selected from the group consisting of mercury, boron, selenium, arsenic, a compound thereof, a salt thereof, and mixtures thereof. In some embodiments, the at least one contaminant comprises a hazardous air pollutant or volatile organic compound. In some embodiments, the at least one contaminant comprises a non-condensable gas selected from the group consisting of nitrogen oxides, carbon monoxide, carbon dioxide, hydrogen sulfide, sulfur dioxide, sulfur trioxide, methane, ethane, ethylene, ozone, ammonia, and combinations thereof. In some embodiments, the biogenic activated carbon composition comprises an additive selected from the group consisting of an acid, a base, a salt, a metal, a metal oxide, a metal hydroxide, a metal halide, iodine, an iodine compound, and combinations thereof. In some embodiments, the additive is selected from the group consisting of magnesium, manganese, aluminum, nickel, iron, chromium, silicon, boron, cerium, molybdenum, phosphorus, tungsten, vanadium, iron chloride, iron bromide, magnesium oxide, dolomite, dolomitic lime, fluorite, fluorospar, bentonite, calcium oxide, lime, sodium hydroxide, potassium hydroxide, hydrogen bromide, hydrogen chloride, sodium silicate, potassium permanganate, organic acids, iodine, an iodine compound, and combinations thereof.

In any method of use disclosed herein, the biogenic activated carbon composition may have a heat value of at least about 5,000 BTU/lb, for example about 5,000, at least about 6,000, at least about 7,000, at least about 8,000, at least about 9,000, at least about 10,000, at least about 11,000, at least about 12,000, or greater than about 12,000 BTU/lb.

In any method of use disclosed herein, biogenic activated carbon compositions as disclosed herein may be added to (e.g. mixed with) fuel anywhere in a fuel delivery, fuel storage, fuel preparation, or fuel mixing process in any suitable location, such as a fuel yard, in storage bins, on conveyors, in mixers, during injection, etc. Alternatively or in addition to the foregoing, biogenic activated carbon may be added to a combustion zone either mixed with, or independent from, other fuel source(s). For example and without limitation, in some embodiments the biogenic activated carbon composition is provided at or before a combustion zone, at or before a burner tip, and/or before or concurrently with a step of oxidizing the carbon-containing feedstock.

In one embodiment, a method of using a biogenic activated carbon composition to purify a liquid comprises:

(a) providing a liquid comprising at least one contaminant; and (b) contacting said liquid with an additive and activated-carbon particles comprising a biogenic activated carbon composition to generate contaminant-adsorbed carbon particles and a contaminant-reduced liquid.

In some embodiments, the activated carbon particles comprise said additive. In some embodiments, the additive is selected from the group consisting of an acid, a base, a salt, a metal, a metal oxide, a metal hydroxide, a metal halide, iodine, an iodine compound, and combinations thereof. In some embodiments, the additive is selected from the group consisting of magnesium, manganese, aluminum, nickel, iron, chromium, silicon, boron, cerium, molybdenum, phosphorus, tungsten, vanadium, iron chloride, iron bromide, magnesium oxide, dolomite, dolomitic lime, fluorite, fluorospar, bentonite, calcium oxide, lime, sodium hydroxide, potassium hydroxide, hydrogen bromide, hydrogen chloride, sodium silicate, potassium permanganate, organic acids, iodine, an iodine compound, and combinations thereof. In some embodiments, the at least one contaminant is a metal selected from the group consisting of arsenic, boron, selenium, mercury, a compound thereof, a salt thereof, and mixtures thereof. In some embodiments, the at least one contaminant comprises an organic compound. In some embodiments, the at least one contaminant comprises a halogen. In some embodiments, the at least one contaminant comprises hydrogen sulfide. In some embodiments, the at least one contaminant comprises a chlorination by-product. In some embodiments, the at least one contaminant comprises a pesticide or herbicide. In some embodiments, the liquid comprises water.

In some embodiments, the method further comprises treating the contaminant-adsorbed carbon particles to regenerate said activated-carbon particles. In some embodiments, the method further comprises combusting the contaminant-adsorbed carbon particles to generate energy.

In one embodiment, the present disclosure provides a method of removing at least a portion of a sulfur contaminant from a liquid comprising:

(a) providing a liquid comprising a sulfur contaminant; and (b) contacting said liquid with an additive and activated-carbon particles comprising a biogenic activated carbon composition, wherein after step (b) at least a portion of the activated carbon particles comprises the sulfur contaminant.

In some embodiments, the sulfur contaminant is selected from the group consisting of elemental sulfur, sulfuric acid, sulfurous acid, sulfur dioxide, sulfur trioxide, sulfate anions, bisulfate anions, sulfite anions, bisulfite anions, thiols, sulfides, disulfides, polysulfides, thioethers, thioesters, thioacetals, sulfoxides, sulfones, thiosulfinates, sulfimides, sulfoximides, sulfonediimines, sulfur halides, thioketones, thioaldehydes, sulfur oxides, thiocarboxylic acids, thioamides, sulfonic acids, sulfinic acids, sulfenic acids, sulfonium, oxosulfonium, sulfuranes, persulfuranes, derivatives thereof, salts thereof and combinations thereof. In some embodiments, the sulfur contaminant is a sulfate in anionic and/or salt form. In some embodiments, the additive is selected from the group consisting of an acid, a base, a salt, a metal, a metal oxide, a metal hydroxide, a metal halide, iodine, an iodine compound, and combinations thereof. In some embodiments, the additive is selected from the group consisting of magnesium, manganese, aluminum, nickel, iron, chromium, silicon, boron, cerium, molybdenum, phosphorus, tungsten, vanadium, iron chloride, iron bromide, magnesium oxide, dolomite, dolomitic lime, fluorite, fluorospar, bentonite, calcium oxide, lime, sodium hydroxide, potassium hydroxide, hydrogen bromide, hydrogen chloride, sodium silicate, potassium permanganate, organic acids, iodine, an iodine compound, and combinations thereof. In some embodiments, step (b) comprises filtration and/or osmosis of said liquid. In some embodiments, step (b) comprises contacting the liquid with an osmosis membrane comprising said activated-carbon particles and said additive. In some embodiments, step (b) comprises adding said activated-carbon particles directly to said liquid. In some embodiments, the method further comprises: (c) sedimentation of said activated-carbon particles with said sulfur contaminant from said liquid. In some embodiments, the liquid comprises wastewater. In some embodiments, the wastewater is produced by a process selected from the group consisting of metal mining, acid mine drainage, mineral processing, municipal sewer treatment, pulp and paper production, and ethanol production. In some embodiments, the liquid is a natural body of water.

In one embodiment, the present disclosure provides a process to reduce a concentration of sulfates in water comprising:

(a) providing a volume or stream of water comprising sulfates; and (b) contacting said water with an additive and activated-carbon particles comprising a biogenic activated carbon composition.

In some embodiments, before step (a) the water comprises sulfates at a concentration of greater than about 50 mg/L, and after step (b) the water comprises sulfates at a concentration of no more than about 50 mg/L. In some embodiments, after step (b) the water comprises sulfates at a concentration of no more than about 10 mg/L. In some embodiments, the water is a wastewater stream. In some embodiments, the wastewater stream is produced by a process selected from the group consisting of metal mining, acid mine drainage, mineral processing, municipal sewer treatment, pulp and paper production, and ethanol production. In some embodiments, the water is a natural body of water. In some embodiments, the additive is selected from the group consisting of an acid, a base, a salt, a metal, a metal oxide, a metal hydroxide, a metal halide, iodine, an iodine compound, and combinations thereof. In some embodiments, the additive is selected from the group consisting of magnesium, manganese, aluminum, nickel, iron, chromium, silicon, boron, cerium, molybdenum, phosphorus, tungsten, vanadium, iron chloride, iron bromide, magnesium oxide, dolomite, dolomitic lime, fluorite, fluorospar, bentonite, calcium oxide, lime, sodium hydroxide, potassium hydroxide, hydrogen bromide, hydrogen chloride, sodium silicate, potassium permanganate, organic acids, iodine, an iodine compound, and combinations thereof.

In one embodiment, the present disclosure provides a method of removing a sulfur contaminant from a gas-phase emissions stream comprising:

(a) providing a gas-phase emissions stream comprising at least one sulfur contaminant;

(b) contacting the gas-phase emissions stream with an additive and activated-carbon particles comprising a biogenic activated carbon composition; and (c) separating at least a portion of said activated-carbon particles from said gas-phase emissions stream after step (b).

In some embodiments, the sulfur-containing contaminant is selected from the group consisting of elemental sulfur, sulfuric acid, sulfurous acid, sulfur dioxide, sulfur trioxide, sulfate anions, bisulfate anions, sulfite anions, bisulfite anions, thiols, sulfides, disulfides, polysulfides, thioethers, thioesters, thioacetals, sulfoxides, sulfones, thiosulfinates, sulfimides, sulfoximides, sulfonediimines, sulfur halides, thioketones, thioaldehydes, sulfur oxides, thiocarboxylic acids, thioamides, sulfonic acids, sulfinic acids, sulfenic acids, sulfonium, oxosulfonium, sulfuranes, persulfuranes, salts thereof, derivatives thereof and combinations thereof. In some embodiments, the gas-phase emissions stream is derived from, arises out of, or is produced by combustion of a fuel comprising said biogenic activated carbon composition. In some embodiments, the gas-phase emissions stream is derived from, arises out of, or is produced by co-combustion of coal and said biogenic activated carbon composition. In some embodiments, the additive is selected from the group consisting of an acid, a base, a salt, a metal, a metal oxide, a metal hydroxide, a metal halide, iodine, an iodine compound, and combinations thereof. In some embodiments, the additive is selected from the group consisting of magnesium, manganese, aluminum, nickel, iron, chromium, silicon, boron, cerium, molybdenum, phosphorus, tungsten, vanadium, iron chloride, iron bromide, magnesium oxide, dolomite, dolomitic lime, fluorite, fluorospar, bentonite, calcium oxide, lime, sodium hydroxide, potassium hydroxide, hydrogen bromide, hydrogen chloride, sodium silicate, potassium permanganate, organic acids, iodine, an iodine compound, and combinations thereof. In some embodiments, step (c) comprises filtration. In some embodiments, step (c) comprises electrostatic precipitation. In some embodiments, step (c) comprises scrubbing.

In one embodiment, the present disclosure provides a method of reducing or removing one or more contaminants from a gas or liquid comprising:

(a) providing a gas or liquid stream containing one or more contaminants; and (b) contacting said gas or liquid stream with a biogenic activated carbon composition comprising, on a dry basis, about 55 wt % or more total carbon, about 15 wt % or less hydrogen, and less than or equal to about 1 wt % nitrogen, and an Iodine Number of at least about 500, wherein said composition is responsive to an externally applied magnetic field.

In one embodiment, the present disclosure provides a method of reducing or removing one or more contaminants from a gas or liquid comprising:

(a) providing a gas or liquid stream containing one or more contaminants; and (b) contacting said gas or liquid stream with a biogenic activated carbon composition comprising, on a dry basis, about 55 wt % or more total carbon, about 15 wt % or less hydrogen, and less than or equal to about 1 wt % nitrogen, and an Iodine Number of at least about 500, wherein at least a portion of said carbon is present in the form of graphene.

In one embodiment, the present disclosure provides a method of reducing or removing a contaminant from a liquid or gas, said method comprising:

(a) obtaining a biogenic activated carbon composition comprising, on a dry basis, about 55 wt % or more total carbon, about 15 wt % or less hydrogen, and less than or equal to about 1 wt % nitrogen, wherein at least a portion of said carbon is present in the form of graphene;

(b) optionally separating said graphene from said biogenic activated carbon composition; and (c) contacting the liquid or gas with said graphene, in separated form or as part of said biogenic activated carbon composition.

In some embodiments, the liquid is water.

In one embodiment, the present disclosure provides a composition comprising graphene, wherein the graphene is derived from a biogenic activated carbon composition comprising, on a dry basis, about 55 wt % or more total carbon, about 15 wt % or less hydrogen, and less than or equal to about 1 wt % nitrogen; wherein at least a portion of said carbon is present in the form of graphene. In some embodiments, the composition is included in an adhesive, a sealant, a coating, a paint, an ink, a component of a composite material, a catalyst, a catalyst support, a battery electrode component, a fuel cell electrode component, a graphene-based circuit or memory system component, an energy storage material, a supercapacitor component, a sink for static electricity dissipation, a material for electronic or ionic transport, a high-bandwidth communication system component, a component of an infrared sensor, a component of a chemical sensor, a component of a biological sensor, a component of an electronic display, a component of a voltaic cell, or a graphene aerogel.

In one embodiment, the present disclosure provides a method of using graphene comprising:

(a) obtaining a biogenic activated carbon composition comprising, on a dry basis, about 55 wt % or more total carbon, about 15 wt % or less hydrogen, and less than or equal to about 1 wt % nitrogen; wherein at least a portion of said carbon is present in the form of graphene;

(b) optionally separating said graphene from said biogenic activated carbon composition;

(c) using said graphene, in separated form or as part of said biogenic activated carbon composition, in an adhesive, sealant, coating, paint, or ink.

In one embodiment, the present disclosure provides a method of using graphene comprising:

(a) obtaining a biogenic activated carbon composition comprising, on a dry basis, about 55 wt % or more total carbon, about 15 wt % or less hydrogen, and less than or equal to about 1 wt % nitrogen; wherein at least a portion of said carbon is present in the form of graphene;

(b) optionally separating said graphene from said biogenic activated carbon composition;

(c) using said graphene, in separated form or as part of said biogenic activated carbon composition, as a component in a composite material to adjust mechanical or electrical properties of said composite material.

In one embodiment, the present disclosure provides a method of using graphene comprising:

(a) obtaining a biogenic activated carbon composition comprising, on a dry basis, about 55 wt % or more total carbon, about 15 wt % or less hydrogen, and less than or equal to about 1 wt % nitrogen; wherein at least a portion of said carbon is present in the form of graphene;

(b) optionally separating said graphene from said biogenic activated carbon composition;

(c) using said graphene, in separated form or as part of said biogenic activated carbon composition, as a catalyst, a catalyst support, a battery electrode material, or a fuel cell electrode material.

In one embodiment, the present disclosure provides a method of using graphene comprising:

(a) obtaining a biogenic activated carbon composition comprising, on a dry basis, about 55 wt % or more total carbon, about 15 wt % or less hydrogen, and less than or equal to about 1 wt % nitrogen; wherein at least a portion of said carbon is present in the form of graphene;

(b) optionally separating said graphene from said biogenic activated carbon composition;

(c) using said graphene, in separated form or as part of said biogenic activated carbon composition, in a graphene-based circuit or memory system.

In one embodiment, the present disclosure provides a method of using graphene comprising:

(a) obtaining a biogenic activated carbon composition comprising, on a dry basis, about 55 wt % or more total carbon, about 15 wt % or less hydrogen, and less than or equal to about 1 wt % nitrogen; wherein at least a portion of said carbon is present in the form of graphene;

(b) optionally separating said graphene from said biogenic activated carbon composition;

(c) using said graphene, in separated form or as part of said biogenic activated carbon composition, as an energy-storage material or as a supercapacitor component.

In one embodiment, the present disclosure provides a method of using graphene comprising:

(a) obtaining a biogenic activated carbon composition comprising, on a dry basis, about 55 wt % or more total carbon, about 15 wt % or less hydrogen, and less than or equal to about 1 wt % nitrogen; wherein at least a portion of said carbon is present in the form of graphene;

(b) optionally separating said graphene from said biogenic activated carbon composition;

(c) using said graphene, in separated form or as part of said biogenic activated carbon composition, as a sink for static electricity dissipation in a liquid or vapor fuel delivery system.

In one embodiment, the present disclosure provides a method of using graphene comprising:

(a) obtaining a biogenic activated carbon composition comprising, on a dry basis, about 55 wt % or more total carbon, about 15 wt % or less hydrogen, and less than or equal to about 1 wt % nitrogen; wherein at least a portion of said carbon is present in the form of graphene;

(b) optionally separating said graphene from said biogenic activated carbon composition;

(c) using said graphene, in separated form or as part of said biogenic activated carbon composition, as a material for electronic or ionic transport.

In one embodiment, the present disclosure provides a method of using graphene comprising:

(a) obtaining a biogenic activated carbon composition comprising, on a dry basis, about 55 wt % or more total carbon, about 15 wt % or less hydrogen, and less than or equal to about 1 wt % nitrogen; wherein at least a portion of said carbon is present in the form of graphene;

(b) optionally separating said graphene from said biogenic activated carbon composition;

(c) using said graphene, in separated form or as part of said biogenic activated carbon composition, in a high-bandwidth communication system.

In one embodiment, the present disclosure provides a method of using graphene comprising:

(a) obtaining a biogenic activated carbon composition comprising, on a dry basis, about 55 wt % or more total carbon, about 15 wt % or less hydrogen, and less than or equal to about 1 wt % nitrogen; wherein at least a portion of said carbon is present in the form of graphene;

(b) optionally separating said graphene from said biogenic activated carbon composition;

(c) using said graphene, in separated form or as part of said biogenic activated carbon composition, as a component of an infrared, chemical, or biological sensor.

In one embodiment, the present disclosure provides a method of using graphene comprising:

(a) obtaining a biogenic activated carbon composition comprising, on a dry basis, about 55 wt % or more total carbon, about 15 wt % or less hydrogen, and less than or equal to about 1 wt % nitrogen; wherein at least a portion of said carbon is present in the form of graphene;

(b) optionally separating said graphene from said biogenic activated carbon composition;

(c) using said graphene, in separated form or as part of said biogenic activated carbon composition, as a component of an electronic display.

In one embodiment, the present disclosure provides a method of using graphene comprising:

(a) obtaining a biogenic activated carbon composition comprising, on a dry basis, about 55 wt % or more total carbon, about 15 wt % or less hydrogen, and less than or equal to about 1 wt % nitrogen; wherein at least a portion of said carbon is present in the form of graphene;

(b) optionally separating said graphene from said biogenic activated carbon composition;

(c) using said graphene, in separated form or as part of said biogenic activated carbon composition, as a component of a photovoltaic cell.

In one embodiment, the present disclosure provides a method of using graphene comprising:

(a) obtaining a biogenic activated carbon composition comprising, on a dry basis, about 55 wt % or more total carbon, about 15 wt % or less hydrogen, and less than or equal to about 1 wt % nitrogen; wherein at least a portion of said carbon is present in the form of graphene;

(b) optionally separating said graphene from said biogenic activated carbon composition;

(c) using said graphene, in separated form or as part of said biogenic activated carbon composition, to form a graphene aerogel.

In one embodiments provide a method of using a biogenic activated carbon composition to reduce emissions, the method comprising:

(a) providing activated-carbon particles comprising a biogenic activated carbon composition;

(b) providing a gas-phase emissions stream comprising at least one selected contaminant;

(c) providing an additive selected to assist in removal of the selected contaminant from the gas-phase emissions stream;

(d) introducing the activated-carbon particles and the additive into the gas-phase emissions stream, to adsorb at least a portion of the selected contaminant onto the activated-carbon particles, thereby generating contaminant-adsorbed carbon particles within the gas-phase emissions stream; and (e) separating at least a portion of the contaminant-adsorbed carbon particles from the gas-phase emissions stream, to produce a contaminant-reduced gas-phase emissions stream.

In some embodiments, the biogenic activated carbon composition comprises 55 wt % or more total carbon; 15 wt % or less hydrogen; 1 wt % or less nitrogen; 0.5 wt % or less phosphorus; and 0.2 wt % or less sulfur. The additive may be provided as part of the activated-carbon particles. Alternatively, or additionally, the additive may be introduced directly into the gas-phase emissions stream.

The additive (to assist in removal of the selected contaminant from the gas-phase emissions stream) may be selected from an acid, a base, a salt, a metal, a metal oxide, a metal hydroxide, a metal halide, iodine, an iodine compound, or a combination thereof. In some embodiments, the additive comprises iodine or an iodine compound, or a combination of iodine and one or more iodine compounds, optionally dissolved in a solvent.

In some embodiments, the selected contaminant is a metal, such as a metal selected from the group consisting of mercury, boron, selenium, arsenic, and any compound, salt, and mixture thereof. In some embodiments, the selected contaminant is a hazardous air pollutant or a volatile organic compound. In some embodiments, the selected contaminant is a non-condensable gas selected from the group consisting of nitrogen oxides, carbon monoxide, carbon dioxide, hydrogen sulfide, sulfur dioxide, sulfur trioxide, methane, ethane, ethylene, ozone, ammonia, and combinations thereof.

In some embodiments, the contaminant-adsorbed carbon particles include, in absorbed, adsorbed, or reacted form, at least one, two, three, or all contaminants selected from the group consisting of carbon dioxide, nitrogen oxides, mercury, and sulfur dioxide.

In some embodiments, the gas-phase emissions stream is derived from combustion of a fuel comprising the biogenic activated carbon composition. In certain embodiments, the gas-phase emissions stream is derived from co-combustion of coal and the biogenic activated carbon composition.

In some embodiments, the separating in step (e) comprises filtration, which may for example utilize fabric filters. In some embodiments, separating in step (e) comprises electrostatic precipitation. Scrubbing (including wet or dry scrubbing) may also be employed. Optionally, the contaminant-adsorbed carbon particles may be treated to regenerate the activated-carbon particles. In some embodiments, the contaminant-adsorbed carbon particles are thermally oxidized catalytically or non-catalytically. The contaminant-adsorbed carbon particles, or a regenerated form thereof, may be combusted to provide energy and/or gasified to provide syngas.

In some embodiments, a method of using a biogenic activated carbon composition to reduce mercury emissions, comprises:

(a) providing activated-carbon particles comprising a biogenic activated carbon composition that includes an additive comprising iodine or an iodine-containing compound;

(b) providing a gas-phase emissions stream comprising mercury;

(c) introducing the activated-carbon particles into the gas-phase emissions stream, to adsorb at least a portion of the mercury onto the activated-carbon particles, thereby generating mercury-adsorbed carbon particles within the gas-phase emissions stream; and (d) separating at least a portion of the mercury-adsorbed carbon particles from the gas-phase emissions stream using electrostatic precipitation, to produce a mercury-reduced gas-phase emissions stream.

In some variations, a process for energy production is provided, the process comprising:

(a) providing a carbon-containing feedstock comprising a biogenic activated carbon composition; and (b) oxidizing the carbon-containing feedstock to generate energy and a gas-phase emissions stream, wherein the presence of the biogenic activated carbon composition within the carbon-containing feedstock is effective to adsorb at least one contaminant produced as a byproduct of the oxidizing or derived from the carbon-containing feedstock, thereby reducing emissions of the contaminant, and wherein the biogenic activated carbon composition further includes an additive that is selected from an acid, a base, a salt, a metal, a metal oxide, a metal hydroxide, a metal halide, iodine, an iodine compound, or a combination thereof.

In some embodiments, the contaminant, or a precursor thereof, is contained within the carbon-containing feedstock. In some embodiments, the contaminant is produced as a byproduct of the oxidizing. The carbon-containing feedstock further comprises biomass, coal, or another carbonaceous feedstock, in various embodiments.

The selected contaminant may be a metal selected from the group consisting of mercury, boron, selenium, arsenic, and any compound, salt, and mixture thereof; a hazardous air pollutant; a volatile organic compound; or a non-condensable gas selected from the group consisting of nitrogen oxides, carbon monoxide, carbon dioxide, hydrogen sulfide, sulfur dioxide, sulfur trioxide, methane, ethane, ethylene, ozone, ammonia; and combinations thereof.

In some variations, a method of using a biogenic activated carbon composition to purify a liquid, comprises:

(a) providing activated-carbon particles comprising a biogenic activated carbon composition;

(b) providing a liquid comprising at least one selected contaminant;

(c) providing an additive selected to assist in removal of the selected contaminant from the liquid; and (d) contacting the liquid with the activated-carbon particles and the additive, to adsorb at least a portion of the at least one selected contaminant onto the activated-carbon particles, thereby generating contaminant-adsorbed carbon particles and a contaminant-reduced liquid.

The biogenic activated carbon composition comprises, in some embodiments, 55 wt % or more total carbon; 15 wt % or less hydrogen; 1 wt % or less nitrogen; 0.5 wt % or less phosphorus; and 0.2 wt % or less sulfur.

The additive may be provided as part of the activated-carbon particles and/or introduced directly into the liquid. The additive may be selected from an acid, a base, a salt, a metal, a metal oxide, a metal hydroxide, a metal halide, iodine, an iodine compound, or a combination thereof.

In some embodiments, the additive comprises iodine that is present in the biogenic activated carbon composition as absorbed or intercalated molecular $I_2$, physically or chemically adsorbed molecular $I_2$, absorbed or intercalated atomic I, physically or chemically adsorbed atomic I, or a combination thereof.

In some embodiments, the additive comprises an iodine-containing compound, such as (but not limited to) an iodine-containing compound is selected from the group consisting of iodide ion, hydrogen iodide, an iodide salt, a metal iodide, ammonium iodide, an iodine oxide, triiodide ion, a triiodide salt, a metal triiodide, ammonium triiodide, iodate ion, an iodate salt, a polyiodide, iodoform, iodic acid, methyl iodide, an iodinated hydrocarbon, periodic acid, orthoperiodic acid, metaperiodic acid, and combinations, salts, acids, bases, or derivatives thereof.

Additives may result in a final product with higher energy content (energy density). An increase in energy content may result from an increase in total carbon, fixed carbon, volatile carbon, or even hydrogen. Alternatively or additionally, the increase in energy content may result from removal of non-combustible matter or of material having lower energy density than carbon. In some embodiments, additives reduce the extent of liquid formation, in favor of solid and gas formation, or in favor of solid formation.

In various embodiments, additives chemically modify the starting biomass, or the treated biomass prior to pyrolysis, to reduce rupture of cell walls for greater strength/integrity. In some embodiments, additives may increase fixed carbon content of biomass feedstock prior to pyrolysis.

Additives may result in a final biogenic activated carbon product with improved mechanical properties, such as yield strength, compressive strength, tensile strength, fatigue strength, impact strength, elastic modulus, bulk modulus, or shear modulus. Additives may improve mechanical properties by simply being present (e.g., the additive itself imparts strength to the mixture) or due to some transformation that takes place within the additive phase or within the resulting mixture. For example, reactions such as vitrification may occur within a portion of the biogenic activated carbon product that includes the additive, thereby improving the final strength.

Chemical additives may be applied to wet or dry biomass feedstocks. The additives may be applied as a solid powder, a spray, a mist, a liquid, or a vapor. In some embodiments, additives may be introduced through spraying of a liquid solution (such as an aqueous solution or in a solvent), or by soaking in tanks, bins, bags, or other containers.

In certain embodiments, dip pretreatment is employed wherein the solid feedstock is dipped into a bath comprising the additive, either batchwise or continuously, for a time sufficient to allow penetration of the additive into the solid feed material.

In some embodiments, additives applied to the feedstock may reduce energy requirements for the pyrolysis, and/or increase the yield of the carbonaceous product. In these or other embodiments, additives applied to the feedstock may provide functionality that is desired for the intended use of the carbonaceous product, as will be further described below regarding compositions.

In some embodiments, the process for producing a biogenic activated carbon further comprises a step of sizing (e.g., sorting, screening, classifying, etc.) the warm or cool pyrolyzed solids to form sized pyrolyzed solids. The sized pyrolyzed solids can then be used in applications which call for an activated carbon product having a certain particle size characteristic.

The throughput, or process capacity, may vary widely from small laboratory-scale units to full commercial-scale biorefineries, including any pilot, demonstration, or semi-commercial scale. In various embodiments, the process capacity is at least about 1 kg/day, 10 kg/day, 100 kg/day, 1 ton/day (all tons are metric tons), 10 tons/day, 100 tons/day, 500 tons/day, 1000 tons/day, 2000 tons/day, or higher.

In some embodiments, a portion of solids produced may be recycled to the front end of the process, i.e. to the drying or deaeration unit or directly to the BPU or reactor. By returning to the front end and passing through the process again, treated solids may become higher in fixed carbon. Solid, liquid, and gas streams produced or existing within the process can be independently recycled, passed to subsequent steps, or removed/purged from the process at any point.

In some embodiments, pyrolyzed material is recovered and then fed to a separate reactor for further pyrolysis, to create a product with higher carbon purity. In some embodiments, the secondary process may be conducted in a simple container, such as a steel drum, in which heated inert gas (such as heated N$_2$) is passed through. Other containers useful for this purpose include process tanks, barrels, bins, totes, sacks, and roll-offs. This secondary sweep gas with volatiles may be sent to the process gas heater, or back to the main BPU, for example. To cool the final product, another stream of inert gas, which is initially at ambient temperature for example, may be passed through the solids to cool the solids, and then returned to an inert gas preheat system. In various embodiments, the secondary process takes place in a separate carbonization or pyrolysis reactor, in which preheated substantially inert gas is inputted to pyrolyze the material and drive carbonization.

Some embodiments of the present disclosure provide a biogenic activated carbon production system comprising:

(a) a material feed system configured to introduce a carbon-containing feedstock;

(b) an optional dryer, disposed in operable communication with the material feed system, configured to remove moisture contained within a carbon-containing feedstock;

(c) a biomass processing unit including a plurality of zones, disposed in operable communication with the dryer, wherein the biomass processing unit contains at least a pyrolysis zone disposed in operable communication with a spatially separated cooling zone, and wherein the biomass processing unit is configured with an outlet to remove condensable vapors and non-condensable gases from solids;

(d) an external cooler, disposed in operable communication with the biomass processing unit; and (e) a carbon recovery unit, disposed in operable communication with the cooler.

Some embodiments of the present disclosure provide a biogenic activated carbon production system comprising:

(a) a material feed system configured to introduce a carbon-containing feedstock;

(b) an optional dryer, disposed in operable communication with the material feed system, configured to remove moisture contained within a carbon-containing feedstock;

(c) an optional preheater, disposed in operable communication with the dryer, configured to heat and/or mildly pyrolyze the feedstock;

(d) a pyrolysis reactor, disposed in operable communication with the preheater, configured to pyrolyze the feedstock;

(e) a cooler, disposed in operable communication with the pyrolysis reactor, configured to cool pyrolyzed solids; and (f) a carbon recovery unit, disposed in operable communication with the cooler, wherein the system is configured with at least one gas outlet to remove condensable vapors and non-condensable gases from solids.

The material feed system may be physically integrated with the BPU, such as through the use of a screw material feed system or auger mechanism to introduce feed solids into one of the reactors or zones.

In some embodiments, the system further comprises a preheating zone, disposed in operable communication with the pyrolysis zone. Each of the pyrolysis zone, cooling zone, and preheating zone (it present) may be located within a single BPU, or may be located in separate BPUs.

Optionally, the dryer may be configured as a drying zone within the BPU. Optionally, the cooler may be disposed within the BPU (i.e., configured as an additional cooling zone or integrated with the cooling zone discussed above).

The system may include a purging means for removing oxygen from the system. For example, the purging means may comprise one or more inlets to introduce a substantially inert gas, and one or more outlets to remove the substantially inert gas and displaced oxygen from the system. In some embodiments, the purging means is a deaerater disposed in operable communication between the dryer and the BPU.

The BPU can be configured with at least a first gas inlet and a first gas outlet. The first gas inlet and the first gas outlet may be disposed in communication with different zones, or with the same zones.

In some embodiments, the BPU is configured with a second gas inlet and/or a second gas outlet. In some embodiments, the BPU is configured with a third gas inlet and/or a third gas outlet. In some embodiments, the BPU is configured with a fourth gas inlet and/or a fourth gas outlet. In some embodiments, each zone present in the BPU is configured with a gas inlet and a gas outlet.

Gas inlets and outlets allow not only introduction and withdrawal of vapor, but gas outlets (probes) in particular allow precise process monitoring and control across various stages of the process, up to and potentially including all stages of the process. Precise process monitoring would be expected to result in yield and efficiency improvements, both dynamically as well as over a period of time when operational history can be utilized to adjust process conditions.

In some embodiments (see, generally, FIG. 4), a reaction gas probe is disposed in operable communication with the pyrolysis zone. Such a reaction gas probe may be useful to extract gases and analyze them, in order to determine extent of reaction, pyrolysis selectivity, or other process monitoring. Then, based on the measurement, the process may be controlled or adjusted in any number of ways, such as by adjusting feed rate, rate of inert gas sweep, temperature (of one or more zones), pressure (of one or more zones), additives, and so on.

As intended herein, "monitor and control" via reaction gas probes should be construed to include any one or more sample extractions via reaction gas probes, and optionally making process or equipment adjustments based on the measurements, if deemed necessary or desirable, using well-known principles of process control (feedback, feedforward, proportional-integral-derivative logic, etc.).

A reaction gas probe may be configured to extract gas samples in a number of ways. For example, a sampling line may have a lower pressure than the pyrolysis reactor pressure, so that when the sampling line is opened an amount of gas can readily be extracted from pyrolysis zone. The sampling line may be under vacuum, such as when the pyrolysis zone is near atmospheric pressure. Typically, a reaction gas probe will be associated with one gas output, or a portion thereof (e.g., a line split from a gas output line).

In some embodiments, both a gas input and a gas output are utilized as a reaction gas probe by periodically introducing an inert gas into a zone, and pulling the inert gas with a process sample out of the gas output ("sample sweep"). Such an arrangement could be used in a zone that does not otherwise have a gas inlet/outlet for the substantially inert gas for processing, or, the reaction gas probe could be associated with a separate gas inlet/outlet that is in addition to process inlets and outlets. A sampling inert gas that is introduced and extracted periodically for sampling (in embodiments that utilize sample sweeps) could even be different than the process inert gas, if desired, either for reasons of accuracy in analysis or to introduce an analytical tracer.

For example, acetic acid concentration in the gas phase of the pyrolysis zone may be measured using a gas probe to extract a sample, which is then analyzed using a suitable technique (such as gas chromatography, GC; mass spectroscopy, MS; GC-MS, or Fourier-Transform Infrared Spectroscopy, FTIR). CO and/or $CO_2$ concentration in the gas phase could be measured and used as an indication of the pyrolysis selectivity toward gases/vapors, for example. Terpene concentration in the gas phase could be measured and used as an indication of the pyrolysis selectivity toward liquids, and so on.

In some embodiments, the system further comprises at least one additional gas probe disposed in operable communication with the cooling zone, or with the drying zone (if present) or the preheating zone (if present).

A gas probe for the cooling zone could be useful to determine the extent of any additional chemistry taking place in the cooling zone, for example. A gas probe in the cooling zone could also be useful as an independent measurement of temperature (in addition, for example, to a thermocouple disposed in the cooling zone). This independent measurement may be a correlation of cooling temperature with a measured amount of a certain species. The correlation could be separately developed, or could be established after some period of process operation.

A gas probe for the drying zone could be useful to determine the extent of drying, by measuring water content, for example. A gas probe in the preheating zone could be useful to determine the extent of any mild pyrolysis taking place, for example.

In certain embodiments, the cooling zone is configured with a gas inlet, and the pyrolysis zone is configured with a gas outlet, to generate substantially countercurrent flow of the gas phase relative to the solid phase. Alternatively, or additionally, the preheating zone (when it is present) may be configured with a gas outlet, to generate substantially countercurrent flow of the gas phase relative to the solid phase. Alternatively, or additionally, the drying zone may be configured with a gas outlet, to generate substantially countercurrent flow.

The pyrolysis reactor or reactors may be selected from any suitable reactor configuration that is capable of carrying out the pyrolysis process. Exemplary reactor configurations include, but are not limited to, fixed-bed reactors, fluidized-bed reactors, entrained-flow reactors, augers, rotating cones, rotary drum kilns, calciners, roasters, moving-bed reactors, transport-bed reactors, ablative reactors, rotating cones, or microwave-assisted pyrolysis reactors.

In some embodiments in which an auger is used, sand or another heat carrier can optionally be employed. For example, the feedstock and sand can be fed at one end of a screw. The screw mixes the sand and feedstock and conveys them through the reactor. The screw can provide good control of the feedstock residence time and does not dilute the pyrolyzed products with a carrier or fluidizing gas. The sand can be reheated in a separate vessel.

In some embodiments in which an ablative process is used, the feedstock is moved at a high speed against a hot metal surface. Ablation of any char forming at surfaces can maintain a high rate of heat transfer. Such apparatus can prevent dilution of products. As an alternative, the feedstock particles may be suspended in a carrier gas and introduced at a high speed through a cyclone whose wall is heated.

In some embodiments in which a fluidized-bed reactor is used, the feedstock can be introduced into a bed of hot sand fluidized by a gas, which is typically a recirculated product gas. Reference herein to "sand" shall also include similar, substantially inert materials, such as glass particles, recovered ash particles, and the like. High heat-transfer rates from fluidized sand can result in rapid heating of the feedstock. There can be some ablation by attrition with the sand particles. Heat is usually provided by heat-exchanger tubes through which hot combustion gas flows.

Circulating fluidized-bed reactors can be employed, wherein gas, sand, and feedstock move together. Exemplary transport gases include recirculated product gases and combustion gases. High heat-transfer rates from the sand ensure rapid heating of the feedstock, and ablation is expected to be stronger than with regular fluidized beds. A separator can be employed to separate the product gases from the sand and char particles. The sand particles can be reheated in a fluidized burner vessel and recycled to the reactor.

In some embodiments, the BPU is a continuous reactor comprising a feedstock inlet, a plurality of spatially separated zones configured for separately controlling the temperature and mixing within each of the zones, and a carbonaceous-solids outlet, wherein one of the zones is configured with a first gas inlet for introducing a substantially inert gas into the BPU, and wherein one of the zones is configured with a first gas outlet.

In some embodiments the reactor includes at least two, three, four, or more zones. Each of the zones is disposed in communication with separately adjustable heating means independently selected from the group consisting of electrical heat transfer, steam heat transfer, hot-oil heat transfer, phase-change heat transfer, waste heat transfer, and combinations thereof. In some embodiments, at least one zone is heated with an effluent stream from the process gas heater, if present.

The BPU may be configured for separately adjusting gas-phase composition and gas-phase residence time of at least two zones, up to and including all zones present in the BPU.

The BPU may be equipped with a second gas inlet and/or a second gas outlet. In some embodiments, the BPU is configured with a gas inlet in each zone. In these or other embodiments, the BPU is configured with a gas outlet in each zone. The BPU may be a cocurrent or countercurrent reactor.

In some embodiments, the material feed system comprises a screw or auger feed mechanism. In some embodiments, the carbonaceous-solids outlet comprises a screw or auger output mechanism.

Some embodiments utilize a rotating calciner with a screw material feed system. In these embodiments, some or all of the BPU is axially rotatable, i.e. it spins about its centerline axis. The speed of rotation will impact the solid flow pattern, and heat and mass transport. Each of the zones may be configured with flights disposed on internal walls, to provide agitation of solids. The flights may be separately adjustable in each of the zones.

Other means of agitating solids may be employed, such as augers, screws, or paddle conveyors. In some embodiments, the BPU includes a single, continuous auger disposed throughout each of the zones. In other embodiments, the reactor includes twin screws disposed throughout each of the zones.

Some systems are designed specifically with the capability to maintain the approximate size of feed material throughout the process—that is, to process the biomass feedstock without destroying or significantly damaging its structure. In some embodiments, the pyrolysis zone does not contain augers, screws, or rakes that would tend to greatly reduce the size of feed material being pyrolyzed.

In some embodiments of the disclosure, the system further includes a process gas heater disposed in operable communication with the outlet at which condensable vapors and non-condensable gases are removed. The process gas heater can be configured to receive a separate fuel (such as natural gas) and an oxidant (such as air) into a combustion chamber, adapted for combustion of the fuel and at least a portion of the condensable vapors. Certain non-condensable gases may also be oxidized, such as CO or $CH_4$, to $CO_2$.

When a process gas heater is employed, the system may include a heat exchanger disposed between the process gas heater and the dryer, configured to utilize at least some of the heat of the combustion for the dryer. This embodiment can contribute significantly to the overall energy efficiency of the process.

In some embodiments, the system further comprises a material enrichment unit, disposed in operable communication with the cooler, configured for combining condensable vapors, in at least partially condensed form, with the solids. The material enrichment unit may increase the carbon content of the biogenic activated carbon obtained from the carbon recovery unit.

The system may further include a separate pyrolysis zone adapted to further pyrolyze the biogenic activated carbon to further increase its carbon content. The separate pyrolysis zone may be a relatively simply container, unit, or device, such as a tank, barrel, bin, drum, tote, sack, or roll-off.

The overall system may be at a fixed location, or it may be made portable. The system may be constructed using modules which may be simply duplicated for practical scale-up. The system may also be constructed using economy-of-scale principles, as is well-known in the process industries.

Some embodiments of the present disclosure relating to carbon enrichment of solids will now be further described. In some embodiments, a process for producing a biogenic activated carbon comprises:

(a) providing a carbon-containing feedstock comprising biomass;

(b) optionally drying the feedstock to remove at least a portion of moisture contained within the feedstock;

(c) optionally deaerating the feedstock to remove at least a portion of interstitial oxygen, if any, contained with the feedstock;

(d) in a pyrolysis zone, pyrolyzing the feedstock in the presence of a substantially inert gas for at least 10 minutes and with a pyrolysis temperature selected from about 250° C. to about 700° C., to generate hot pyrolyzed solids, condensable vapors, and non-condensable gases;

(e) separating at least a portion of the condensable vapors and at least a portion of the non-condensable gases from the hot pyrolyzed solids;

(f) in a cooling zone, cooling the hot pyrolyzed solids, in the presence of the substantially inert gas for at least 5 minutes and with a cooling temperature less than or equal to about the pyrolysis temperature, to generate warm pyrolyzed solids;

(g) optionally cooling the warm pyrolyzed solids in a cooler to generate cool pyrolyzed solids;

(h) subsequently passing at least a portion of the condensable vapors and/or at least a portion of the non-condensable gases from step (e) across the warm pyrolyzed solids and/or the cool pyrolyzed solids, to form enriched pyrolyzed solids with increased carbon content; and (i) in a carbon recovery unit, recovering a biogenic activated carbon comprising at least a portion of the enriched pyrolyzed solids.

In some embodiments, step (h) includes passing at least a portion of the condensable vapors from step (e), in vapor and/or condensed form, across the warm pyrolyzed solids, to produce enriched pyrolyzed solids with increased carbon content. In some embodiments, step (h) includes passing at least a portion of the non-condensable gases from step (e) across the warm pyrolyzed solids, to produce enriched pyrolyzed solids with increased carbon content.

It should be appreciated that in various embodiments, carbon enrichment increases carbon content, energy content, as well as mass yield.

Alternatively, or additionally, vapors or gases may be contacted with the cool pyrolyzed solids. In some embodiments, step (h) includes passing at least a portion of the condensable vapors from step (e), in vapor and/or condensed form, across the cool pyrolyzed solids, to produce enriched pyrolyzed solids with increased carbon content. In some embodiments, step (h) includes passing at least a portion of the non-condensable gases from step (e) across the cool pyrolyzed solids, to produce enriched pyrolyzed solids with increased carbon content.

In certain embodiments, step (h) includes passing substantially all of the condensable vapors from step (e), in vapor and/or condensed form, across the cool pyrolyzed solids, to produce enriched pyrolyzed solids with increased carbon content. In certain embodiments, step (h) includes passing substantially all of the non-condensable gases from step (e) across the cool pyrolyzed solids, to produce enriched pyrolyzed solids with increased carbon content.

The process may include various methods of treating or separating the vapors or gases prior to using them for carbon enrichment. For example, an intermediate feed stream consisting of at least a portion of the condensable vapors and at least a portion of the non-condensable gases, obtained from step (e), may be fed to a separation unit configured to generate at least first and second output streams. In certain embodiments, the intermediate feed stream comprises all of the condensable vapors, all of the non-condensable gases, or both.

Separation techniques can include or use distillation columns, flash vessels, centrifuges, cyclones, membranes, filters, packed beds, capillary columns, and so on. Separation can be principally based, for example, on distillation, absorption, adsorption, or diffusion, and can utilize differences in vapor pressure, activity, molecular weight, density, viscosity, polarity, chemical functionality, affinity to a stationary phase, and any combinations thereof.

In some embodiments, the first and second output streams are separated from the intermediate feed stream based on relative volatility. For example, the separation unit may be a distillation column, a flash tank, or a condenser.

Thus in some embodiments, the first output stream comprises the condensable vapors, and the second output stream comprises the non-condensable gases. The condensable vapors may include at least one carbon-containing compound selected from terpenes, alcohols, acids, aldehydes, or ketones. The vapors from pyrolysis may include aromatic compounds such as benzene, toluene, ethylbenzene, and xylenes. Heavier aromatic compounds, such as refractory tars, may be present in the vapor. The non-condensable gases may include at least one carbon-containing molecule selected from the group consisting of carbon monoxide, carbon dioxide, and methane.

In some embodiments, the first and second output streams are separated intermediate feed stream based on relative polarity. For example, the separation unit may be a stripping column, a packed bed, a chromatography column, or membranes.

Thus in some embodiments, the first output stream comprises polar compounds, and the second output stream comprises non-polar compounds. The polar compounds may include at least one carbon-containing molecule selected from the group consisting of methanol, furfural, and acetic acid. The non-polar compounds may include at least one carbon-containing molecule selected from the group consisting of carbon monoxide, carbon dioxide, methane, a terpene, and a terpene derivative.

Step (h) may increase the total carbon content of the biogenic activated carbon, relative to an otherwise-identical process without step (h). The extent of increase in carbon content may be, for example, about 1%, 2%, 5%, 10%, 15%, 25%, or even higher, in various embodiments.

In some embodiments, step (h) increases the fixed carbon content of the biogenic activated carbon. In these or other embodiments, step (h) increases the volatile carbon content of the biogenic activated carbon. Volatile carbon content is the carbon attributed to volatile matter in the reagent. The volatile matter may be, but is not limited to, hydrocarbons including aliphatic or aromatic compounds (e.g., terpenes); oxygenates including alcohols, aldehydes, or ketones; and various tars. Volatile carbon will typically remain bound or adsorbed to the solids at ambient conditions but upon heating, will be released before the fixed carbon would be oxidized, gasified, or otherwise released as a vapor.

Depending on conditions associated with step (h), it is possible for some amount of volatile carbon to become fixed carbon (e.g., via Boudouard carbon formation from CO). Typically, the volatile matter will be expected to enter the micropores of the fixed carbon and will be present as condensed/adsorbed species, but still relatively volatile. This residual volatility can be more advantageous for fuel applications, compared to product applications requiring high surface area and porosity.

Step (h) may increase the energy content (i.e., energy density) of the biogenic activated carbon. The increase in energy content may result from an increase in total carbon, fixed carbon, volatile carbon, or even hydrogen. The extent of increase in energy content may be, for example, about 1%, 2%, 5%, 10%, 15%, 25%, or even higher, in various embodiments.

Further separations may be employed to recover one or more non-condensable gases or condensable vapors, for use within the process or further processing. For example, further processing may be included to produce refined CO or syngas.

As another example, separation of acetic acid may be conducted, followed by reduction of the acetic acid into ethanol. The reduction of the acetic acid may be accomplished, at least in part, using hydrogen derived from the non-condensable gases produced.

Condensable vapors may be used for either energy in the process (such as by thermal oxidation) or in carbon enrichment, to increase the carbon content of the biogenic activated carbon. Certain non-condensable gases, such as CO or $CH_4$, may be utilized either for energy in the process, or as part of the substantially inert gas for the pyrolysis step. Combinations of any of the foregoing are also possible.

A potential benefit of including step (h) is that the gas stream is scrubbed, with the resulting gas stream being enriched in CO and $CO_2$. The resulting gas stream may be utilized for energy recovery, recycled for carbon enrichment of solids, and/or used as an inert gas in the reactor. Similarly, by separating non-condensable gases from condensable vapors, the $CO/CO_2$ stream is prepared for use as the inert gas in the reactor system or in the cooling system, for example.

Other variations of the disclosure are premised on the realization that the principles of the carbon-enrichment step may be applied to any feedstock in which it is desired to add carbon.

In some embodiments, a batch or continuous process for producing a biogenic activated carbon comprises:

(a) providing a solid stream comprising a carbon-containing material;

(b) providing a gas stream comprising condensable carbon-containing vapors, non-condensable carbon-containing gases, or a mixture of condensable carbon-containing vapors and non-condensable carbon-containing gases; and (c) passing the gas stream across the solid stream under suitable conditions to form a carbon-containing product with increased carbon content relative to the carbon-containing material.

In some embodiments, the starting carbon-containing material is pyrolyzed biomass or torrefied biomass. The gas stream may be obtained during an integrated process that provides the carbon-containing material. Or, the gas stream may be obtained from separate processing of the carbon-containing material. The gas stream, or a portion thereof, may be obtained from an external source (e.g., an oven at a lumber mill). Mixtures of gas streams, as well as mixtures of carbon-containing materials, from a variety of sources, are possible.

In some embodiments, the process further comprises recycling or reusing the gas stream for repeating the process to further increase carbon and/or energy content of the carbon-containing product. In some embodiments, the process further comprises recycling or reusing the gas stream for carrying out the process to increase carbon and/or energy content of another feedstock different from the carbon-containing material.

In some embodiments, the process further includes introducing the gas stream to a separation unit configured to generate at least first and second output streams, wherein the gas stream comprises a mixture of condensable carbon-containing vapors and non-condensable carbon-containing gases. The first and second output streams may be separated based on relative volatility, relative polarity, or any other property. The gas stream may be obtained from separate processing of the carbon-containing material.

In some embodiments, the process further comprises recycling or reusing the gas stream for repeating the process to further increase carbon content of the carbon-containing product. In some embodiments, the process further comprises recycling or reusing the gas stream for carrying out the process to increase carbon content of another feedstock.

The carbon-containing product may have an increased total carbon content, a higher fixed carbon content, a higher volatile carbon content, a higher energy content, or any combination thereof, relative to the starting carbon-containing material.

In related variations, a biogenic activated carbon production system comprises:

(a) a material feed system configured to introduce a carbon-containing feedstock;

(b) an optional dryer, disposed in operable communication with the material feed system, configured to remove moisture contained within a carbon-containing feedstock;

(c) a BPU, disposed in operable communication with the dryer, wherein the BPU contains at least a pyrolysis zone disposed in operable communication with a spatially separated cooling zone, and wherein the BPU is configured with an outlet to remove condensable vapors and non-condensable gases from solids;

(d) a cooler, disposed in operable communication with the BPU;

(e) a material enrichment unit, disposed in operable communication with the cooler, configured to pass the condensable vapors and/or the non-condensable gases across the solids, to form enriched solids with increased carbon content; and (f) a carbon recovery unit, disposed in operable communication with the material enrichment unit.

The system may further comprise a preheating zone, disposed in operable communication with the pyrolysis zone. In some embodiments, the dryer is configured as a drying zone within the BPU. Each of the zones may be located within a single BPU or in separate BPUs. Also, the cooler may be disposed within the BPU.

In some embodiments, the cooling zone is configured with a gas inlet, and the pyrolysis zone is configured with a gas outlet, to generate substantially countercurrent flow of the gas phase relative to the solid phase. In these or other embodiments, the preheating zone and/or the drying zone (or dryer) is configured with a gas outlet, to generate substantially countercurrent flow of the gas phase relative to the solid phase.

In particular embodiments, the system incorporates a material enrichment unit that comprises:

(i) a housing with an upper portion and a lower portion;

(ii) an inlet at a bottom of the lower portion of the housing configured to carry the condensable vapors and non-condensable gases;

(iii) an outlet at a top of the upper portion of the housing configured to carry a concentrated gas stream derived from the condensable vapors and non-condensable gases;

(iv) a path defined between the upper portion and the lower portion of the housing; and (v) a material transport system following the path, the material transport system configured to transport the solids, wherein the housing is shaped such that the solids adsorb at least some of the condensable vapors and/or at least some of the non-condensable gases.

The present disclosure is capable of producing a variety of compositions useful as biogenic activated carbons, and products incorporating these reagents. In some variations, a biogenic activated carbon is produced by any process disclosed herein, such as a process comprising the steps of:

(a) providing a carbon-containing feedstock comprising biomass;

(b) optionally drying the feedstock to remove at least a portion of moisture contained within the feedstock;

(c) optionally deaerating the feedstock to remove at least a portion of interstitial oxygen, if any, contained with the feedstock;

(d) in a pyrolysis zone, pyrolyzing the feedstock in the presence of a substantially inert gas for at least 10 minutes and with a pyrolysis temperature selected from about 250° C. to about 700° C., to generate hot pyrolyzed solids, condensable vapors, and non-condensable gases;

(e) separating at least a portion of the condensable vapors and at least a portion of the non-condensable gases from the hot pyrolyzed solids;

(f) in a cooling zone, cooling the hot pyrolyzed solids, in the presence of the substantially inert gas for at least 5 minutes and with a cooling temperature less than or equal to about the pyrolysis temperature, to generate warm pyrolyzed solids;

(g) cooling the warm pyrolyzed solids to generate cool pyrolyzed solids; and (h) recovering a biogenic activated carbon comprising at least a portion of the cool pyrolyzed solids.

In some embodiments, the process for producing a biogenic activated carbon further comprises a step of sizing (e.g., sorting, screening, classifying, etc.) the warm or cool pyrolyzed solids to form sized pyrolyzed solids. The sized pyrolyzed solids can then be used in applications which call for an activated carbon product having a certain particle size characteristic.

In some embodiments, the biogenic activated carbon comprises at least about 55 wt. %, for example at least 55 wt. %, at least 60 wt. %, at least 65 wt. %, at least 70 wt %, at least 75 wt. %, at least 80 wt %, at least 85 wt. %, at least 90 wt %, at least 95 wt %, at least 96 wt %, at least 97 wt %, at least 98 wt %, or at least 99 wt % total carbon on a dry basis. The total carbon includes at least fixed carbon, and may further include carbon from volatile matter. In some embodiments, carbon from volatile matter is about at least 5%, at least 10%, at least 25%, or at least 50% of the total carbon present in the biogenic activated carbon. Fixed carbon may be measured using ASTM D3172, while volatile carbon may be estimated using ASTM D3175, for example.

Biogenic activated carbon according to the present disclosure may comprise about 0 wt % to about 8 wt % hydrogen. In some embodiments, biogenic activated carbon comprises greater than about 0.5 wt % hydrogen, for example about 0.6 wt %, about 0.7 wt %, about 0.8 wt %, about 0.9 wt %, about 1 wt %, about 1.2 wt %, about 1.4 wt %, about 1.6 wt %, about 1.8 wt %, about 2 wt %, about 2.2 wt %, about 2.4 wt %, about 2.6 wt %, about 2.8 wt %, about 3 wt %, about 3.2 wt %, about 3.4 wt %, about 3.6 wt %, about 3.8 wt %, about 4 wt %, or greater than about 4 wt % hydrogen. The hydrogen content of biogenic activated carbon may be determined by any suitable method known in the art, for example by the combustion analysis procedure outlined in ASTM D5373. In some embodiments, biogenic activated carbon has a hydrogen content that is greater than the hydrogen content of activated carbon derived from fossil fuel sources. Typically, fossil fuel based activated carbon products have less than or equal to about 1 wt % hydrogen, for example about 0.6 wt % hydrogen. In some embodiments, the characteristics of an activated carbon product can be optimized by blending an amount of a fossil fuel based activated carbon product (i.e., with a very low hydrogen content) with a suitable amount of a biogenic activated carbon product having a hydrogen content greater than that of the fossil fuel based activated carbon product.

The biogenic activated carbon may comprise about 10 wt % or less, such as about 5 wt % or less, hydrogen on a dry basis. The biogenic activated carbon product may comprise about 1 wt % or less, such as about 0.5 wt % or less, nitrogen on a dry basis. The biogenic activated carbon product may comprise about 0.5 wt % or less, such as about 0.2 wt % or less, phosphorus on a dry basis. The biogenic activated carbon product may comprise about 0.2 wt % or less, such as about 0.1 wt % or less, sulfur on a dry basis.

In certain embodiments, the biogenic activated carbon includes oxygen, such as up to 20 wt % oxygen, for example about 0.2 wt %, about 0.5 wt %, about 1 wt %, about 2 wt %, about 3 wt %, about 4 wt %, about 5 wt %, about 6 wt %, about 7 wt %, about 7.5 wt %, about 8 wt %, about 9 wt %, about 10 wt %, about 11 wt %, about 12 wt %, about 13 wt %, about 14 wt %, about 15 wt %, about 16 wt %, about 17 wt %, about 18 wt %, about 19 wt %, or about 20 wt % oxygen. The presence of oxygen may be beneficial in the activated carbon for certain applications, such as mercury capture, especially in conjunction with the presence of a halogen (such as chlorine or bromine). In some embodiments, biogenic activated carbon has a oxygen content that is greater than the oxygen content of activated carbon derived from fossil fuel sources. Typically, fossil fuel based activated carbon products have less than or equal to about 10 wt % oxygen, for example about 7 wt % oxygen or about 0.3 wt % oxygen. In some embodiments, the characteristics of an activated carbon product can be optimized by blending an amount of a fossil fuel based activated carbon product (i.e., with a very low oxygen content) with a suitable amount of a biogenic activated carbon product having a oxygen content greater than that of the fossil fuel based activated carbon product.

Carbon, hydrogen, and nitrogen may be measured using ASTM D5373 for ultimate analysis, for example. Oxygen may be estimated using ASTM D3176, for example. Sulfur may be measured using ASTM D3177, for example.

Certain embodiments provide reagents with little or essentially no hydrogen (except from any moisture that may be present), nitrogen, phosphorus, or sulfur, and are substantially carbon plus any ash and moisture present. Therefore, some embodiments provide a material with up to and including 100% carbon, on a dry/ash-free (DAF) basis.

Generally speaking, feedstocks such as biomass contain non-volatile species, including silica and various metals, which are not readily released during pyrolysis. It is of course possible to utilize ash-free feedstocks, in which case there should not be substantial quantities of ash in the pyrolyzed solids. Ash may be measured using ASTM D3174, for example.

Various amounts of non-combustible matter, such as ash, may be present. The biogenic activated carbon may comprise about 10 wt % or less, such as about 5 wt %, about 2 wt %, about 1 wt % or less than or equal to about 1 wt % of non-combustible matter on a dry basis. In certain embodiments, the reagent contains little ash, or even essentially no ash or other non-combustible matter. Therefore, some embodiments provide essentially pure carbon, including 100% carbon, on a dry basis.

Various amounts of moisture may be present. On a total mass basis, the biogenic activated carbon may comprise at least 1 wt %, at least 2 wt %, at least 5 wt %, at least 10 wt %, at least 15 wt %, at least 25 wt %, at least 35 wt %, at least 50 wt %, or more than 50 wt % of moisture. As intended herein, "moisture" is to be construed as including any form of water present in the biogenic activated carbon product, including absorbed moisture, adsorbed water molecules, chemical hydrates, and physical hydrates. The equilibrium moisture content may vary at least with the local environment, such as the relative humidity. Also, moisture may vary during transportation, preparation for use, and other logistics. Moisture may be measured by any suitable method known in the art, including ASTM D3173, for example.

The biogenic activated carbon may have various "energy content" which for present purposes means the energy density based on the higher heating value associated with total combustion of the bone-dry reagent. For example, the biogenic activated carbon may possess an energy content of about at least 11,000 Btu/lb, at least 12,000 Btu/lb, at least 13,000 Btu/lb, at least 14,000 Btu/lb, or at least 15,000 Btu/lb. In certain embodiments, the energy content is between about 14,000-15,000 Btu/lb. The energy content may be measured by any suitable method known in the art, including ASTM D5865, for example.

The biogenic activated carbon may be formed into a powder, such as a coarse powder or a fine powder. For example, the reagent may be formed into a powder with an average mesh size of about 200 mesh, about 100 mesh, about 50 mesh, about 10 mesh, about 6 mesh, about 4 mesh, or about 2 mesh, in embodiments. In some embodiments, the biogenic activated carbon has an average particle size of up to about 500 μm, for example less than or equal to about 10 μm, about 10 μm, about 25 μm, about 50 μm, about 75 μm, about 100 μm, about 200 μm, about 300 μm, about 400 μm, or about 500 μm.

The biogenic activated carbon may be produced as powder activated carbon, which generally includes particles with a size predominantly less than or equal to about 0.21 mm (70 mesh). The biogenic activated carbon may be produced as granular activated carbon, which generally includes irregularly shaped particles with sizes ranging from 0.2 mm to 5 mm. The biogenic activated carbon may be produced as pelletized activated carbon, which generally includes extruded and cylindrically shaped objects with diameters from 0.8 mm to 5 mm.

In some embodiments, the biogenic activated carbon is formed into structural objects comprising pressed, binded, or agglomerated particles. The starting material to form these objects may be a powder form of the reagent, such as an intermediate obtained by particle-size reduction. The objects may be formed by mechanical pressing or other forces, optionally with a binder or other means of agglomerating particles together.

Following formation from pyrolysis, the biogenic activated carbon may be pulverized to form a powder. "Pulverization" in this context is meant to include any sizing, milling, pulverizing, grinding, crushing, extruding, or other primarily mechanical treatment to reduce the average particle size. The mechanical treatment may be assisted by chemical or electrical forces, if desired. Pulverization may be a batch, continuous, or semi-continuous process and may be carried out at a different location than that of formation of the pyrolyzed solids, in some embodiments.

In some embodiments, the biogenic activated carbon is produced in the form of structural objects whose structure substantially derives from the feedstock. For example, feedstock chips may produce product chips of biogenic activated carbon. Or, feedstock cylinders may produce biogenic activated carbon cylinders, which may be somewhat smaller but otherwise maintain the basic structure and geometry of the starting material.

A biogenic activated carbon according to the present disclosure may be produced as, or formed into, an object that has a minimum dimension of at least about 1 cm, 2 cm, 3 cm, 4 cm, 5 cm, 6 cm, 7 cm, 8 cm, 9 cm, 10 cm, or higher. In various embodiments, the minimum dimension or maximum dimension can be a length, width, or diameter.

Other variations of the disclosure relate to the incorporation of additives into the process, into the product, or both. In some embodiments, the biogenic activated carbon includes at least one process additive incorporated during the process. In these or other embodiments, the activated carbon includes at least one product additive introduced to the activated carbon following the process.

Other variations of the disclosure relate to the incorporation of additives into the process, into the product, or both. In some embodiments, the biogenic activated carbon includes at least one process additive incorporated during the process. In these or other embodiments, the reagent includes at least one product additive introduced to the reagent following the process.

In some embodiments, a biogenic activated carbon comprises, on a dry basis:

55 wt % or more total carbon;
5 wt % or less hydrogen;
1 wt % or less nitrogen;
optionally from 0.5 wt % to 10 wt % oxygen;
0.5 wt % or less phosphorus;
0.2 wt % or less sulfur; and
an additive selected from a metal, a metal oxide, a metal hydroxide, a metal halide, or a combination thereof.

The additive may be selected from, but is by no means limited to, iron chloride, iron bromide, magnesium, manganese, aluminum, nickel, chromium, silicon, magnesium oxide, dolomite, dolomitic lime, fluorite, fluorospar, bentonite, calcium oxide, lime, or combinations thereof.

In some embodiments, a biogenic activated carbon comprises, on a dry basis:

55 wt % or more total carbon;
5 wt % or less hydrogen;
1 wt % or less nitrogen;

optionally from 0.5 wt % to 10 wt % oxygen;
0.5 wt % or less phosphorus;
0.2 wt % or less sulfur; and
an additive selected from an acid, a base, or a salt thereof.

The additive may be selected from, but is by no means limited to, sodium hydroxide, potassium hydroxide, magnesium oxide, hydrogen bromide, hydrogen chloride, sodium silicate, potassium permanganate, organic acids (e.g., citric acid), or combinations thereof.

In certain embodiments, a biogenic activated carbon comprises, on a dry basis:

55 wt % or more total carbon;
5 wt % or less hydrogen;
1 wt % or less nitrogen;
optionally from 0.5 wt % to 10 wt % oxygen;
0.5 wt % or less phosphorus;
0.2 wt % or less sulfur;
a first additive selected from a metal, metal oxide, metal hydroxide, a metal halide, or a combination thereof; and
a second additive selected from an acid, a base, or a salt thereof,
wherein the first additive is different from the second additive.

The first additive may be selected from iron chloride, iron bromide, magnesium, manganese, aluminum, nickel, chromium, silicon, magnesium oxide, dolomite, dolomitic lime, fluorite, fluorospar, bentonite, calcium oxide, lime, or combinations thereof, while the second additive may be independently selected from sodium hydroxide, potassium hydroxide, magnesium oxide, hydrogen bromide, hydrogen chloride, sodium silicate, potassium permanganate, organic acids (e.g., citric acid), or combinations thereof.

A certain biogenic activated carbon consists essentially of, on a dry basis, carbon, hydrogen, nitrogen, oxygen, phosphorus, sulfur, non-combustible matter, and an additive selected from the group consisting of iron chloride, iron bromide, magnesium, manganese, aluminum, nickel, chromium, silicon, magnesium oxide, dolomite, dolomitic lime, fluorite, fluorospar, bentonite, calcium oxide, lime, and combinations thereof.

A certain biogenic activated carbon consists essentially of, on a dry basis, carbon, hydrogen, nitrogen, oxygen, phosphorus, sulfur, non-combustible matter, and an additive selected from the group consisting of sodium hydroxide, potassium hydroxide, magnesium oxide, hydrogen bromide, hydrogen chloride, sodium silicate, and combinations thereof.

The amount of additive (or total additives) may vary widely, such as from about 0.01 wt % to about 25 wt %, including about 0.1 wt %, about 1 wt %, about 5 wt %, about 10 wt %, or about 20 wt % on a dry basis. It will be appreciated then when relatively large amounts of additives are incorporated, such as higher than about 1 wt %, there will be a reduction in energy content calculated on the basis of the total activated carbon weight (inclusive of additives). Still, in various embodiments, the biogenic activated carbon with additive(s) may possess an energy content of about at least 11,000 Btu/lb, at least 12,000 Btu/lb, at least 13,000 Btu/lb, at least 14,000 Btu/lb, or at least 15,000 Btu/lb, when based on the entire weight of the biogenic activated carbon (including the additive(s)).

The above discussion regarding product form applies also to embodiments that incorporate additives. In fact, certain embodiments incorporate additives as binders or other modifiers to enhance final properties for a particular application.

In some embodiments, the majority of carbon contained in the biogenic activated carbon is classified as renewable carbon. In some embodiments, substantially all of the carbon is classified as renewable carbon. There may be certain market mechanisms (e.g., Renewable Identification Numbers, tax credits, etc.) wherein value is attributed to the renewable carbon content within the biogenic activated carbon. In some embodiments, the additive itself is derived from biogenic sources or is otherwise classified as derived from a renewable carbon source. For example, some organic acids such as citric acid are derived from renewable carbon sources. Thus, in some embodiments, the carbon content of a biogenic activated carbon consists of, consists essentially of, or consists substantially of renewable carbon. For example, a fully biogenic activated carbon formed by methods as disclosed herein consist of, consist essentially of, or consist substantially of (a) pyrolyzed solids derived solely from biomass from renewable carbon sources and (b) one or more additives derived solely from renewable carbon sources The biogenic activated carbon produced as described herein is useful for a wide variety of carbonaceous products. In variations, a product includes any of the biogenic activated carbons that may be obtained by the disclosed processes, or that are described in the compositions set forth herein, or any portions, combinations, or derivatives thereof.

Generally speaking, the biogenic activated carbons may be combusted to produce energy (including electricity and heat); partially oxidized or steam-reformed to produce syngas; utilized for their adsorptive or absorptive properties; utilized for their reactive properties during metal refining (such as reduction of metal oxides) or other industrial processing; or utilized for their material properties in carbon steel and various other metal alloys. Essentially, the biogenic activated carbons may be utilized for any market application of carbon-based commodities or advanced materials, including specialty uses to be developed.

Biogenic activated carbon prepared according to the processes disclosed herein has the same or better characteristics as traditional fossil fuel-based activated carbon. In some embodiments, biogenic activated carbon has a surface area that is comparable to, equal to, or greater than surface area associated with fossil fuel-based activated carbon. In some embodiments, biogenic activated carbon can control pollutants as well as or better than traditional activated carbon products. In some embodiments, biogenic activated carbon has an inert material (e.g., ash) level that is comparable to, equal to, or less than or equal to about an inert material (e.g., ash) level associated with a traditional activated carbon product. In some embodiments, biogenic activated carbon has a particle size and/or a particle size distribution that is comparable to, equal to, greater than, or less than or equal to about a particle size and/or a particle size distribution associated with a traditional activated carbon product. In some embodiments, a biogenic activated carbon product has a particle shape that is comparable to, substantially similar to, or the same as a particle shape associated with a traditional activated carbon product. In some embodiments, a biogenic activated carbon product has a particle shape that is substantially different than a particle shape associated with a traditional activated carbon product. In some embodiments, a biogenic activated carbon product has a pore volume that is comparable to, equal to, or greater than a pore volume associated with a traditional activated carbon product. In some embodiments, a biogenic activated carbon product has pore dimensions that are comparable to, substantially similar to, or the same as pore dimensions associated with a traditional activated carbon product. In some embodiments, a biogenic activated product has an attrition resistance of particles value that is comparable to, substantially similar to, or the same as an attrition resistance of particles value associated with a traditional activated carbon product. In some embodiments, a biogenic activated carbon product has a hardness value that is comparable to, substantially similar to, or the same as a hardness value associated with a traditional activated carbon product. In some embodiments, a biogenic activated carbon product has a hardness value that is comparable to, substantially less than or equal to about, or less than or equal to about a hardness value associated with a traditional activated carbon product. In some embodiments, a biogenic activated carbon product has a bulk density value that is comparable to, substantially similar to, or the same as a bulk density value associated with a traditional activated carbon product. In some embodiments, a biogenic activated carbon product has a bulk density value that is comparable to, substantially less than or equal to about, or less than or equal to about a bulk density value associated with a traditional activated carbon product. In some embodiments, a biogenic activated carbon product has an absorptive capacity that is comparable to, substantially similar to, or the same as an absorptive capacity associated with a traditional activated carbon product.

Prior to suitability or actual use in any product applications, the disclosed biogenic activated carbons may be analyzed, measured, and optionally modified (such as through additives) in various ways. Some properties of potential interest, other than chemical composition and energy content, include density, particle size, surface area, microporosity, absorptivity, adsorptivity, binding capacity, reactivity, desulfurization activity, basicity, hardness, and Iodine Number.

Some variations of the present disclosure provide various activated carbon products. Activated carbon is used in a wide variety of liquid and gas-phase applications, including water treatment, air purification, solvent vapor recovery, food and beverage processing, sugar and sweetener refining, automotive uses, and pharmaceuticals. For activated carbon, key product attributes may include particle size, shape, and composition; surface area, pore volume and pore dimensions, particle-size distribution, the chemical nature of the carbon surface and interior, attrition resistance of particles, hardness, bulk density, and adsorptive capacity.

The surface area of the biogenic activated carbon may vary widely. Exemplary surface areas range from about 400 $m^2/g$ to about 2000 $m^2/g$ or higher, such as about 500 $m^2/g$, 600 $m^2/g$, 800 $m^2/g$, 1000 $m^2/g$, 1200 $m^2/g$, 1400 $m^2/g$, 1600 $m^2/g$, or 1800 $m^2/g$. Surface area generally correlates to adsorption capacity.

The Iodine Number is a parameter used to characterize activated carbon performance. The Iodine Number measures the degree of activation of the carbon, and is a measure of micropore (e.g., 0-20 Å) content. It is an important measurement for liquid-phase applications. Other pore-related measurements include Methylene Blue, which measures mesopore content (e.g., 20-500 Å); and Molasses Number, which measures macropore content (e.g., >500 Å). The pore-size distribution and pore volume are important to determine ultimate performance. A typical bulk density for the biogenic activated carbon is about 400 to 500 g/liter, such as about 450 g/liter.

Hardness or Abrasion Number is measure of activated carbon's resistance to attrition. It is an indicator of activated carbon's physical integrity to withstand frictional forces and mechanical stresses during handling or use. Some amount of hardness is desirable, but if the hardness is too high, excessive equipment wear can result. Exemplary Abrasion Numbers, measured according to ASTM D3802, range from about 1% to great than about 99%, such as about 1%, about 5%, about 10%, about 15%, about 20%, about 25%, about 30%, about 35%, about 40%, about 45%, about 50%, about 55%, 60%, about 65%, about 70%, about 75%, about 80%, about 85%, about 90%, about 95%, about 96%, about 97%, about 98%, about 99%, or greater than about 99%.

In some embodiments, an optimal range of hardness can be achieved in which the biogenic activated carbon is reasonably resistant to attrition but does not cause abrasion and wear in capital facilities that process the activated carbon. This optimum is made possible in some embodiments of this disclosure due to the selection of feedstock as well as processing conditions.

For example, it is known that coconut shells tend to produce Abrasion Numbers of 99% or higher, so coconut shells would be a less-than-optimal feedstock for achieving optimum hardness. In some embodiments in which the downstream use can handle high hardness, the process of this disclosure may be operated to increase or maximize hardness to produce biogenic activated carbon products having an Abrasion Number of about 75%, about 80%, about 85%, about 90%, about 95%, about 96%, about 97%, about 98%, about 99%, or greater than about 99%.

The biogenic activated carbon provided by the present disclosure has a wide range of commercial uses. For example, without limitation, the biogenic activated carbon may be utilized in emissions control, water purification, groundwater treatment, wastewater treatment, air stripper applications, PCB removal applications, odor removal applications, soil vapor extractions, manufactured gas plants, industrial water filtration, industrial fumigation, tank and process vents, pumps, blowers, filters, pre-filters, mist filters, ductwork, piping modules, adsorbers, absorbers, and columns.

Some variations provide a biogenic activated carbon composition comprising, on a dry basis, about 55 wt % or more total carbon, about 15 wt % or less hydrogen, and less than or equal to about 1 wt % nitrogen; wherein the activated carbon composition is characterized by an Iodine Number higher than about 500, and wherein at least a portion of the carbon is present in the form of graphene.

In some embodiments, the composition is responsive to an externally applied magnetic field, or includes an additive that is responsive to an externally applied magnetic field. Such an additive may be iron or an iron-containing compound. The graphene itself (with no additive) may be responsive to an externally applied magnetic field.

Some variations provide a biogenic activated carbon composition comprising, on a dry basis, about 55 wt % or more total carbon, about 15 wt % or less hydrogen, less than or equal to about 1 wt % nitrogen, and from about 0.0001 wt % to about 1 wt % iron; wherein at least a portion of the carbon is present in the form of graphene, wherein the activated carbon composition is characterized by an Iodine Number higher than about 500, and wherein the composition is responsive to an externally applied magnetic field.

Some variations provide a biogenic activated carbon composition comprising, on a dry basis, about 55 wt % or more total carbon, about 15 wt % or less hydrogen, less than or equal to about 1 wt % nitrogen, and from about 0.1 wt % to about 1 wt % iron; wherein the activated carbon composition is characterized by an Iodine Number higher than about 500, and wherein the composition is responsive to an externally applied magnetic field.

Some variations provide a biogenic activated carbon composition comprising, on a dry basis, about 55 wt % or more total carbon, about 15 wt % or less hydrogen, and less than or equal to about 1 wt % nitrogen; wherein the activated carbon composition is characterized by an Iodine Number higher than about 500, and wherein at least a portion of the carbon is present in the form of graphene.

The present disclosure also provides a biogenic graphene-containing product characterized by an Iodine Number higher than about 500.

Some variations of this disclosure provide a method of using a biogenic activated carbon composition to reduce emissions, the method comprising:

(a) providing activated carbon particles comprising a biogenic activated carbon composition;

(b) providing a gas-phase emissions stream comprising at least one selected contaminant;

(c) providing an additive selected to assist in removal of the selected contaminant from the gas-phase emissions stream;

(d) introducing the activated carbon particles and the additive into the gas-phase emissions stream, to adsorb at least a portion of the selected contaminant onto the activated carbon particles, thereby generating contaminant-adsorbed carbon particles within the gas-phase emissions stream; and (e) separating at least a portion of the contaminant-adsorbed carbon particles from the gas-phase emissions stream, to produce a contaminant-reduced gas-phase emissions stream.

The additive for the biogenic activated carbon composition may be provided as part of the activated carbon particles. Alternatively, or additionally, the additive may be introduced directly into the gas-phase emissions stream, into a fuel bed, or into a combustion zone. Other ways of directly or indirectly introducing the additive into the gas-phase emissions stream for removal of the selected contaminant are possible, as will be appreciated by one of skill in the art.

A selected contaminant (in the gas-phase emissions stream) may be a metal, such as a metal is selected from the group consisting of mercury, boron, selenium, arsenic, and any compound, salt, and mixture thereof. A selected contaminant may be a hazardous air pollutant, an organic compound (such as a VOC), or a non-condensable gas, for example. In some embodiments, a biogenic activated carbon product adsorbs, absorbs and/or chemisorbs a selected contaminant in greater amounts than a comparable amount of a non-biogenic activated carbon product. In some such embodiments, the selected contaminant is a metal, a hazardous air pollutant, an organic compound (such as a VOC), a non-condensable gas, or any combination thereof. In some embodiments, the selected contaminant comprises mercury. In some embodiments, the selected contaminant comprises one or more VOCs. In some embodiments, the biogenic activated carbon comprises at least about 1 wt % hydrogen and/or at least about 10 wt % oxygen.

Hazardous air pollutants are those pollutants that cause or may cause cancer or other serious health effects, such as reproductive effects or birth defects, or adverse environmental and ecological effects. Section 112 of the Clean Air Act, as amended, is incorporated by reference herein in its entirety. Pursuant to the Section 112 of the Clean Air Act, the United States Environmental Protection Agency (EPA) is mandated to control 189 hazardous air pollutants. Any current or future compounds classified as hazardous air pollutants by the EPA are included in possible selected contaminants in the present context.

Volatile organic compounds, some of which are also hazardous air pollutants, are organic chemicals that have a high vapor pressure at ordinary, room-temperature conditions. Examples include short-chain alkanes, olefins, alcohols, ketones, and aldehydes. Many volatile organic compounds are dangerous to human health or cause harm to the environment. EPA regulates volatile organic compounds in air, water, and land. EPA's definition of volatile organic compounds is described in 40 CFR Section 51.100, which is incorporated by reference herein in its entirety.

Non-condensable gases are gases that do not condense under ordinary, room-temperature conditions. Non-condensable gas may include, but are not limited to, nitrogen oxides, carbon monoxide, carbon dioxide, hydrogen sulfide, sulfur dioxide, sulfur trioxide, methane, ethane, ethylene, ozone, ammonia, or combinations thereof.

Multiple contaminants may be removed by the activated carbon particles. In some embodiments, the contaminant-adsorbed carbon particles include at least two contaminants, at least three contaminants, or more. The biogenic activated carbon as disclosed herein can allow multi-pollutant control as well as control of certain targeted pollutants (e.g. selenium).

In certain embodiments, the contaminant-adsorbed carbon particles include at least one, at least two, at least three, or all of, carbon dioxide, nitrogen oxides, mercury, and sulfur dioxide (in any combination).

The separation in step (e) may include filtration (e.g., fabric filters) or electrostatic precipitation (ESP), for example. Fabric filters, also known as baghouses, may utilize engineered fabric filter tubes, envelopes, or cartridges, for example. There are several types of baghouses, including pulse-jet, shaker-style, and reverse-air systems. The separation in step (e) may also include scrubbing.

An electrostatic precipitator, or electrostatic air cleaner, is a particulate collection device that removes particles from a flowing gas using the force of an induced electrostatic charge. Electrostatic precipitators are highly efficient filtration devices that minimally impede the flow of gases through the device, and can easily remove fine particulate matter from the air stream. An electrostatic precipitator applies energy only to the particulate matter being collected and therefore is very efficient in its consumption of energy (electricity).

The electrostatic precipitator may be dry or wet. A wet electrostatic precipitator operates with saturated gas streams to remove liquid droplets such as sulfuric acid mist from industrial process gas streams. Wet electrostatic precipitators may be useful when the gases are high in moisture content, contain combustible particulate, or have particles that are sticky in nature.

In some embodiments, the contaminant-adsorbed carbon particles are treated to regenerate the activated carbon particles. In some embodiments, the method includes thermally oxidizing the contaminant-adsorbed carbon particles. The contaminant-adsorbed carbon particles, or a regenerated form thereof, may be combusted to provide energy.

In some embodiments, the additive is selected from an acid, a base, a salt, a metal, a metal oxide, a metal hydroxide, a metal halide, or a combination thereof. In certain embodiments, the additive is selected from the group consisting of magnesium, manganese, aluminum, nickel, iron, chromium, silicon, boron, cerium, molybdenum, phosphorus, tungsten, vanadium, iron chloride, iron bromide, magnesium oxide, dolomite, dolomitic lime, fluorite, fluorospar, bentonite, calcium oxide, lime, sodium hydroxide, potassium hydroxide, hydrogen bromide, hydrogen chloride, sodium silicate, potassium permanganate, organic acids (e.g., citric acid), and combinations thereof.

In some embodiments, the gas-phase emissions stream is derived from combustion of a fuel comprising the biogenic activated carbon composition.

In some embodiments relating specifically to mercury removal, a method of using a biogenic activated carbon composition to reduce mercury emissions comprises:

(a) providing activated carbon particles comprising a biogenic activated carbon composition that includes iron or an iron-containing compound;

(b) providing a gas-phase emissions stream comprising mercury;

(c) introducing the activated carbon particles into the gas-phase emissions stream, to adsorb at least a portion of the mercury onto the activated carbon particles, thereby generating mercury-adsorbed carbon particles within the gas-phase emissions stream; and (d) separating at least a portion of the mercury-adsorbed carbon particles from the gas-phase emissions stream using electrostatic precipitation or filtration, to produce a mercury-reduced gas-phase emissions stream.

In some embodiments, a method of using a biogenic activated carbon composition to reduce emissions (e.g., mercury) further comprises using the biogenic activated carbon as a fuel source. In such embodiments, the high heat value of the biogenic activated carbon product can be utilized in addition to its ability to reduce emissions by adsorbing, absorbing and/or chemisorbing potential pollutants. Thus, in an example embodiment, the biogenic activated carbon product, when used as a fuel source and as a mercury control product, prevents at least 70% of mercury from emanating from a power plant, for example about 70%, about 75%, about 80%, about 85%, about 90%, about 95%, about 96%, about 97%, about 98%, 98.5%, about 99%, about 99.1%, about 99.2%, about 99.3%, about 99.4%, about 99.5%, about 99.6%, about 99.7%, about 99.8%, about 99.9%, or greater than about 99.9% of mercury.

As an exemplary embodiment, biogenic activated carbon may be injected (such as into the ductwork) upstream of a particulate matter control device, such as an electrostatic precipitator or fabric filter. In some cases, a flue gas desulfurization (dry or wet) system may be downstream of the activated carbon injection point. The activated carbon may be pneumatically injected as a powder. The injection location will typically be determined by the existing plant configuration (unless it is a new site) and whether additional downstream particulate matter control equipment is modified.

For boilers currently equipped with particulate matter control devices, implementing biogenic activated carbon injection for mercury control could entail: (i) injection of powdered activated carbon upstream of the existing particulate matter control device (electrostatic precipitator or fabric filter); (ii) injection of powdered activated carbon downstream of an existing electrostatic precipitator and upstream of a retrofit fabric filter; or (iii) injection of powdered activated carbon between electrostatic precipitator electric fields.

In some embodiments, powdered biogenic activated carbon injection approaches may be employed in combination with existing $SO_2$ control devices. Activated carbon could be injected prior to the $SO_2$ control device or after the $SO_2$ control device, subject to the availability of a means to collect the activated carbon sorbent downstream of the injection point.

When electrostatic precipitation is employed, the presence of iron or an iron-containing compound in the activated carbon particles can improve the effectiveness of electrostatic precipitation, thereby improving mercury control.

The method optionally further includes separating the mercury-adsorbed carbon particles, containing the iron or an iron-containing compound, from carbon or ash particles that do not contain the iron or an iron-containing compound. The carbon or ash particles that do not contain the iron or an iron-containing compound may be recovered for recycling, selling as a co-product, or other use. Any separations involving iron or materials containing iron may employ magnetic separation, taking advantage of the magnetic properties of iron.

A biogenic activated carbon composition that includes iron or an iron-containing compound is a "magnetic activated carbon" product. That is, the material is susceptible to a magnetic field. The iron or iron-containing compound may be separated using magnetic separation devices. Additionally, the biogenic activated carbon, which contains iron, may be separated using magnetic separation. When magnetic separation is to be employed, magnetic metal separators may be magnet cartridges, plate magnets, or another known configuration.

Inclusion of iron or iron-containing compounds may drastically improve the performance of electrostatic precipitators for mercury control. Furthermore, inclusion of iron or iron-containing compounds may drastically change end-of-life options, since the spent activated carbon solids may be separated from other ash.

In some embodiments, a magnetic activated carbon product can be separated out of the ash stream. Under the ASTM standards for use of fly ash in cement, the fly ash must come from coal products. If wood-based activated carbon can be separated from other fly ash, the remainder of the ash may be used per the ASTM standards for cement production. Similarly, the ability to separate mercury-laden ash may allow it to be better handled and disposed of, potentially reducing costs of handling all ash from a certain facility.

In some embodiments, the same physical material may be used in multiple processes, either in an integrated way or in sequence. Thus, for example, an activated carbon may, at the end of its useful life as a performance material, then be introduced to a combustion process for energy value or to a metal process, etc.

For example, an activated carbon injected into an emissions stream may be suitable to remove contaminants, followed by combustion of the activated carbon particles and possibly the contaminants, to produce energy and thermally destroy or chemically oxidize the contaminants.

In some variations, a process for energy production comprises:
(a) providing a carbon-containing feedstock comprising a biogenic activated carbon composition (which may include one or more additives); and
(b) oxidizing the carbon-containing feedstock to generate energy and a gas-phase emissions stream,
wherein the presence of the biogenic activated carbon composition within the carbon-containing feedstock is effective to adsorb at least one contaminant produced as a byproduct of the oxidizing or derived from the carbon-containing feedstock, thereby reducing emissions of the contaminant.

In some embodiments, the contaminant, or a precursor thereof, is contained within the carbon-containing feedstock. In other embodiments, the contaminant is produced as a byproduct of the oxidizing.

The carbon-containing feedstock may further include biomass, coal, or any other carbonaceous material, in addition to the biogenic activated carbon composition. In certain embodiments, the carbon-containing feedstock consists essentially of the biogenic activated carbon composition as the sole fuel source.

The selected contaminant may be a metal selected from the group consisting of mercury, boron, selenium, arsenic, and any compound, salt, and mixture thereof; a hazardous air pollutant; an organic compound (such as a VOC); a non-condensable gas selected from the group consisting of nitrogen oxides, carbon monoxide, carbon dioxide, hydrogen sulfide, sulfur dioxide, sulfur trioxide, methane, ethane, ethylene, ozone, and ammonia; or any combinations thereof. In some embodiments, a biogenic activated carbon product adsorbs, absorbs and/or chemisorbs a selected contaminant in greater amounts than a comparable amount of a non-biogenic activated carbon product. In some such embodiments, the selected contaminant is a metal, a hazardous air pollutant, an organic compound (such as a VOC), a non-condensable gas, or any combination thereof. In some embodiments, the selected contaminant comprises mercury. In some embodiments, the selected contaminant comprises one or more VOCs. In some embodiments, the biogenic activated carbon comprises at least about 1 wt % hydrogen and/or at least about 10 wt % oxygen.

The biogenic activated carbon and the principles of the disclosure may be applied to liquid-phase applications, including processing of water, aqueous streams of varying purities, solvents, liquid fuels, polymers, molten salts, and molten metals, for example. As intended herein, "liquid phase" includes slurries, suspensions, emulsions, multiphase systems, or any other material that has (or may be adjusted to have) at least some amount of a liquid state present.

A method of using a biogenic activated carbon composition to purify a liquid, in some variations, includes the following steps:
(a) providing activated carbon particles comprising a biogenic activated carbon composition;
(b) providing a liquid comprising at least one selected contaminant;
(c) providing an additive selected to assist in removal of the selected contaminant from the liquid; and
(d) contacting the liquid with the activated carbon particles and the additive, to adsorb at least a portion of the at least one selected contaminant onto the activated carbon particles, thereby generating contaminant-adsorbed carbon particles and a contaminant-reduced liquid.

The additive may be provided as part of the activated carbon particles. Or, the additive may be introduced directly into the liquid. In some embodiments, additives—which may be the same, or different—are introduced both as part of the activated carbon particles as well as directly into the liquid.

In some embodiments relating to liquid-phase applications, an additive is selected from an acid, a base, a salt, a metal, a metal oxide, a metal hydroxide, a metal halide, or a combination thereof. For example an additive may be selected from the group consisting of magnesium, manganese, aluminum, nickel, iron, chromium, silicon, boron, cerium, molybdenum, phosphorus, tungsten, vanadium, iron chloride, iron bromide, magnesium oxide, dolomite, dolomitic lime, fluorite, fluorospar, bentonite, calcium oxide, lime, sodium hydroxide, potassium hydroxide, hydrogen bromide, hydrogen chloride, sodium silicate, potassium permanganate, organic acids (e.g., citric acid), and combinations thereof.

In some embodiments, the selected contaminant (in the liquid to be treated) is a metal, such as a metal selected from the group consisting of arsenic, boron, selenium, mercury, and any compound, salt, and mixture thereof. In some embodiments, the selected contaminant is an organic compound (such as a VOC), a halogen, a biological compound, a pesticide, or a herbicide. The contaminant-adsorbed carbon particles may include two, three, or more contaminants. In some embodiments, a biogenic activated carbon product adsorbs, absorbs and/or chemisorbs a selected contaminant in greater amounts than a comparable amount of a non-biogenic activated carbon product. In some such embodiments, the selected contaminant is a metal, a hazardous air pollutant, an organic compound (such as a VOC), a non-condensable gas, or any combination thereof. In some embodiments, the selected contaminant comprises mercury. In some embodiments, the selected contaminant comprises one or more VOCs. In some embodiments, the biogenic activated carbon comprises at least about 1 wt % hydrogen and/or at least about 10 wt % oxygen.

The liquid to be treated will typically be aqueous, although that is not necessary for the principles of this disclosure. In some embodiments, step (c) includes contacting the liquid with the activated carbon particles in a fixed bed. In other embodiments, step (c) includes contacting the liquid with the activated carbon particles in solution or in a moving bed.

Some variations provide a method of using a biogenic activated carbon composition to remove at least a portion of a sulfur-containing contaminant from a liquid, the method comprising:

(a) providing activated-carbon particles comprising a biogenic activated carbon composition;

(b) providing a liquid containing a sulfur-containing contaminant;

(c) providing an additive selected to assist in removal of the sulfur-containing contaminant from the liquid; and (d) contacting the liquid with the activated-carbon particles and the additive, to adsorb or absorb at least a portion of the sulfur-containing contaminant onto or into the activated-carbon particles.

In some embodiments, the sulfur-containing contaminant is selected from the group consisting of elemental sulfur, sulfuric acid, sulfurous acid, sulfur dioxide, sulfur trioxide, sulfate anions, bisulfate anions, sulfite anions, bisulfite anions, thiols, sulfides, disulfides, polysulfides, thioethers, thioesters, thioacetals, sulfoxides, sulfones, thiosulfinates, sulfimides, sulfoximides, sulfonediimines, sulfur halides, thioketones, thioaldehydes, sulfur oxides, thiocarboxylic acids, thioamides, sulfonic acids, sulfinic acids, sulfenic acids, sulfonium, oxosulfonium, sulfuranes, persulfuranes, and combinations, salts, or derivatives thereof. For example, the sulfur-containing contaminant may be a sulfate, in anionic and/or salt form.

In some embodiments, the biogenic activated carbon composition comprises 55 wt % or more total carbon; 15 wt % or less hydrogen; and 1 wt % or less nitrogen; and an additive if provided as part of the activated-carbon particles. The additive may be selected from an acid, a base, a salt, a metal, a metal oxide, a metal hydroxide, a metal halide, iodine, an iodine compound, or a combination thereof. The additive may alternatively (or additionally) be introduced directly into the liquid.

In some embodiments, step (d) includes filtration of the liquid. In these or other embodiments, step (d) includes osmosis of the liquid. The activated-carbon particles and the additive may be directly introduced to the liquid prior to osmosis. The activated-carbon particles and the additive may be employed in pre-filtration prior to osmosis. In certain embodiments, the activated-carbon particles and the additive are incorporated into a membrane for osmosis. For example, known membrane materials such as cellulose acetate may be modified by introducing the activated-carbon particles and/or additives within the membrane itself or as a layer on one or both sides of the membrane. Various thin-film carbon-containing composites could be fabricated with the activated-carbon particles and additives.

In some embodiments, step (d) includes direct addition of the activated-carbon particles to the liquid, followed by for example sedimentation of the activated-carbon particles with the sulfur-containing contaminant from the liquid.

The liquid may be an aqueous liquid, such as water. In some embodiments, the water is wastewater associated with a process selected from the group consisting of metal mining, acid mine drainage, mineral processing, municipal sewer treatment, pulp and paper, ethanol, and any other industrial process that is capable of discharging sulfur-containing contaminants in wastewater. The water may also be (or be part of) a natural body of water, such as a lake, river, or stream.

Some variations provide a process to reduce the concentration of sulfates in water, the process comprising:

(a) providing activated-carbon particles comprising a biogenic activated carbon composition;

(b) providing a volume or stream of water containing sulfates;

(c) providing an additive selected to assist in removal of the sulfates from the water; and (d) contacting the water with the activated-carbon particles and the additive, to adsorb or absorb at least a portion of the sulfates onto or into the activated-carbon particles.

In some embodiments, the sulfates are reduced to a concentration of about 50 mg/L or less in the water, such as a concentration of about 10 mg/L or less in the water. In some embodiments, the sulfates are reduced, as a result of absorption and/or adsorption into the biogenic activated carbon composition, to a concentration of about 100 mg/L, 75 mg/L, 50 mg/L, 25 mg/L, 20 mg/L, 15 mg/L, 12 mg/L, 10 mg/L, 8 mg/L, or less in the wastewater stream. In some embodiments, the sulfate is present primarily in the form of sulfate anions and/or bisulfate anions. Depending on pH, the sulfate may also be present in the form of sulfate salts.

The water may be derived from, part of, or the entirety of a wastewater stream. Exemplary wastewater streams are those that may be associated with a metal mining, acid mine drainage, mineral processing, municipal sewer treatment, pulp and paper, ethanol, or any other industrial process that could discharge sulfur-containing contaminants to wastewater. The water may be a natural body of water, such as a lake, river, or stream. In some embodiments, the process is conducted continuously. In other embodiments, the process is conducted in batch.

The biogenic activated carbon composition comprises 55 wt % or more total carbon; 15 wt % or less hydrogen; and 1 wt % or less nitrogen, in some embodiments. The additive may be selected from an acid, a base, a salt, a metal, a metal oxide, a metal hydroxide, a metal halide, iodine, an iodine compound, or a combination thereof. The additive is provided as part of the activated-carbon particles and/or is introduced directly into the water.

Step (d) may include, but is not limited to, filtration of the water, osmosis of the water, and/or direct addition (with sedimentation, clarification, etc.) of the activated-carbon particles to the water.

When osmosis is employed, the activated carbon can be used in several ways within, or to assist, an osmosis device. In some embodiments, the activated-carbon particles and the additive are directly introduced to the water prior to osmosis. The activated-carbon particles and the additive are optionally employed in pre-filtration prior to the osmosis. In certain embodiments, the activated-carbon particles and the additive are incorporated into a membrane for osmosis.

This disclosure also provides a method of using a biogenic activated carbon composition to remove a sulfur-containing contaminant from a gas phase, the method comprising:

(a) providing activated-carbon particles comprising a biogenic activated carbon composition;

(b) providing a gas-phase emissions stream comprising at least one sulfur-containing contaminant;

(c) providing an additive selected to assist in removal of the sulfur-containing contaminant from the gas-phase emissions stream;

(d) introducing the activated-carbon particles and the additive into the gas-phase emissions stream, to adsorb or absorb at least a portion of the sulfur-containing contaminant onto the activated-carbon particles; and (e) separating at least a portion of the activated-carbon particles from the gas-phase emissions stream.

In some embodiments, the sulfur-containing contaminant is selected from the group consisting of elemental sulfur, sulfuric acid, sulfurous acid, sulfur dioxide, sulfur trioxide, sulfate anions, bisulfate anions, sulfite anions, bisulfite anions, thiols, sulfides, disulfides, polysulfides, thioethers, thioesters, thioacetals, sulfoxides, sulfones, thiosulfinates, sulfimides, sulfoximides, sulfonediimines, sulfur halides, thioketones, thioaldehydes, sulfur oxides, thiocarboxylic acids, thioamides, sulfonic acids, sulfinic acids, sulfenic acids, sulfonium, oxosulfonium, sulfuranes, persulfuranes, and combinations, salts, or derivatives thereof.

The biogenic activated carbon composition may include 55 wt % or more total carbon; 15 wt % or less hydrogen; 1 wt % or less nitrogen; and an additive selected from an acid, a base, a salt, a metal, a metal oxide, a metal hydroxide, a metal halide, iodine, an iodine compound, or a combination thereof. The additive may be provided as part of the activated-carbon particles, or may be introduced directly into the gas-phase emissions stream.

In some embodiments, the gas-phase emissions stream is derived from combustion of a fuel comprising the biogenic activated carbon composition. For example, the gas-phase emissions stream may be derived from co-combustion of coal and the biogenic activated carbon composition.

In some embodiments, separating in step (e) comprises filtration. In these or other embodiments, separating in step (e) comprises electrostatic precipitation. In any of these embodiments, separating in step (e) may include scrubbing, which may be wet scrubbing, dry scrubbing, or another type of scrubbing.

The biogenic activated carbon composition may comprise 55 wt % or more total carbon; 15 wt % or less hydrogen; 1 wt % or less nitrogen; 0.5 wt % or less phosphorus; and 0.2 wt % or less sulfur. In various embodiments, the additive is selected from an acid, a base, a salt, a metal, a metal oxide, a metal hydroxide, a metal halide, iodine, an iodine compound, or a combination thereof. The additive is provided as part of the activated-carbon particles, in some embodiments;

alternatively or additionally, the additive may be introduced directly into the gas-phase emissions stream.

In certain embodiments, the gas-phase emissions stream is derived from combustion of a fuel comprising the biogenic activated carbon composition. For example, the gas-phase emissions stream may be derived from co-combustion of coal and the biogenic activated carbon composition.

The biogenic activated carbon composition comprises 55 wt % or more total carbon; 15 wt % or less hydrogen; 1 wt % or less nitrogen; 0.5 wt % or less phosphorus; and 0.2 wt % or less sulfur, in some embodiments. The additive may be selected from an acid, a base, a salt, a metal, a metal oxide, a metal hydroxide, a metal halide, iodine, an iodine compound, or a combination thereof. The additive may be provided as part of the activated-carbon particles. The additive may optionally be introduced directly into the wastewater stream.

The contaminant-adsorbed carbon particles may be further treated to regenerate the activated carbon particles. After regeneration, the activated carbon particles may be reused for contaminant removal, or may be used for another purpose, such as combustion to produce energy. In some embodiments, the contaminant-adsorbed carbon particles are directly oxidized (without regeneration) to produce energy. In some embodiments, with the oxidation occurs in the presence of an emissions control device (e.g., a second amount of fresh or regenerated activated carbon particles) to capture contaminants released from the oxidation of the contaminant-absorbed carbon particles.

In some embodiments, biogenic activated carbon according to the present disclosure can be used in any other application in which traditional activated carbon might be used. In some embodiments, the biogenic activated carbon is used as a total (i.e., 100%) replacement for traditional activated carbon. In some embodiments, biogenic activated carbon comprises essentially all or substantially all of the activated carbon used for a particular application. In some embodiments, an activated carbon composition comprises about 1% to about 100% of biogenic activated carbon, for example, about 1%, about 2%, about 5%, about 10%, about 15%, about 20%, about 25%, about 30%, about 35%, about 40%, about 45%, about 50%, about 55%, about 60%, about 65%, about 70%, about 75%, about 80%, about 85%, about 90%, about 95%, about 96%, about 97%, about 98%, about 99%, or about 100% biogenic activated carbon.

For example and without limitation, biogenic activated carbon can be used—alone or in combination with a traditional activated carbon product—in filters. In some embodiments, a filter comprises an activated carbon component consisting of, consisting essentially of, or consisting substantially of a biogenic activated carbon. In some embodiments, a filter comprises an activated carbon component comprising about 1% to about 100% of biogenic activated carbon, for example, about 1%, about 2%, about 5%, about 10%, about 15%, about 20%, about 25%, about 30%, about 35%, about 40%, about 45%, about 50%, about 55%, about 60%, about 65%, about 70%, about 75%, about 80%, about 85%, about 90%, about 95%, about 96%, about 97%, about 98%, about 99%, or about 100% biogenic activated carbon.

In some embodiments, a packed bed or packed column comprises an activated carbon component consisting of, consisting essentially of, or consisting substantially of a biogenic activated carbon. In some embodiments, a packed bed or packed column comprises an activated carbon component comprising about 1% to about 100% of biogenic activated carbon, for example, about 1%, about 2%, about 5%, about 10%, about 15%, about 20%, about 25%, about 30%, about 35%, about 40%, about 45%, about 50%, about 55%, about 60%, about 65%, about 70%, about 75%, about 80%, about 85%, about 90%, about 95%, about 96%, about 97%, about 98%, about 99%, or about 100% biogenic activated carbon. In such embodiments, the biogenic activated carbon has a size characteristic suitable for the particular packed bed or packed column.

The above description should not be construed as limiting in any way as to the potential applications of the biogenic activated carbon. Injection of biogenic activated carbon into gas streams may be useful for control of contaminant emissions in gas streams or liquid streams derived from coal-fired power plants, biomass-fired power plants, metal processing plants, crude-oil refineries, chemical plants, polymer plants, pulp and paper plants, cement plants, waste incinerators, food processing plants, gasification plants, and syngas plants.

Essentially any industrial process or site that employs fossil fuel or biomass for generation of energy or heat, can benefit from gas treatment by the biogenic activated carbon provided herein. For liquid-phase applications, a wide variety of industrial processes that use or produce liquid streams can benefit from treatment by the biogenic activated carbon provided herein.

Additionally, when the biogenic activated carbon is co-utilized as a fuel source, either in parallel with its use for contaminant removal or in series following contaminant removal (and optionally following some regeneration), the biogenic activated carbon (i) has lower emissions per Btu energy output than fossil fuels; (ii) has lower emissions per Btu energy output than biomass fuels; and (iii) can reduce emissions from biomass or fossil fuels when co-fired with such fuels. It is noted that the biogenic activated carbon may also be mixed with coal or other fossil fuels and, through co-combustion, the activated carbon enables reduced emissions of mercury, $SO_2$, or other contaminants.

In some variations, a method of using a biogenic activated carbon composition comprises:

(a) obtaining a biogenic activated carbon composition comprising, on a dry basis, about 55 wt % or more total carbon, about 15 wt % or less hydrogen, and less than or equal to about 1 wt % nitrogen; wherein the activated carbon composition is characterized by an Iodine Number higher than about 500, and wherein the composition is responsive to an externally applied magnetic field;

(b) providing a gas or liquid stream containing one or more contaminants; and (c) contacting the gas or liquid stream with the biogenic activated carbon composition to absorb, adsorb, or react at least a portion of the one or more contaminants from the gas or liquid stream.

In some variations, a method of using a biogenic activated carbon composition comprises:

(a) obtaining a biogenic activated carbon composition comprising, on a dry basis, about 55 wt % or more total carbon, about 15 wt % or less hydrogen, and less than or equal to about 1 wt % nitrogen; wherein the activated carbon composition is characterized by an Iodine Number higher than about 500, and wherein at least a portion of the carbon is present in the form of graphene;

(b) providing a gas or liquid stream containing one or more contaminants; and (c) contacting the gas or liquid stream with the biogenic activated carbon composition to absorb, adsorb, or react at least a portion of the one or more contaminants from the gas or liquid stream.

Methods of using graphene are also disclosed. In some embodiments, a method of using graphene comprises:

(a) obtaining a biogenic activated carbon composition comprising, on a dry basis, about 55 wt % or more total carbon, about 15 wt % or less hydrogen, and less than or equal to about 1 wt % nitrogen; wherein at least a portion of the carbon is present in the form of graphene;

(b) optionally separating the graphene from the biogenic activated carbon composition;

(c) using the graphene, in separated form or as part of the biogenic activated carbon composition, for filtration of a liquid (e.g., water) containing a contaminant.

In some embodiments, a method of using graphene comprises:

(a) obtaining a biogenic activated carbon composition comprising, on a dry basis, about 55 wt % or more total carbon, about 15 wt % or less hydrogen, and less than or equal to about 1 wt % nitrogen; wherein at least a portion of the carbon is present in the form of graphene;

(b) optionally separating the graphene from the biogenic activated carbon composition;

(c) using the graphene, in separated form or as part of the biogenic activated carbon composition, for filtration of a gas containing a contaminant.

In some embodiments, a method of using graphene comprises:

(a) obtaining a biogenic activated carbon composition comprising, on a dry basis, about 55 wt % or more total carbon, about 15 wt % or less hydrogen, and less than or equal to about 1 wt % nitrogen; wherein at least a portion of the carbon is present in the form of graphene;

(b) optionally separating the graphene from the biogenic activated carbon composition;

(c) using the graphene, in separated form or as part of the biogenic activated carbon composition, in an adhesive, sealant, coating, paint, or ink.

In some embodiments, a method of using graphene comprises:

(a) obtaining a biogenic activated carbon composition comprising, on a dry basis, about 55 wt % or more total carbon, about 15 wt % or less hydrogen, and less than or equal to about 1 wt % nitrogen; wherein at least a portion of the carbon is present in the form of graphene;

(b) optionally separating the graphene from the biogenic activated carbon composition;

(c) using the graphene, in separated form or as part of the biogenic activated carbon composition, as a component in a composite material to adjust mechanical or electrical properties of said composite material.

In some embodiments, a method of using graphene comprises:

(a) obtaining a biogenic activated carbon composition comprising, on a dry basis, about 55 wt % or more total carbon, about 15 wt % or less hydrogen, and less than or equal to about 1 wt % nitrogen; wherein at least a portion of the carbon is present in the form of graphene;

(b) optionally separating the graphene from the biogenic activated carbon composition;

(c) using the graphene, in separated form or as part of the biogenic activated carbon composition, as a catalyst, a catalyst support, a battery electrode material, or a fuel cell electrode material.

In some embodiments, a method of using graphene comprises:

(a) obtaining a biogenic activated carbon composition comprising, on a dry basis, about 55 wt % or more total carbon, about 15 wt % or less hydrogen, and less than or equal to about 1 wt % nitrogen; wherein at least a portion of the carbon is present in the form of graphene;

(b) optionally separating the graphene from the biogenic activated carbon composition;

(c) using the graphene, in separated form or as part of the biogenic activated carbon composition, in a graphene-based circuit or memory system.

In some embodiments, a method of using graphene comprises:

(a) obtaining a biogenic activated carbon composition comprising, on a dry basis, about 55 wt % or more total carbon, about 15 wt % or less hydrogen, and less than or equal to about 1 wt % nitrogen; wherein at least a portion of the carbon is present in the form of graphene;

(b) optionally separating the graphene from the biogenic activated carbon composition;

(c) using the graphene, in separated form or as part of the biogenic activated carbon composition, as an energy-storage material or as a supercapacitor component.

In some embodiments, a method of using graphene comprises:

(a) obtaining a biogenic activated carbon composition comprising, on a dry basis, about 55 wt % or more total carbon, about 15 wt % or less hydrogen, and less than or equal to about 1 wt % nitrogen; wherein at least a portion of the carbon is present in the form of graphene;

(b) optionally separating the graphene from the biogenic activated carbon composition;

(c) using the graphene, in separated form or as part of the biogenic activated carbon composition, as a sink for static electricity dissipation in a liquid or vapor fuel delivery system.

In some embodiments, a method of using graphene comprises:

(a) obtaining a biogenic activated carbon composition comprising, on a dry basis, about 55 wt % or more total carbon, about 15 wt % or less hydrogen, and less than or equal to about 1 wt % nitrogen; wherein at least a portion of the carbon is present in the form of graphene;

(b) optionally separating the graphene from the biogenic activated carbon composition;

(c) using the graphene, in separated form or as part of the biogenic activated carbon composition, in a high-band-width communication system.

In some embodiments, a method of using graphene comprises:

(a) obtaining a biogenic activated carbon composition comprising, on a dry basis, about 55 wt % or more total carbon, about 15 wt % or less hydrogen, and less than or equal to about 1 wt % nitrogen; wherein at least a portion of the carbon is present in the form of graphene;

(b) optionally separating the graphene from the biogenic activated carbon composition;

(c) using the graphene, in separated form or as part of the biogenic activated carbon composition, as a component of an infrared, chemical, or biological sensor.

In some embodiments, a method of using graphene comprises:

(a) obtaining a biogenic activated carbon composition comprising, on a dry basis, about 55 wt % or more total carbon, about 15 wt % or less hydrogen, and less than or equal to about 1 wt % nitrogen; wherein at least a portion of the carbon is present in the form of graphene;

(b) optionally separating the graphene from the biogenic activated carbon composition;

(c) using the graphene, in separated form or as part of the biogenic activated carbon composition, as a component of an electronic display.

In some embodiments, a method of using graphene comprises:

(a) obtaining a biogenic activated carbon composition comprising, on a dry basis, about 55 wt % or more total carbon, about 15 wt % or less hydrogen, and less than or equal to about 1 wt % nitrogen; wherein at least a portion of the carbon is present in the form of graphene;

(b) optionally separating the graphene from the biogenic activated carbon composition;

(c) using the graphene, in separated form or as part of the biogenic activated carbon composition, as a component of a photovoltaic cell.

In some embodiments, a method of using graphene comprises:

(a) obtaining a biogenic activated carbon composition comprising, on a dry basis, about 55 wt % or more total carbon, about 15 wt % or less hydrogen, and less than or equal to about 1 wt % nitrogen; wherein at least a portion of the carbon is present in the form of graphene;

(b) optionally separating the graphene from the biogenic activated carbon composition;

(c) using the graphene, in separated form or as part of the biogenic activated carbon composition, to form a graphene aerogel.

EXAMPLES

Example 1. Production of Biogenic Activated Carbon Product with Additive

This example demonstrates the production of a biogenic activated carbon product having an additive, namely iron(II) bromide.

An aqueous solution of iron(II) bromide hydrate was created by mixing 72.6 grams of iron(II) bromide hydrate into 1 gallon of water (e.g., 1.0% bromine aqueous solution). This solution was added to 5.23 pounds (2.37 kg) of air-dried (12% moisture content) red pine wood chips. Each wood chip was approximately 1"×½"×⅛".

The container of wood chips and solution was sealed with a water tight lid. The contents were mixed periodically over the course of approximately four hours by tipping and rolling the container and contents. The wood chips and solution were kept sealed overnight to allow for saturation of the wood chips with the solution.

Thereafter, the contents were transferred to an open water-proof tub and allowed to air dry for several hours, with periodic mixing until all free liquid had been absorbed by the wood chips or evaporated. The contents were transferred to an air-dryer and allowed to dry overnight.

The pretreated, air-dried wood chips were verified to have 12% moisture content. The mass of the pretreated, air dried wood chips was determined to be 5.25 lbs (2.38 kg). The contents were transferred to a pyrolysis reactor and processed at the following conditions:

370° C. four-zone heat

Hot nitrogen introduction system operating at 300° C.

Gas extraction probe flow rate of 0.4 cubic feet per minute

Low oxygen environment

Product processing time of 30 minutes

The finished product was removed from the reactor at a temperature of less than or equal to about 100° C. Upon reaching room temperature (approximately 23° C.), the finished product had a mass of 2.5 pounds (1.14 kg), indicating a mass yield of 47.6% based upon feedstock mass at 12% moisture content. On a dry basis (correcting out the 12% moisture), the mass yield was 54.1%. As shown in Table 1 below, this represents an increase of 28-39% in mass yield over untreated wood chips processed under the same conditions.

TABLE 1

| Pretreatment of Biomass with 1.0% Aqueous Iron(II) Bromide Increases Mass Yield. | | |
|---|---|---|
| Pretreatment | Mass Yield (12% Moisture) | Mass Yield (Dry Basis) |
| Iron(II) Bromide | 47.6% | 54.1% |
| None | 34.3% | 39.0% |
| None | 35.4% | 40.2% |
| None | 37.2% | 42.2% |

These data indicate a significant improvement in the mass yield for wood chips treated with an iron (II) bromide solution prior to pyrolytic processing.

Example 2. Performance of Iron(II) Bromide Pretreated Biogenic Activated Carbon A sample of the iron(II) bromide pretreated product prepared according to Example 1 was size reduced and utilized in a mercury capture experiment.

A sampling tube was prepared with an aliquot of the iron(II) bromide pretreated biogenic activated carbon. A second tube containing a reference material prepared in accordance with USEPA Method 30B (supplied by Ohio Lumex) was used for comparison. Both tubes sampled a vapor-phase mercury air sample at identical rates (500 cubic centimeters per minute) for 25 minutes. The sampling media from both tubes were immediately analyzed for mercury using an Ohio Lumex RA-915 Plus Zeeman atomic absorption spectrometry instrument. Both sets of tubes had collected the same mass on the front sections (calculated as 136 $ng/m^3$), and below detectable levels for the second (backup) sections. As defined in Method 30B, this indicates 100% capture of vapor phase mercury by each of the respective reagents.

Example 3. Properties of Pretreated Biogenic Activated Carbon Products

Size-reduced pretreated biogenic activated carbons prepared according to the method of Example 1 were subjected to a magnet. Table 2 below summarizes the magnetic properties.

TABLE 2

| Magnetic Properties of Pretreated Biogenic Activated Carbon Products. | | |
|---|---|---|
| Sample | Pretreatment | Magnetic |
| A-1 | 1% iron(II) bromide (aq) | Yes |
| A-2 | 0.5% iron(II) chloride (aq) | Yes |
| A-3 | 0.25% iron(II) chloride (aq) | Yes |
| A-4 | 0.1% iron(II) chloride (aq) | Yes |
| B | 1% sodium halide (aq) | No |
| C | 1% potassium halide (aq) | No |
| D | 1% calcium halide (aq) | No |
| E | 1% manganese halide (aq) | No |

Figure 14:
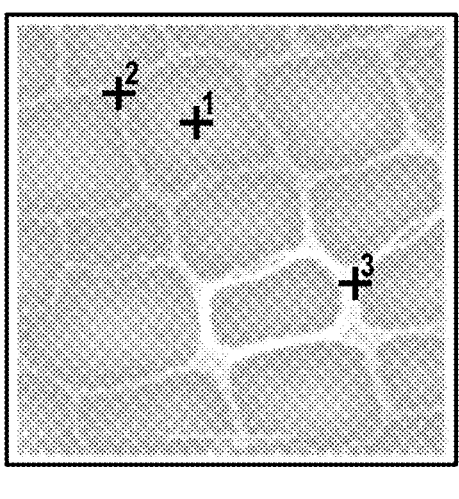
FIG. 14 shows dispersion of magnetic particles in a biogenic activated carbon according to the present disclosure.
Figure 14:
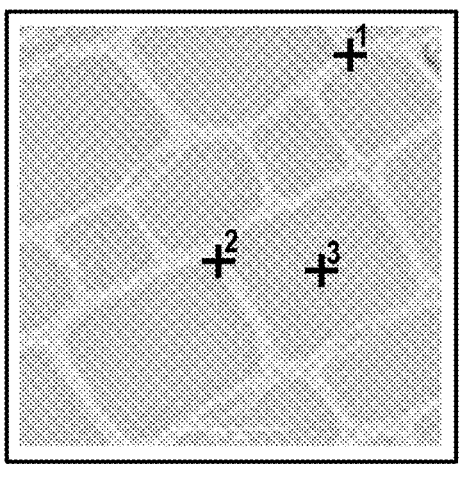
Figure 15:
FIG. 15 shows biogenic activated carbon with iron halide additive prepared according to the present disclosure attracted to a magnet.

To investigate the dispersion of magnetic particles in the biogenic activated carbon material, an electromicrograph of a portion of the Sample A material was obtained. As shown in FIG. 14A, dispersion of the magnetic particles is not limited to the surface of the material, but rather is pervasive, complete, and essentially uniform throughout. For comparison, FIG. 14B shows a biogenic activated carbon product prepared by an identical method except without iron(II) halide pretreatment. FIG. 15 illustrates the magnetic properties of the biogenic activated carbon product pretreated with iron(II) bromide as described herein.

Example 4. Reduction of Acid Gases by Potassium Permanganate-Pretreated Biogenic Activated Carbon A synthetic mixture of gases (nitrogen with 24.7 ppm carbon monoxide, 24.9 ppm nitric oxide, and 25.1 ppm sulfur dioxide; Linde Gas North America) was used to evaluate the adsorptive properties of biogenic activated carbon pretreated with 1% aqueous potassium permanganate according to Example 1. A MKS model 2030 Fourier Transform Infrared (FTIR) detector was used to measure the concentration of CO, NO and $SO_2$ in real time.

A sample of 0.4 grams of the potassium permanganate pretreated biogenic activated carbon was loaded into a Volatile Organic Sampling Train (VOST) tube and secured in place with filter frits and spring clamps.

Figure 16:
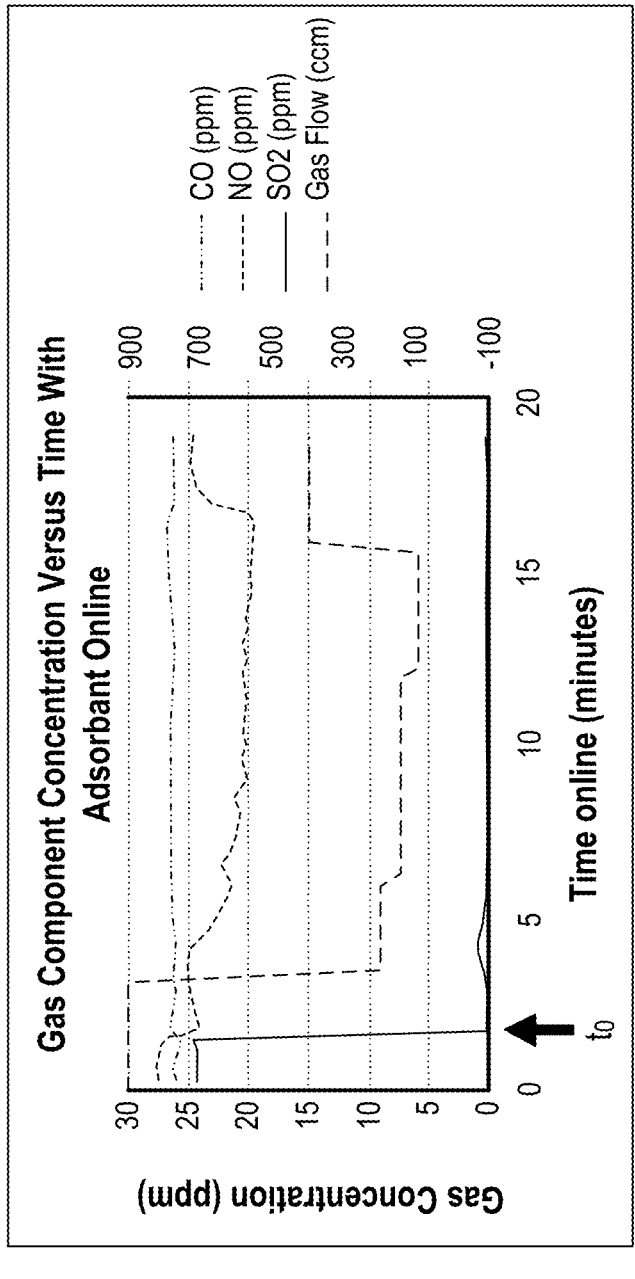
FIG. 16 depicts change in gas component concentration over time when passed through a plug of a biogenic activated carbon according to the present disclosure.

The FTIR detector was operated on the standardize gas stream to establish the baseline measured values. Then the VOST tube containing the test material was placed into the gas stream before the detector. As shown in FIG. 16, 100% of the sulfur dioxide was rapidly removed. In addition, about 20% of the nitric oxide was removed, while the carbon monoxide remained unchanged. The arrow in FIG. 16 at about 90 seconds indicates to, the moment when the VOST tube was inserted into the gas stream.

Example 5. Reduction of Carbon Dioxide Emissions by Potassium Permanganate-Pretreated Biogenic Activated Carbon Product A synthetic mixture of gases (nitrogen with 8.52% carbon dioxide and 11.00% oxygen; Linde Gas North America) was used to evaluate the adsorptive properties of biogenic activated carbon pretreated with 1% aqueous potassium permanganate according to Example 1.

A sample of 0.4 grams of the potassium permanganate pretreated biogenic activated carbon was loaded into a Volatile Organic Sampling Train (VOST) tube and secured in place with filter frits and spring clamps. A MKS model 2030 Fourier Transform Infrared (FTIR) detector was used to measure the concentration of $CO_2$ in real time.

Figure 17:
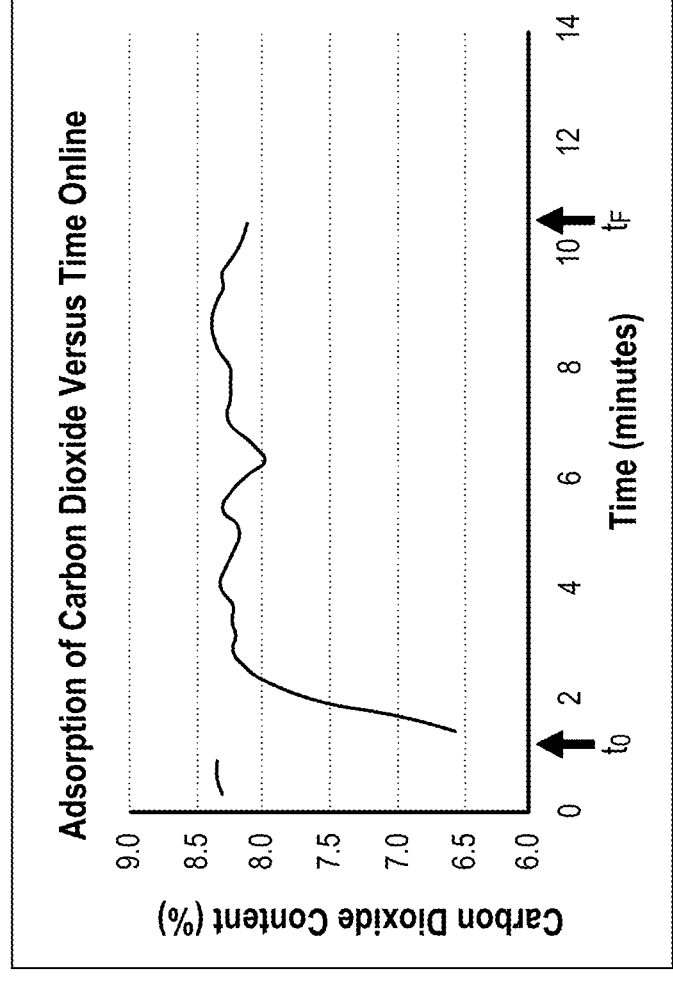
FIG. 17 depicts adsorption of carbon dioxide over time for a plug of a biogenic activated carbon according to the present disclosure.

The FTIR detector was operated on the standardize gas stream at a flow of 300 ccm to establish the baseline measured values. Then the VOST tube containing the test material was placed into the gas stream before the detector. As shown in FIG. 17, a large amount of $CO_2$ was initially adsorbed, followed by an equilibration period which resulted in an average adsorption of 2.6% of the carbon dioxide. The black arrow in FIG. 17 at about 90 seconds indicates to, the moment when the VOST tube was inserted into the gas stream; the gray arrow at about 10.3 minutes indicates $t_F$, the moment the VOST tube was removed from the gas stream.

Example 6. Preparation of Biogenic Activated Carbon—General Method

Wood substrate red pine large chips, Douglas fir cylinders (1.25-inch diameter pieces) and Douglas fir pieces (approximately 2 inches by 2 inches), were loaded into a loading hopper having an optionally heated nitrogen gas flow. Optionally, a 1% aqueous solution of an additive (e.g., NaOH and/or KOH) was applied by spray to the wood substrate while in the hopper or by soaking the biomass in the aqueous additive solution. Regardless of the application method, the additive solution was allowed to penetrate the biomass for 30 minutes before the biomass was dried. Once the reactor had reached the desired temperature, rotation of the reactor was initiated and the wood substrate was fed slowly by activating the material feed system. Average residence times in the heated portion of the reactor for each batch are indicated in Table 3. After exiting the heated portion of the reactor, the pyrolyzed material collected in a discharge hopper. A conveyor removed the biogenic activated carbon product from the discharge hopper for further analysis.

Biogenic activated carbon was prepared according to the General Method above using various feedstock sizes, varying reactor temperatures, heated or ambient nitrogen, additive, and residence times. Table 3 summarizes the pyrolysis parameters for each batch.

TABLE 3

| | Preparation of Biogenic Activated Carbon. | | | | |
|---|---|---|---|---|---|
| Sample | Substrate Size | Reactor Temp. | Nitrogen Temp. | Addi-tive | Residence Time |
| A | Large chips | 371° C. | Ambient (20-25° C.) | None | 0.5 hours |
| B | Large chips | 350° C. | Ambient | None | 0.5 hours |
| C | Large chips | 350° C. | 300° C. | None | 0.5 hours |
| D | 1.25-inch cylinders | 600° C. | 300° C. | None | 2 hours |

TABLE 3-continued

| | Preparation of Biogenic Activated Carbon. | | | | |
|---|---|---|---|---|---|
| Sample | Substrate Size | Reactor Temp. | Nitrogen Temp. | Addi-tive | Residence Time |
| E | 2 × 2 inches | 600° C. | 300° C. | None | 2 hours |
| F | Large chips | 480° C. | Ambient | None | 4 hours |
| G | Large chips | 480° C. | Ambient | KOH | 4 hours |
| H | Large chips | 370° C. | Ambient | KOH | 2.5 hours |
| I | Large chips | 370° C. | Ambient | KOH | 2 hours |
| J1 | Treated Input | N/A | N/A | NaOH | N/A |
| J2 | J1 Output | 370° C. | Ambient | NaOH | 2 hours |

Example 7. Analysis of Biogenic Activated Carbon

Parameters of the biogenic activated carbon products prepared according to the General Method of Example 6 were analyzed according to Table 4 below.

TABLE 4

| Methods Used to Analyze Biogenic Activated Carbon. | |
|---|---|
| Parameter | Method |
| Moisture (total) | ASTM D3173 |
| Ash content | ASTM D3174 |
| Volatile Matter content | ASTM D3175 |
| Fixed Carbon content (by calculation) | ASTM D3172 |
| Sulfur content | ASTM D3177 |
| Heating Value (BTU per pound) | ASTM D5865 |
| Carbon content | ASTM D5373 |
| Hydrogen content | ASTM D5373 |
| Nitrogen content | ASTM D5373 |
| Oxygen content (by calculation) | ASTM D3176 |

Results for Samples A through F, which were prepared without the use of additives, are shown in Table 5 below.

TABLE 5

| Characteristics of Biogenic Activated Carbon Products A Through F. | | | | | | |
|---|---|---|---|---|---|---|
| | Sample | | | | | |
| | A | B | C | D | E | F |
| Moisture (wt. %) | 2.42 | 3.02 | 3.51 | 0.478 | 0.864 | 4.25 |
| Ash (wt. %) | 1.16 | 0.917 | 0.839 | 1.03 | 1.06 | 1.43 |
| Volatile Matter (wt. %) | 38.7 | 46.4 | 42.8 | 2.8 | 17.0 | 18.4 |
| Fixed Carbon (wt. %) | 57.7 | 49.4 | 52.9 | 95.7 | 81.0 | 76.0 |
| Sulfur (wt. %) | ND[†] | ND | ND | ND | ND | ND |
| Heat Value (BTU/lb.) | 12,807 | 12,452 | 12,346 | 14,700 | 13,983 | 13,313 |
| Carbon (wt. %) | 73.3 | 71.2 | 71.0 | NT[‡] | NT | 84.1 |
| Hydrogen (wt. %) | 4.47 | 4.85 | 4.63 | NT | NT | 2.78 |
| Nitrogen (wt. %) | 0.251 | 0.227 | 0.353 | NT | NT | 0.259 |
| Oxygen (wt. %) | 18.3 | 19.7 | 19.6 | NT | NT | 7.13 |

[†]ND: less than or equal to about 0.05 wt. % sulfur content.

[‡]NT: Not Tested.

Results for Samples G through J2, which were prepared with the use of additives, are shown in Table 6 below.

TABLE 6

Characteristics of Biogenic Activated Carbon Products G Through J2.

| Sample | G | H | I | J1 | J2 |
|---|---|---|---|---|---|
| Moisture (wt. %) | 3.78 | 5.43 | 1.71 | 15.2 | 4.05 |
| Ash (wt. %) | 5.97 | 12.6 | 15.8 | 7.9 | 20.2 |
| Volatile Matter (wt. %) | 17.8 | 30.2 | 19.7 | 59.1 | 25.3 |
| Fixed Carbon (wt. %) | 72.5 | 51.7 | 62.8 | 17.8 | 50.5 |
| Sulfur (wt. %) | ND[†] | ND | ND | ND | ND |
| Heat Value (BTU/lb.) | 12,936 | 10,530 | 11,997 | 6,968 | 9,639 |
| Carbon (wt. %) | 81.1 | 64.4 | 69.6 | 41.9 | 67.2 |
| Hydrogen (wt. %) | 2.6 | 3.73 | 3.82 | 4.64 | 3.78 |
| Nitrogen (wt. %) | 0.20 | 0.144 | 0.155 | 0.145 | 0.110 |
| Oxygen (wt. %) | 6.31 | 13.6 | 8.91 | 30.2 | 4.6 |

[†]ND: less than or equal to about 0.05 wt. % sulfur content.

Example 8. Production of a High Heat Value Biogenic Activated Carbon Product

This example demonstrates production of a biogenic activated carbon product having a high heat value.

A feedstock comprising Douglas fir cylindrical pieces (1⅛" diameter, approx. 1.5-inch lengths) was pyrolyzed according to the General Method of Example 6. The reactor was heated to 600° C. and the feedstock was pyrolyzed with a residence time of 30 minutes. After cooling, the resulting biogenic activated carbon product was analyzed according to the methods described in Example 7. Results are shown in Table 7.

TABLE 7

Analysis of High Heat Value Biogenic Activated Carbon Product.

| Parameter | ASTM Method | As-Received | Moisture Free | Ash & Moisture Free |
|---|---|---|---|---|
| | | Proximate Analysis | | |
| Moisture (total) | D3173 | 1.45 wt. % | — | — |
| Ash | D3174 | 0.829 wt. % | 0.841 wt. % | — |
| Volatile Matter | D3175 | 7.15 wt. % | 7.26 wt. % | 7.32 wt. % |
| Fixed Carbon | D3172 | 90.6 wt. % | 91.9 wt. % | 92.7 wt % |
| Sulfur | D3177 | ND[†] | ND | ND |
| Heat Value | D5865 | 14,942 BTU/lb | 15,162 BTU/lb | 15,291 BTU/lb |
| | | Ultimate Analysis | | |
| Moisture (total) | D3173 | 1.45 wt. % | — | — |
| Ash | D3174 | 0.829 wt. % | 0.841 wt. % | — |
| Sulfur | D3177 | ND | ND | ND |
| Carbon | D5373 | 88.3 wt. % | 89.6 wt. % | 90.4 wt. % |
| Hydrogen[‡] | D5373 | 1.97 wt. % | 2.00 wt. % | 2.01 wt. % |
| Nitrogen | D5373 | 0.209 wt. % | 0.212 wt. % | 0.214 wt. % |
| Oxygen[‡] | D3176 | 7.19 wt. % | 7.30 wt. % | 7.36 wt. % |

[†]ND: Sulfur content was less than or equal to about 0.050 wt. % (as-received), less than or equal to about 0.051 wt. % (moisture-free), or less than or equal to about 0.052 wt. % (ash and moisture-free).
[‡]Excluding water.

Example 9. Production of a High Heat Value Biogenic Activated Carbon Product This example demonstrates production of a biogenic activated carbon product having a high heat value.

A feedstock comprising red pine chips having an average particle size of approximately 1-inch by ½ inches by ⅛ inches was pyrolyzed according to the General Method of Example 6. The reactor was heated to 550° C. and the feedstock was pyrolyzed with a residence time of 30 minutes. After cooling, the resulting biogenic activated carbon product was analyzed according to the methods described in Example 7. Results are shown in Table 8.

TABLE 8

| Analysis of High Heat Value Biogenic Activated Carbon Product. | | | | |
|---|---|---|---|---|
| Parameter | ASTM Method | As-Received | Moisture Free | Ash & Moisture Free |
| Proximate Analysis | | | | |
| Moisture (total) | D3173 | 2.55 wt. % | — | — |
| Ash | D3174 | 1.52 wt. % | 1.56 wt. % | — |
| Volatile Matter | D3175 | 10.1 wt. % | 10.4 wt. % | 10.5 wt. % |
| Fixed Carbon | D3172 | 85.8 wt. % | 88.1 wt. % | 89.5 wt. % |
| Sulfur | D3177 | ND† | ND | ND |
| Heat Value | D5865 | 14,792 BTU/lb | 15,179 BTU/lb | 15,420 BTU/lb |
| Ultimate Analysis | | | | |
| Moisture (total) | D3173 | 2.55 wt. % | — | — |
| Ash | D3174 | 1.52 wt. % | 1.56 wt. % | — |
| Sulfur | D3177 | ND | ND | ND |
| Carbon | D5373 | 88.9 wt. % | 91.2 wt. % | 92.7 wt. % |
| Hydrogen‡ | D5373 | 2.36 wt. % | 2.42 wt. % | 2.45 wt. % |
| Nitrogen | D5373 | 0.400 wt. % | 0.410 wt. % | 0.417 wt. % |
| Oxygen‡ | D3176 | 4.22 wt. % | 4.33 wt. % | 4.40 wt. % |

ND†: Sulfur content was less than or equal to about 0.050 wt. % (as-received), less than or equal to about 0.051 wt. % (moisture-free), or less than or equal to about 0.052 wt. % (ash and moisture-free).
‡Excluding water.

Example 10. Production of a Biogenic Activated Carbon Product for Blending with Met Coke Biogenic activated carbon was prepared from milled kiln-dried wood doweling substantially according to the General Method of Example 6.

Blends of met coke (Sample ID No. SGS/427-1104014-001) with 2% and 5% of the biogenic activated carbon product were prepared by mixing the met coke with the appropriate amount of biogenic activated carbon product. Strength and reactivity values were measured according to ASTM D5341 for the blends compared to met coke alone are shown in Table 9 (values are the average of a minimum of two tests per sample).

TABLE 9

| CSR and CRI of Biogenic Activated Carbon Product-Met Coke Blends. | | |
|---|---|---|
| Amount of Biogenic Activated Carbon Product | CRI | CSR |
| 0 wt. % (baseline) | 24.5% | 62.8% |
| 2 wt. % | 25.7% (+1.2%) | 62.3% (−0.5%) |
| 5 wt. % | 28.0% (+3.5%) | 61.2% (−1.6%) |

Example 11. Production of an Enhanced Hot-Strength Biogenic Activated Carbon Product Red pine wood chips approximately sized 1"×½"×⅛" were Pyrolyzed according to the General Method of Example 6 at 600° C. with a residence time of 30 minutes. The resulting biogenic activated carbon product is referred to as "Sample A."

Milled, kiln-dried wood doweling having a 1⅛" diameter was cut into segments having a length of about 1.5 inches each. The segments were pyrolyzed according to the General Method of Example 1 at 600° C. with a residence time of 2 hours. The resulting biogenic activated carbon product is referred to as "Sample B."

Samples A and B were each placed separately into quartz tubes and heated at 1,100° C. in the presence of $CO_2$ gas for one hour. After one hour, Sample A had a CSR value of about 0%. After one hour, Sample B had a CSR value of 64.6%. These results indicate that potential for increasing hot strength of a biogenic coke replacement product and suitability for use as a replacement for met coke in various metal production applications.

Example 12. Preparation of Particularly Dimensioned Biogenic Activated Carbon Product As shown in Table 10 below, biogenic activated carbon product having a particular shape and average dimension was produced according to the General Method of Example 6.

US 12,611,649 B2

97 98

TABLE 10

Properties of Particularly Dimensioned Biogenic Activated Carbon Product.

| Sample | Fixed Carbon | Initial Volume | Final Volume | Volume Change | Initial Mass | Final Mass | Mass Change |
|---|---|---|---|---|---|---|---|
| Blocks | 90 wt. % | 3.15 in³ | 1.51 in³ | −52% | 22.77 g | 4.91 g | −78% |
| Cylinders-1 | 80 wt. % | 1.46 in³ | 0.64 in³ | −56% | 14.47 g | 3.61 g | −75% |
| Cylinders-2 | 90 wt. % | 1.46 in³ | 0.58 in³ | −60% | 14.47 g | 3.60 g | −75% |

Example 13. Effect of Residence Time on Fixed Carbon Levels

Figure 18:
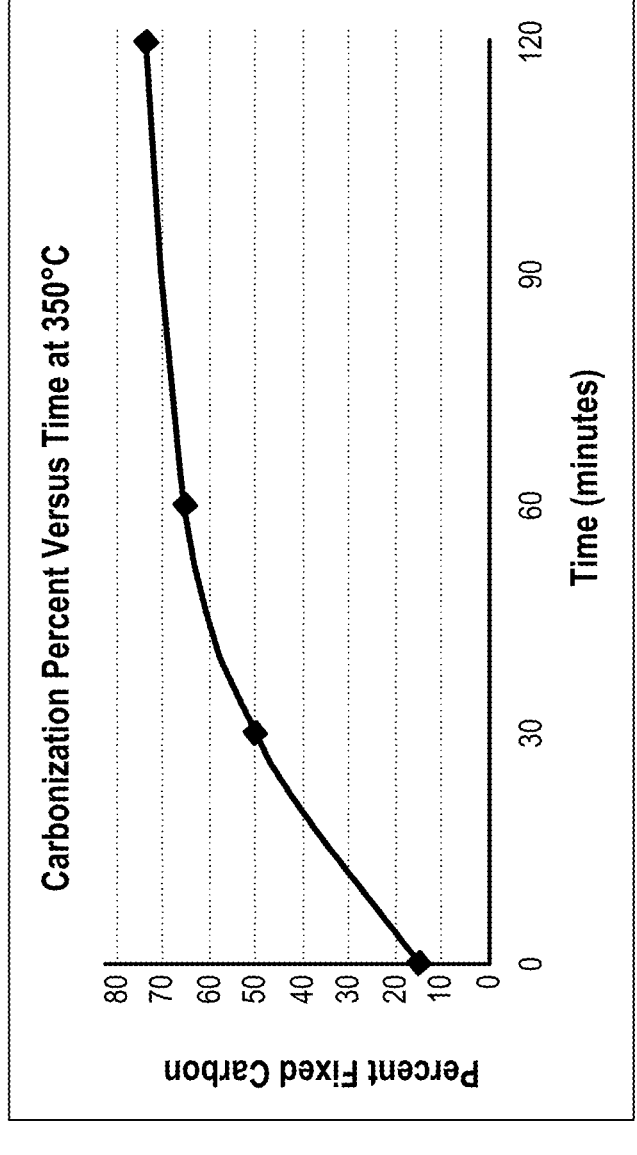
FIG. 18 depicts a graph illustrating the effect of retention time on fixed carbon content of a biogenic activated carbon product produced according to one embodiment of the present disclosure.

The effect of residence time on fixed carbon levels in the biogenic activated carbon product was investigated by dividing one batch of feedstock into four groups of approximately equal mass composed of pieces of feedstock of approximately equal particle size. Each of the four groups was subjected to pyrolysis according to the General Method of Example 6 at 350° C. with residence times of 0 minutes, 30 minutes, 60 minutes, and 120 minutes, respectively. Fixed carbon content of each sample was determined by ASTM D3172. Results are shown in Table 11 and corresponding FIG. 18.

TABLE 11

Effect of Residence Time on Fixed Carbon Levels.

| Sample | Residence Time | Fixed Carbon |
|---|---|---|
| Residence-1 | 0 minutes | 17 wt. % |
| Residence-2 | 30 minutes | 50 wt. % |
| Residence-3 | 60 minutes | 66 wt. % |
| Residence-4 | 120 minutes | 72 wt. % |

Example 14. Effect of Pyrolysis Temperature on Fixed Carbon Levels

Figure 19:
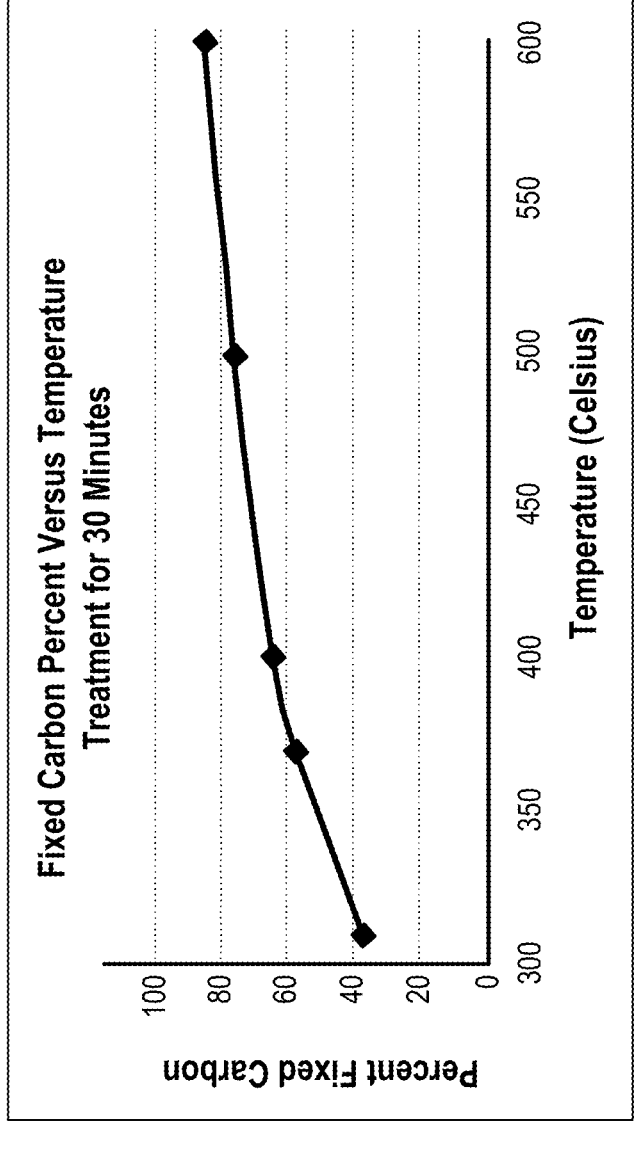
FIG. 19 depicts a graph illustrating the effect of pyrolysis temperature on fixed carbon content of a biogenic activated carbon product produced according to one embodiment of the present disclosure.

The effect of pyrolysis temperature on fixed carbon levels in the biogenic activated carbon product was investigated by dividing one batch of feedstock into five groups of approximately equal mass composed of pieces of feedstock of approximately equal particle size. Each of the five groups was subjected to pyrolysis according to the General Method of Example 6 with a 30 minute residence time. Fixed carbon content of each sample was determined by ASTM D3172. Results are shown in Table 12 and corresponding FIG. 19.

TABLE 12

Effect of Residence Time on Fixed Carbon Levels.

| Sample | Pyrolysis Temp. | Fixed Carbon |
|---|---|---|
| Temperature-1 | 310° C. | 38 wt. % |
| Temperature-2 | 370° C. | 58 wt. % |
| Temperature-3 | 400° C. | 64 wt. % |
| Temperature-4 | 500° C. | 77 wt. % |
| Temperature-5 | 600° C. | 83 wt. % |

Example 15. Effect of Feedstock Particle Size on Fixed Carbon Levels

Figure 20:
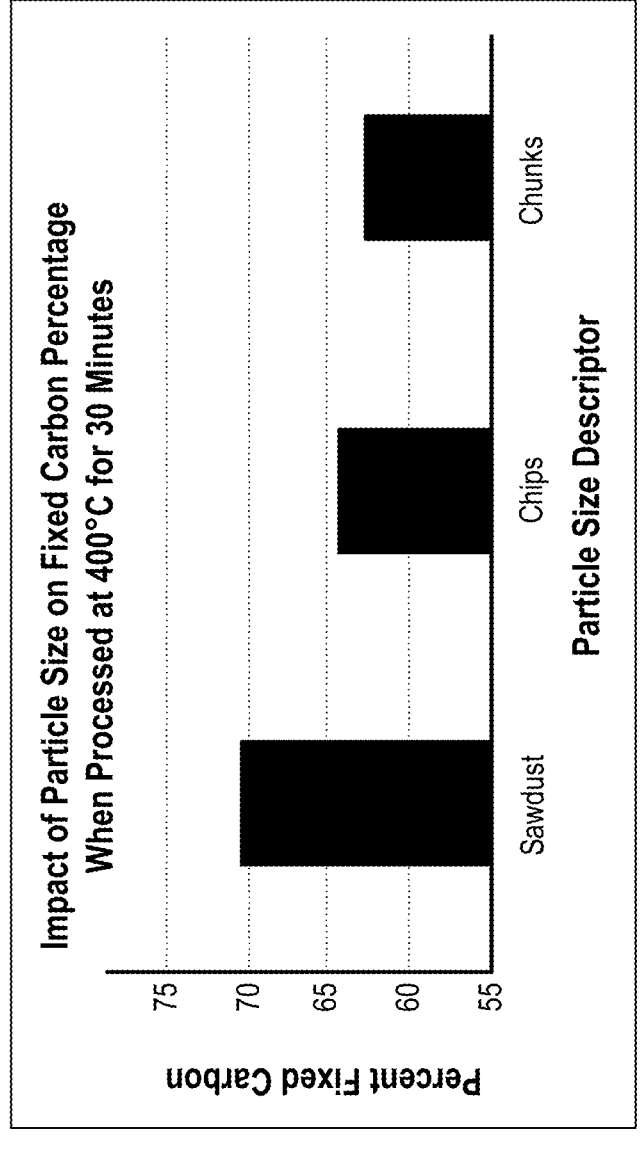
FIG. 20 depicts a graph illustrating the effect of biomass particle size on fixed carbon content of a biogenic activated carbon product produced according to one embodiment of the present disclosure.

The effect of feedstock particle size on fixed carbon levels in the biogenic activated carbon product was investigated by pyrolyzing three groups of red pine biomass: sawdust (average particle size of approximately 0.0625 inches), chips (average particle size of approximately 1 inch by ½ inch by ⅛ inches), and chunks (cylinders having a 1⅛" diameter and a length of approximately 1.5 inches). Each of the three groups was subjected to pyrolysis according to the General Method of Example 6 at 400° C. for 30 minutes. Fixed carbon content of each sample was determined by ASTM D3172. Results are shown in Table 13 and corresponding FIG. 20.

TABLE 13

Effect of Residence Time on Fixed Carbon Levels.

| Sample | Average Particle Size | Fixed Carbon |
|---|---|---|
| Sawdust | ~0.0625 inches | 71 wt. % |
| Chips | ~1 inch × ½ inch × ⅛ inch | 64 wt. % |
| Chunks | ~1.5" lengths of 1⅛" diameter cylinders | 62 wt. % |

Example 161. Effect of Oxygen Level During Pyrolysis on Mass Yield of Biogenic Activated Carbon Product This example demonstrates the effect of oxygen levels on the mass yield of biogenic activated carbon product.

Two samples of hardwood sawdust (4.0 g) were each placed in a quartz tube. The quartz tube was then placed into a tube furnace (Lindberg Model 55035). The gas flow was set to 2,000 ccm. One sample was exposed to 100% nitrogen atmosphere, while the other sample was subjected to a gas flow comprising 96% nitrogen and 4% oxygen. The furnace temperature was set to 290° C. Upon reaching 290° C. (approximately 20 minutes), the temperature was held at 290° C. for 10 minutes, at which time the heat source was shut off, and the tube and furnace allowed to cool for 10 minutes. The tubes were removed from the furnace (gas still flowing at 2,000 ccm). Once the tubes and samples were cool enough to process, the gases were shut off, and the pyrolyzed material removed and weighed (Table 14).

TABLE 14

Effect of Oxygen Levels During Pyrolysis on Mass Yield.

| Sample | Atmosphere | Mass Yield |
|---|---|---|
| Atmosphere-1(a) | 100% Nitrogen | 87.5% |
| Atmosphere-2(a) | 96% Nitrogen, 4% Oxygen | 50.0% |

Example 17. Effect of Oxygen Level During Pyrolysis on Fixed Carbon Content Level and Heat Value of Biogenic Activated Carbon Product The increase in fixed carbon content and heat value from the use of a Carbon Recovery Unit ("CRU") is demonstrated.

Pyrolysis of hardwood sawdust according to Example 15 was performed. A standard coconut shell charcoal ("CSC") tube (SKC Cat. No. 226-09) was placed in the off-gas stream following a standard midget impinger containing 10 mL of HPLC-grade water. Increases in fixed carbon levels and heat value were compared to a CSC tube that had not been exposed to any off-gases (Table 15, ash and moisture-free data).

TABLE 15

Increase in Fixed Carbon Content and Heat Value
as a Function of Oxygen Content During Pyrolysis.

| Sample | Atmosphere | Increase in Carbon Content | Increase in Heat Value |
|---|---|---|---|
| Atmosphere-1(b) | 100% Nitrogen | +3.2% | +567 BTU/lb (+4.0%) |
| Atmosphere-2(b) | 96% Nitrogen, 4% Oxygen | +1.6% | +928 BTU/lb (+6.5%) |

The results of Examples 16 and 17 demonstrate the benefits of maintaining a near-zero oxygen atmosphere to on mass yield and commercial value of the disclosed pyrolyzation process. Using the off-gases from these two experiments it was also possible to demonstrate that the BTU-laden gases exiting the process can be captured for the purpose of enhancing the BTU content and/or carbon content, of a carbon substrate (coal, coke, activated carbon, carbon).

Example 18. Effect of Heated Nitrogen on Fixed Carbon Content of a Biogenic Activated Carbon Product This example demonstrates the effect of introducing heated nitrogen gas to the biomass processing unit.

Production of biogenic activated carbon product using a biomass consisting of red pine wood chips having a typical dimension of 1 inch by ½ inches by ⅛ inches was performed according to the General Method of Example 6 with a four-zone heat pilot-scale reactor at 350° C. In the first run, nitrogen was introduced at ambient temperature. In a second run, which was performed immediately after the first run in order to minimize variation in other parameters, nitrogen was preheated to 300° C. before injection into the pyrolysis zone. In each case, the nitrogen flow rate was 1.2 cubic feet per minute, and the biomass was processed for 30 minutes.

Fixed carbon content was measured on a dry, ash-free basis according to ASTM D3172 for each run (Table 16).

TABLE 16

Effect of Nitrogen Temperature on Fixed Carbon
Content of a Biogenic Activated Carbon Product.

| Sample | Nitrogen Temperature | Fixed Carbon Content |
|---|---|---|
| Atmosphere-1(c) | Ambient | 51.7% |
| Atmosphere-2(c) | 300° C. | 55.3% |

These test results demonstrate a 7.0% increase [(100)(55.3%−51.7%)/55.3%] in the fixed carbon content of the biogenic activated carbon product carbonized product by utilizing pre-heated nitrogen.

Example 19. Improvement of Mass Yield by Pretreatment of Biomass

This example demonstrates the production of a biogenic activated carbon product having an additive, namely iron(II) bromide.

An aqueous solution of iron(II) bromide hydrate was created by mixing 72.6 grams of iron(II) bromide hydrate into 1 gallon of water (e.g., 1.0% bromine aqueous solution). This solution was added to 5.23 pounds (2.37 kg) of air-dried (12% moisture content) red pine wood chips. Each wood chip was approximately 1"×½"×⅛".

The container of wood chips and solution was sealed with a water tight lid. The contents were mixed periodically over the course of approximately four hours by tipping and rolling the container and contents. The wood chips and solution were kept sealed overnight to allow for saturation of the wood chips with the solution.

Thereafter, the contents were transferred to an open water-proof tub and allowed to air dry for several hours, with periodic mixing until all free liquid had been absorbed by the wood chips or evaporated. The contents were transferred to an air-dryer and allowed to dry overnight.

The pretreated, air-dried wood chips were verified to have 12% moisture content. The mass of the pretreated, air dried wood chips was determined to be 5.25 lbs (2.38 kg). The contents were transferred to a pyrolysis reactor with nitrogen gas preheated to 300° C. with a gas flow rate of 0.4 cubic feet per minute. Pyrolysis occurred at 370° C. for 30 minutes.

The finished product was removed from the reactor at a temperature of less than or equal to about 100° C. Upon reaching room temperature (approximately 23° C.), the finished product had a mass of 2.5 pounds (1.14 kg), indicating a mass yield of 47.6% based upon feedstock mass (e.g., the mass contribution of the pretreatment additive was subtracted) at 12% moisture content. On a dry basis (correcting out the 12% moisture and the mass contribution of the pretreatment additive), the mass yield was 54.1%. As shown in Table 17 below, this represents a 28-39% increase in mass yield over untreated wood chips processed under the same conditions.

TABLE 17

Pretreatment of Biomass with 1.0% Aqueous
Iron(II) Bromide Increases Mass Yield.

| Pretreatment | Mass Yield (12% Moisture) | Mass Yield (Dry Basis) |
|---|---|---|
| None | 34.3% | 39.0% |
| None | 35.4% | 40.2% |
| None | 37.2% | 42.2% |
| Average (No Pretreatment) | 35.6% | 40.5% |
| Iron(II) Bromide | 47.6% | 54.1% |
| % INCREASE | +33.7% | +33.6% |

These data indicate a significant improvement in the mass yield for wood chips treated with an iron (II) bromide solution prior to pyrolytic processing.

Example 20. Enhanced Activation Through Feedstock Enhancement

This example demonstrates the positive benefits of recapturing gas-phase carbonaceous species onto a pre-carbonized substrate prior to a subsequent activation step.

Pre-carbonized feedstock (carbonized at 370° C.) was utilized. In a first experiment, this material was pyrolyzed (activated, thermally treated) without passing the pyrolysis off-gases through the feedstock. The maximum achieved Iodine Number in this configuration was 909.

In a second experiment, this same substrate was utilized as a gas-phase carbonaceous capture material. In this mode, the maximum Iodine Number was recorded as 950.

These results are consistent with multiple experiments executed at pilot scale using both pre-carbonized feedstock substrate, and feedstock that has not been pre-carbonized.

All publications, patents, and patent applications cited in this specification are herein incorporated by reference in their entirety as if each publication, patent, or patent application were specifically and individually put forth herein.

Where methods and steps described above indicate certain events occurring in certain order, those of ordinary skill in the art will recognize that the ordering of certain steps may be modified and that such modifications are in accordance with the variations of the disclosure. Additionally, certain of the steps may be performed concurrently in a parallel process when possible, or performed sequentially.

We claim:

1. A biogenic activated carbon composition comprising, on a dry basis, at least about 85 wt % total carbon, at most about 15 wt % hydrogen, and at most about 1 wt % nitrogen; and wherein the activated carbon composition is characterized by an Iodine Number of at least about 1500.

2. The biogenic activated carbon composition of claim 1, comprising, on a dry basis, at least about 95 wt % carbon.

3. The biogenic activated carbon composition of claim 1, comprising, on a dry basis, at most about 0.5 wt % nitrogen.

4. The biogenic activated carbon composition of claim 1, comprising, on a dry basis, at most about 5 wt % hydrogen.

5. The biogenic activated carbon composition of claim 1, comprising, on a dry basis, at least about 1 wt % and at most about 10 wt % oxygen.

6. The biogenic activated carbon composition of claim 1, comprising, on a dry basis, at most about 0.5 wt % phosphorus.

7. The biogenic activated carbon composition of claim 1, comprising, on a dry basis, at most about 0.2 wt % sulfur.

8. The biogenic activated carbon composition of claim 1, comprising an additive selected from an acid, a base, a salt, a metal, a metal oxide, a metal hydroxide, a metal halide, iodine, an iodine compound, or a combination thereof.

9. The biogenic activated carbon composition of claim 8, wherein the additive is magnesium, manganese, aluminum, nickel, iron, chromium, silicon, boron, cerium, molybdenum, phosphorus, tungsten, vanadium, iron chloride, iron bromide, magnesium oxide, dolomite, dolomitic lime, fluorite, fluorospar, bentonite, calcium oxide, lime, sodium hydroxide, potassium hydroxide, hydrogen bromide, hydrogen chloride, sodium silicate, potassium permanganate, organic acids, iodine, an iodine compound, or combinations thereof.

10. The biogenic activated carbon composition of claim 8, wherein the additive is magnetic or comprises a magnetic component.

11. The biogenic activated carbon composition of claim 1, comprising iron.

12. The biogenic activated carbon composition of claim 11, comprising, on a dry basis, at least about 0.0001 wt % to at most about 1 wt % iron, at least about 0.1 wt % to at most about 0.5 wt % iron, at least about 0.5 wt % to at most about 5 wt % iron, or at least about 1 wt % to at most about 2 wt % iron.

13. The biogenic activated carbon composition of claim 1, wherein the composition is characterized by an Iodine Number of at least about 2000, or at least about 2000 to at most about 2250.

14. The biogenic activated carbon composition of claim 1, wherein the composition is characterized by a surface area of at least about 1000 $m^2$/g, at least about 1500 $m^2$/g, or at least about 2000 $m^2$/g.

15. The biogenic activated carbon composition of claim 1, wherein the composition is in powdered form, granular form, extruded form, or in structural object form.

16. The biogenic activated carbon composition of claim 1, wherein the composition has an Abrasion Number from about 20% to about 99%.

* * * * *